(12) United States Patent

Kondiles et al.

(10) Patent No.: US 12,591,516 B2

(45) Date of Patent: **\*Mar. 31, 2026**

---

(54) DATABASE SYSTEM WITH REPLICATION BASED STORAGE AND REDUNDANCY CODING BASED STORAGE

(71) Applicant: Ocient Holdings LLC, Chicago, IL (US)

(72) Inventors: George Kondiles, Chicago, IL (US); Jason Arnold, Chicago, IL (US); S. Christopher Gladwin, Chicago, IL (US); Joseph Jablonski, Chicago, IL (US); Daniel Coombs, Chicago, IL (US); Andrew D. Baptist, Mt. Pleasant, WI (US)

(73) Assignee: Ocient Holdings LLC, Chicago, IL (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/626,658

(22) Filed: Apr. 4, 2024

(65) Prior Publication Data

US 2024/0273022 A1 Aug. 15, 2024

Related U.S. Application Data

(63) Continuation of application No. 18/165,431, filed on Feb. 7, 2023, now Pat. No. 11,983,114, which is a (Continued)

(51) Int. Cl.
*G06F 12/08* (2016.01)
*G06F 12/0804* (2016.01)
(Continued)

(52) U.S. Cl.
CPC ........ *G06F 12/0804* (2013.01); *G06F 16/221* (2019.01); *G06F 16/24552* (2019.01); *G06F 2212/1032* (2013.01)

(58) Field of Classification Search
CPC .................................................. G06F 12/0804
(Continued)

(56) References Cited

U.S. PATENT DOCUMENTS

| | | |
|---|---|---|
| 5,548,770 A | 8/1996 | Bridges |
| 6,230,200 B1 | 5/2001 | Forecast |

(Continued)

FOREIGN PATENT DOCUMENTS

WO WO2011023652 A2 3/2011

OTHER PUBLICATIONS

A new high performance fabric for HPC, Michael Feldman, May 2016, Intersect360 Research.

(Continued)

*Primary Examiner* — Syling Yen
(74) *Attorney, Agent, or Firm* — Garlick & Markison; Timothy W. Markison

(57) ABSTRACT

A database system operates by: receiving a set of records for storage; applying a replication factor dictated by the required fault tolerance level to generate a set of replicas of the set of records; temporarily storing the set of replicas in a temporary ingress storage system during a first temporal period in accordance with the required fault tolerance level; generating a plurality of redundancy-coded segments that encodes the set of record utilizing a redundancy storage coding scheme dictated by the required fault tolerance level; and migrating the set of records from the temporary ingress storage system to a long-term storage system by storing the set of segments in the long-term storage system and by removing the set of replicas from the temporary ingress storage system.

14 Claims, 53 Drawing Sheets

Related U.S. Application Data continuation of application No. 16/829,554, filed on Mar. 25, 2020, now Pat. No. 11,599,463.

(51) Int. Cl.
  *G06F 16/22*      (2019.01)
  *G06F 16/2455*    (2019.01)

(58) Field of Classification Search
  USPC .......................................................... 707/713
  See application file for complete search history.

(56) References Cited

U.S. PATENT DOCUMENTS

| | | | |
|---|---|---|---|
| 6,633,772 | B2 | 10/2003 | Ford |
| 7,499,907 | B2 | 3/2009 | Brown |
| 7,908,242 | B1 | 3/2011 | Achanta |
| 9,053,171 | B2 | 6/2015 | Ailon et al. |
| 9,569,108 | B2 | 2/2017 | Benke |
| 2001/0051949 | A1 | 12/2001 | Carey |
| 2002/0032676 | A1 | 3/2002 | Reiner |
| 2002/0196260 | A1 | 12/2002 | Candler et al. |
| 2004/0019583 | A1 | 1/2004 | Jung et al. |
| 2004/0162853 | A1 | 8/2004 | Brodersen |
| 2008/0133456 | A1 | 6/2008 | Richards |
| 2009/0063893 | A1 | 3/2009 | Bagepalli |
| 2009/0183167 | A1 | 7/2009 | Kupferschmidt |
| 2010/0082577 | A1 | 4/2010 | Mirchandani |
| 2010/0241646 | A1 | 9/2010 | Friedman |
| 2010/0274983 | A1 | 10/2010 | Murphy |
| 2010/0312756 | A1 | 12/2010 | Zhang |
| 2011/0219169 | A1 | 9/2011 | Zhang |
| 2012/0109888 | A1 | 5/2012 | Zhang |
| 2012/0151118 | A1 | 6/2012 | Flynn |
| 2012/0185866 | A1 | 7/2012 | Couvee |
| 2012/0254252 | A1 | 10/2012 | Jin |
| 2012/0311246 | A1 | 12/2012 | Mcwilliams |
| 2013/0091102 | A1 | 4/2013 | Nayak |
| 2013/0275365 | A1 | 10/2013 | Wang |
| 2013/0332484 | A1 | 12/2013 | Gajic |
| 2014/0047095 | A1 | 2/2014 | Breternitz |
| 2014/0136510 | A1 | 5/2014 | Parkkinen |
| 2014/0188841 | A1 | 7/2014 | Sun |
| 2014/0281300 | A1* | 9/2014 | Martin ................... G06F 3/0685 |
| | | | 711/161 |
| 2015/0205607 | A1 | 7/2015 | Lindholm |
| 2015/0244804 | A1 | 8/2015 | Warfield |
| 2015/0248366 | A1 | 9/2015 | Bergsten |
| 2015/0293966 | A1 | 10/2015 | Cai |
| 2015/0310045 | A1 | 10/2015 | Konik |
| 2016/0034547 | A1 | 2/2016 | Lerios |
| 2016/0203025 | A1 | 7/2016 | Yao |
| 2018/0150335 | A1* | 5/2018 | Doi ...................... G06F 11/3037 |
| 2018/0275898 | A1* | 9/2018 | Bhansali ................. G06F 11/14 |
| 2019/0065557 | A1 | 2/2019 | Boles |
| 2019/0121739 | A1 | 4/2019 | Richardson |
| 2019/0228018 | A1 | 7/2019 | Seki |
| 2021/0297500 | A1 | 9/2021 | Thompson |

OTHER PUBLICATIONS

Alechina, N. (2006-2007). B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy. .com/blog/amazon-dynamodb-ten-thing.

An Inside Look at Google BigQuery, by Kazunori Sato, Solutions Architect, Cloud Solutions team, Google Inc., 2012.

Big Table, a NoSQL massively parallel table, Paul Krzyzanowski, Nov. 2011, https://www.cs.rutgers.edu/pxk/417/notes/contentlbigtable.html.

Distributed Systems, Fall2012, Mohsen Taheriyan, http://www-scf.usc.edu/-csci57212011Spring/presentations/Taheriyan.pptx.

International Searching Authority; International Search Report and Written Opinion; International Application No. PCT/US2017/054773; Feb. 13, 2018; 17 pgs.

International Searching Authority; International Search Report and Written Opinion; International Application No. PCT/US2017/054784; Dec. 28, 2017; 10 pgs.

International Searching Authority; International Search Report and Written Opinion; International Application No. PCT/US2017/066145; Mar. 5, 2018; 13 pgs.

International Searching Authority; International Search Report and Written Opinion; International Application No. PCT/US2017/066169; Mar. 6, 2018; 15 pgs.

International Searching Authority; International Search Report and Written Opinion; International Application No. PCT/US2018/025729; Jun. 27, 2018; 9 pgs.

International Searching Authority; International Search Report and Written Opinion; International Application No. PCT/US2018/034859; Oct. 30, 2018; 8 pgs.

International Searching Authority; International Search Report and Written Opinion; International Application No. PCT/US2021/019156; Jul. 21, 2021; 12 pgs.

MapReduce: Simplified Data Processing on Large Clusters, OSDI 2004, Jeffrey Dean and Sanjay Ghemawat, Google, Inc., 13 pgs.

Rodero-Merino, L.; Storage of Structured Data: Big Table and HBase, New Trends In Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguide!Ti . . . .

\* cited by examiner database system 10 computing device 18 computing device 18 computing device 18 node 37 node 37 node 37

DB OS = DataBase Operating Sysetm
CD OS = computing device operating system node 37 data set 32 columns 80 rows or records sort data slabs based on key column(s) of segment 1

| | | | | |
|---|---|---|---|---|
| 1 | a | on | 101 | a2c |
| 4 | d | on | 074 | c4l |
| 5 | e | on | 364 | b5e |
| 7 | g | on | 015 | e8f |
| 2 | b | off | 112 | a1k |
| 3 | c | off | 211 | d5s |
| 6 | f | off | 489 | c4q |
| 8 | h | off | 611 | a1a | sort data slabs based on key column(s) of segment 2

| | | | | |
|---|---|---|---|---|
| 9 | a | on | xxx | yyy |
| 12 | d | on | xxx | yyy |
| 13 | e | on | xxx | yyy |
| 15 | g | on | xxx | yyy |
| 10 | b | off | xxx | yyy |
| 11 | c | off | xxx | yyy |
| 14 | f | off | xxx | yyy |
| 16 | h | off | xxx | yyy | sort data slabs based on key column(s) of segment 3

| | | | | |
|---|---|---|---|---|
| 17 | a | on | xxx | yyy |
| 20 | d | on | xxx | yyy |
| 21 | e | on | xxx | yyy |
| 23 | g | on | xxx | yyy |
| 18 | b | off | xxx | yyy |
| 19 | c | off | xxx | yyy |
| 22 | f | off | xxx | yyy |
| 24 | h | off | xxx | yyy | sort data slabs based on key column(s) of segment 4

| | | | | |
|---|---|---|---|---|
| 25 | a | on | xxx | yyy |
| 28 | d | on | xxx | yyy |
| 29 | e | on | xxx | yyy |
| 31 | g | on | xxx | yyy |
| 26 | b | off | xxx | yyy |
| 27 | c | off | xxx | yyy |
| 30 | f | off | xxx | yyy |
| 32 | h | off | xxx | yyy | sort data slabs based on key column(s) of segment 5

| | | | | |
|---|---|---|---|---|
| 33 | a | on | xxx | yyy |
| 36 | d | on | xxx | yyy |
| 37 | e | on | xxx | yyy |
| 39 | g | on | xxx | yyy |
| 34 | b | off | xxx | yyy |
| 35 | c | off | xxx | yyy |
| 38 | f | off | xxx | yyy |
| 40 | h | off | xxx | yyy |

FIG. 21 database system 10 database system 10

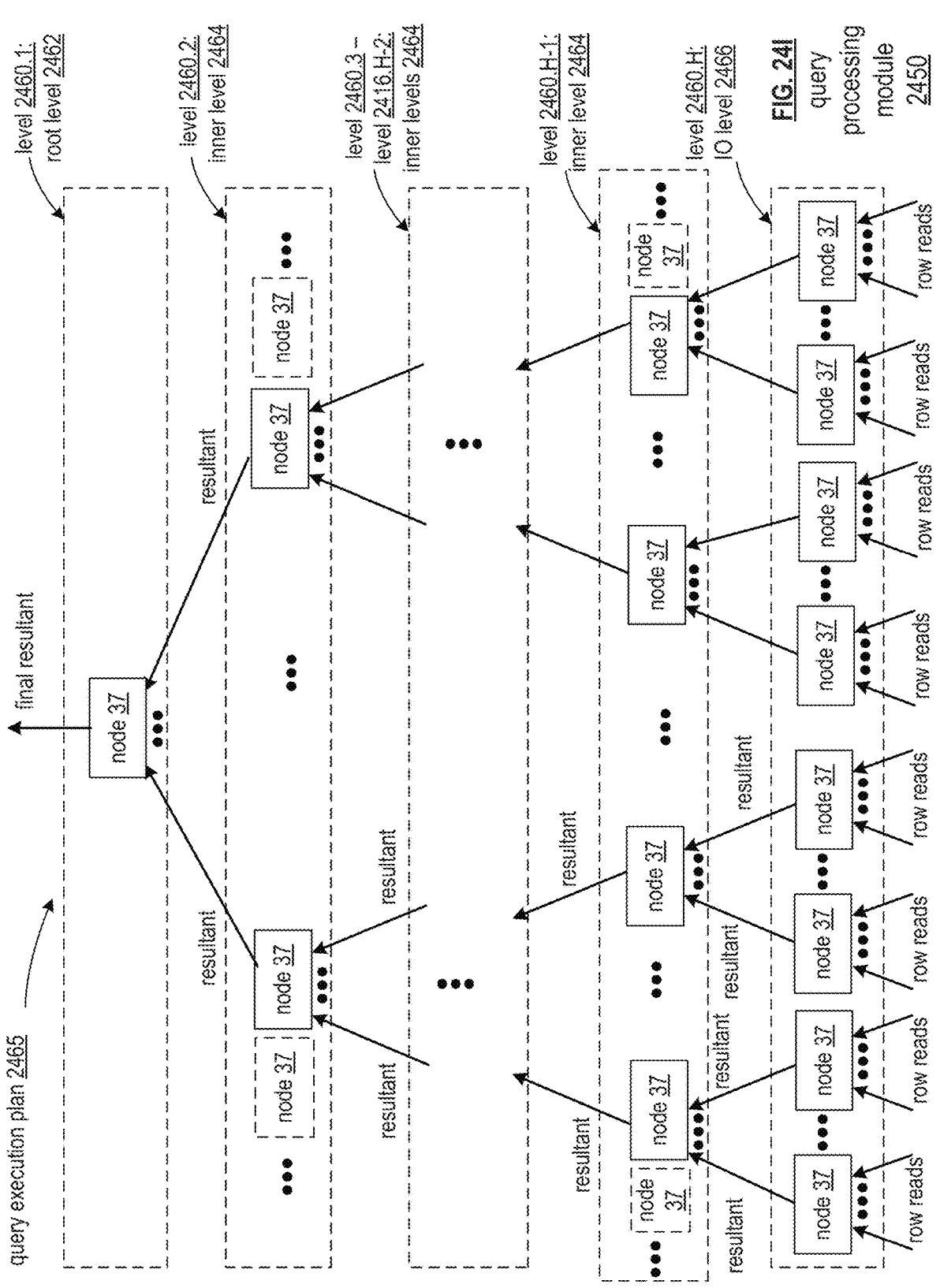

database system 10

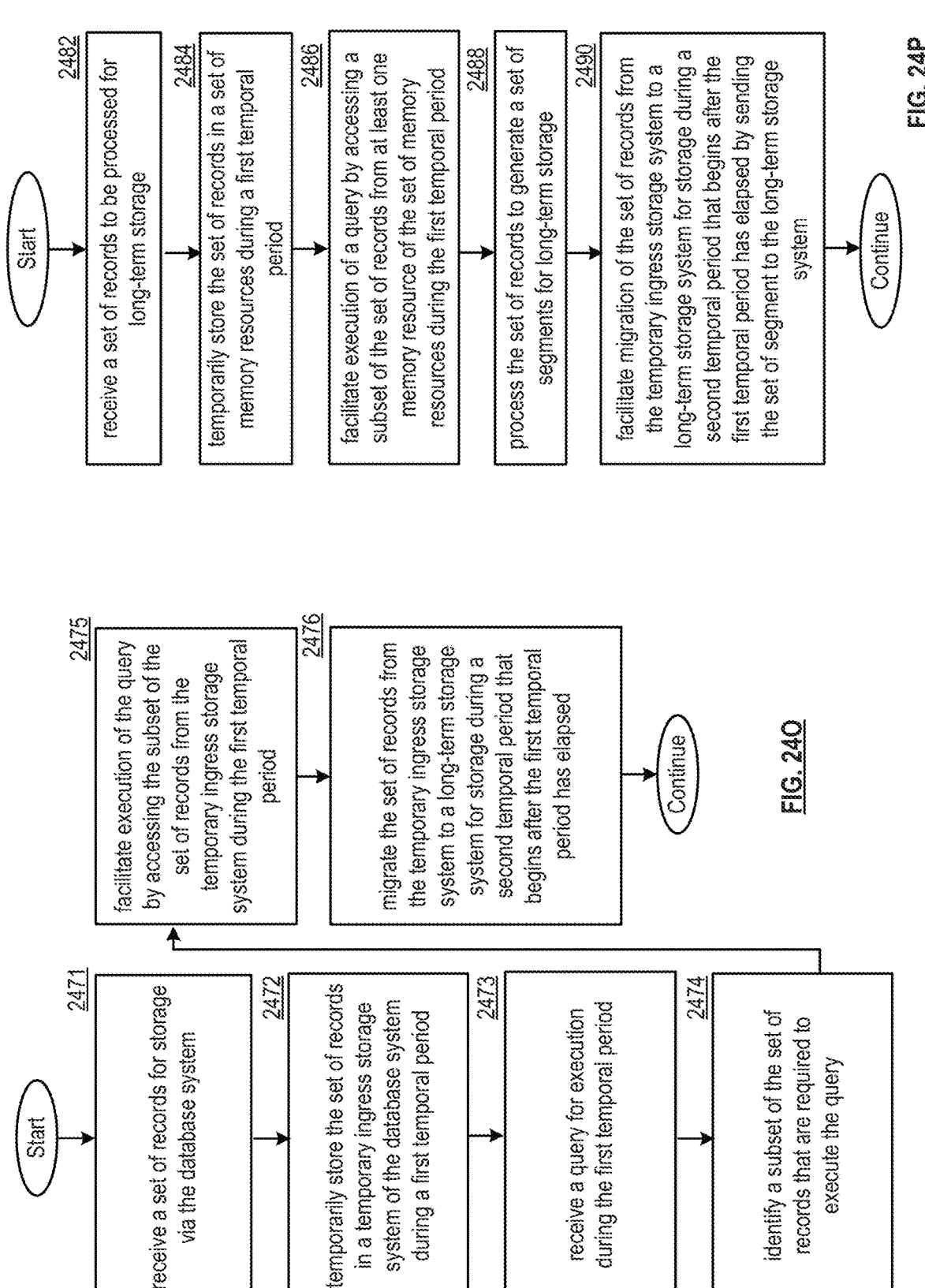

2482 — receive a set of records to be processed for long-term storage

2484 — temporarily store the set of records in a set of memory resources during a first temporal period 2486 — facilitate execution of a query by accessing a subset of the set of records from at least one memory resource of the set of memory resources during the first temporal period 2488 — process the set of records to generate a set of segments for long-term storage 2490 — facilitate migration of the set of records from the temporary ingress storage system to a long-term storage system for storage during a second temporal period that begins after the first temporal period has elapsed by sending the set of segment to the long-term storage system

FIG. 24P

2475 — facilitate execution of the query by accessing the subset of the set of records from the temporary ingress storage system during the first temporal period 2476 — migrate the set of records from the temporary ingress storage system to a long-term storage system for storage during a second temporal period that begins after the first temporal period has elapsed 2471 — receive a set of records for storage via the database system 2472 — temporarily store the set of records in a temporary ingress storage system of the database system during a first temporal period 2473 — receive a query for execution during the first temporal period 2474 — identify a subset of the set of records that are required to execute the query

FIG. 24O

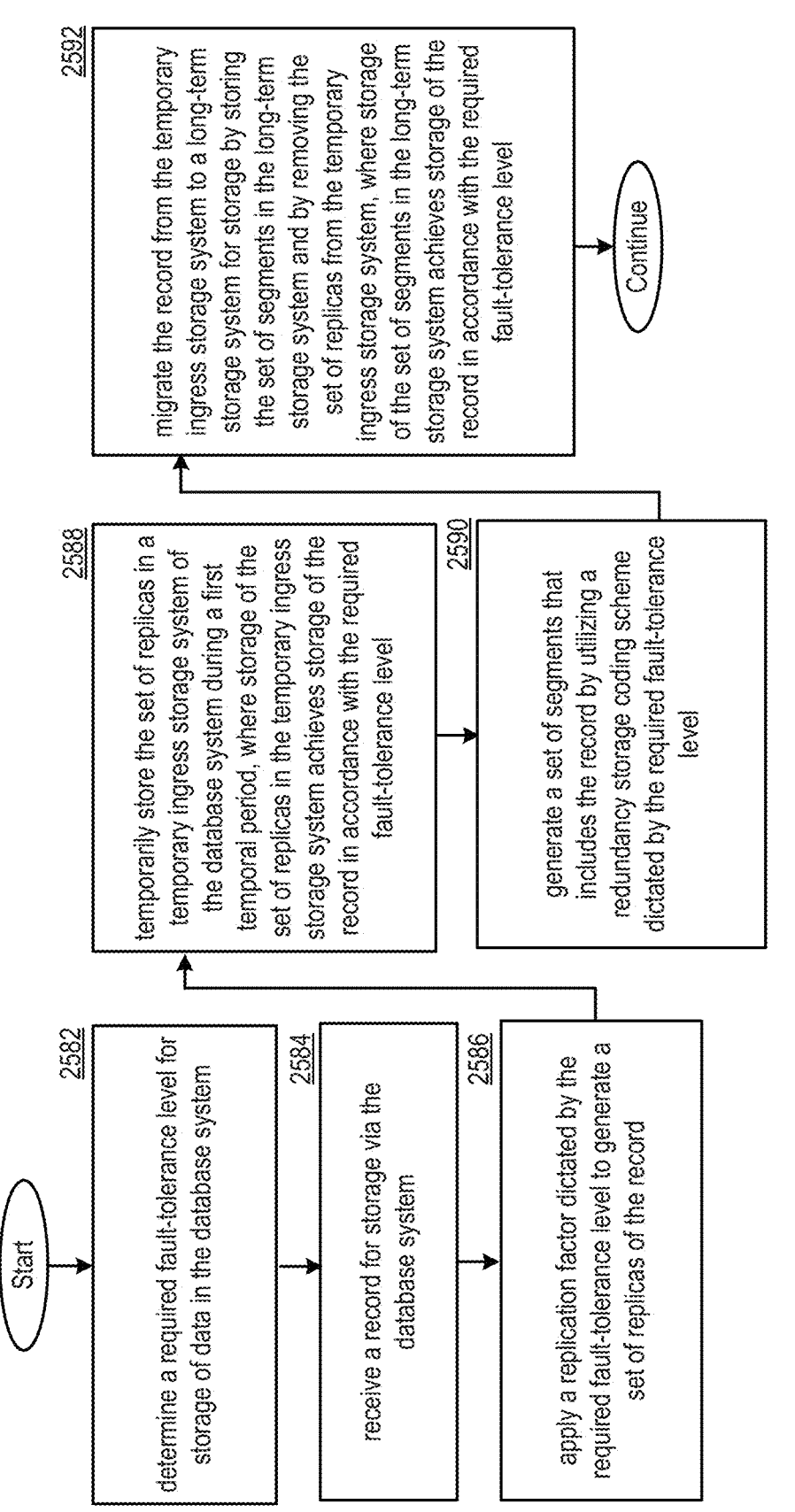

2582 determine a required fault-tolerance level for storage of data in the database system

2584 receive a record for storage via the database system

2586 apply a replication factor dictated by the required fault-tolerance level to generate a set of replicas of the record

2588 temporarily store the set of replicas in a temporary ingress storage system of the database system during a first temporal period, where storage of the set of replicas in the temporary ingress storage system achieves storage of the record in accordance with the required fault-tolerance level

2590 generate a set of segments that includes the record by utilizing a redundancy storage coding scheme dictated by the required fault-tolerance level

2592 migrate the record from the temporary ingress storage system to a long-term storage system for storage by storing the set of segments in the long-term storage system and by removing the set of replicas from the temporary ingress storage system, where storage of the set of segments in the long-term storage system achieves storage of the record in accordance with the required fault-tolerance level Continue

FIG. 25D

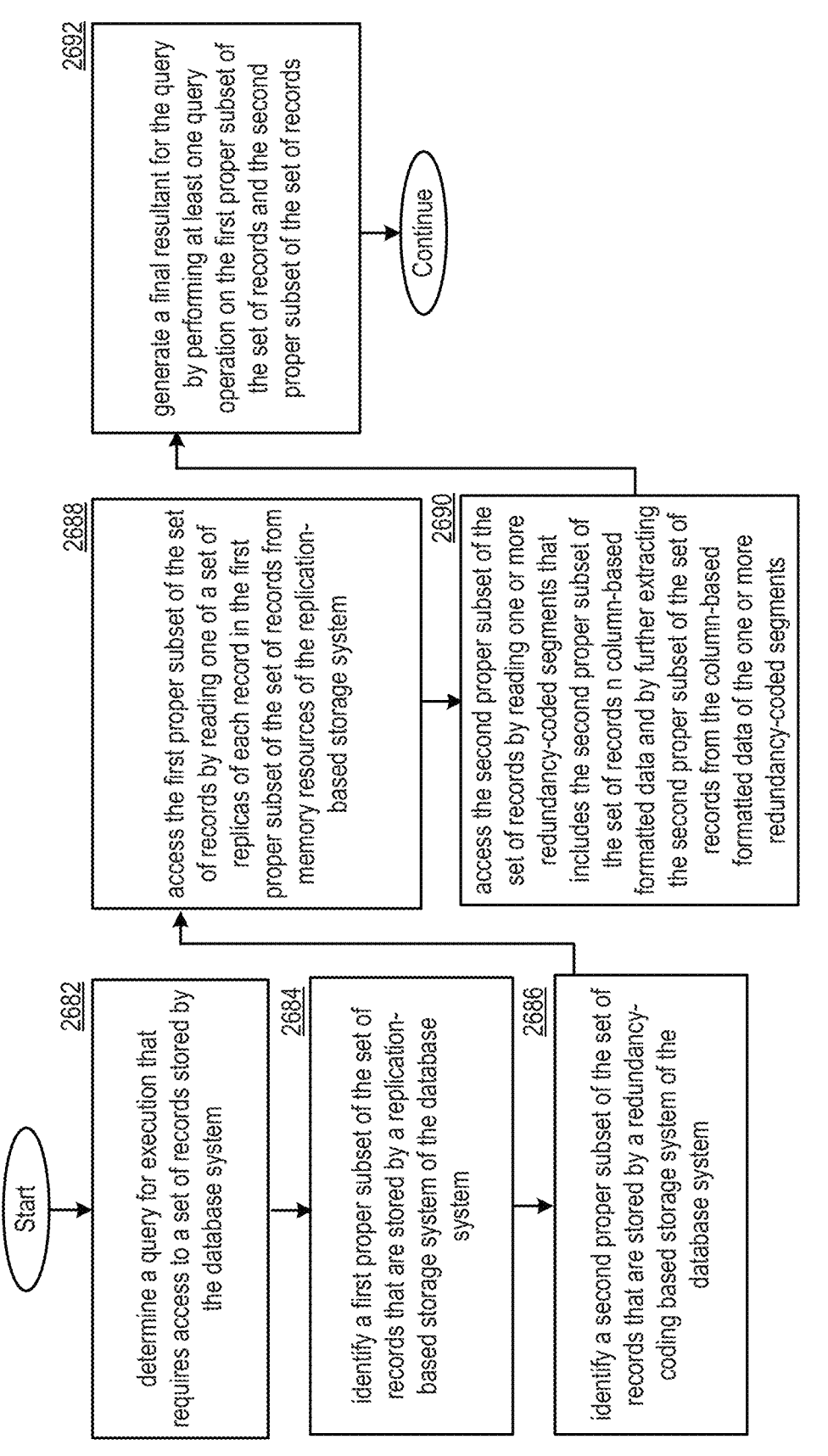

2682 determine a query for execution that requires access to a set of records stored by the database system

2684 identify a first proper subset of the set of records that are stored by a replication-based storage system of the database system

2686 identify a second proper subset of the set of records that are stored by a redundancy-coding based storage system of the database system

2688 access the first proper subset of the set of records by reading one of a set of replicas of each record in the first proper subset of the set of records from memory resources of the replication-based storage system

2690 access the second proper subset of the set of records by reading one or more redundancy-coded segments that includes the second proper subset of the set of records n column-based formatted data and by further extracting the second proper subset of the set of records from the column-based formatted data of the one or more redundancy-coded segments

2692 generate a final resultant for the query by performing at least one query operation on the first proper subset of the set of records and the second proper subset of the set of records Continue

FIG. 26B

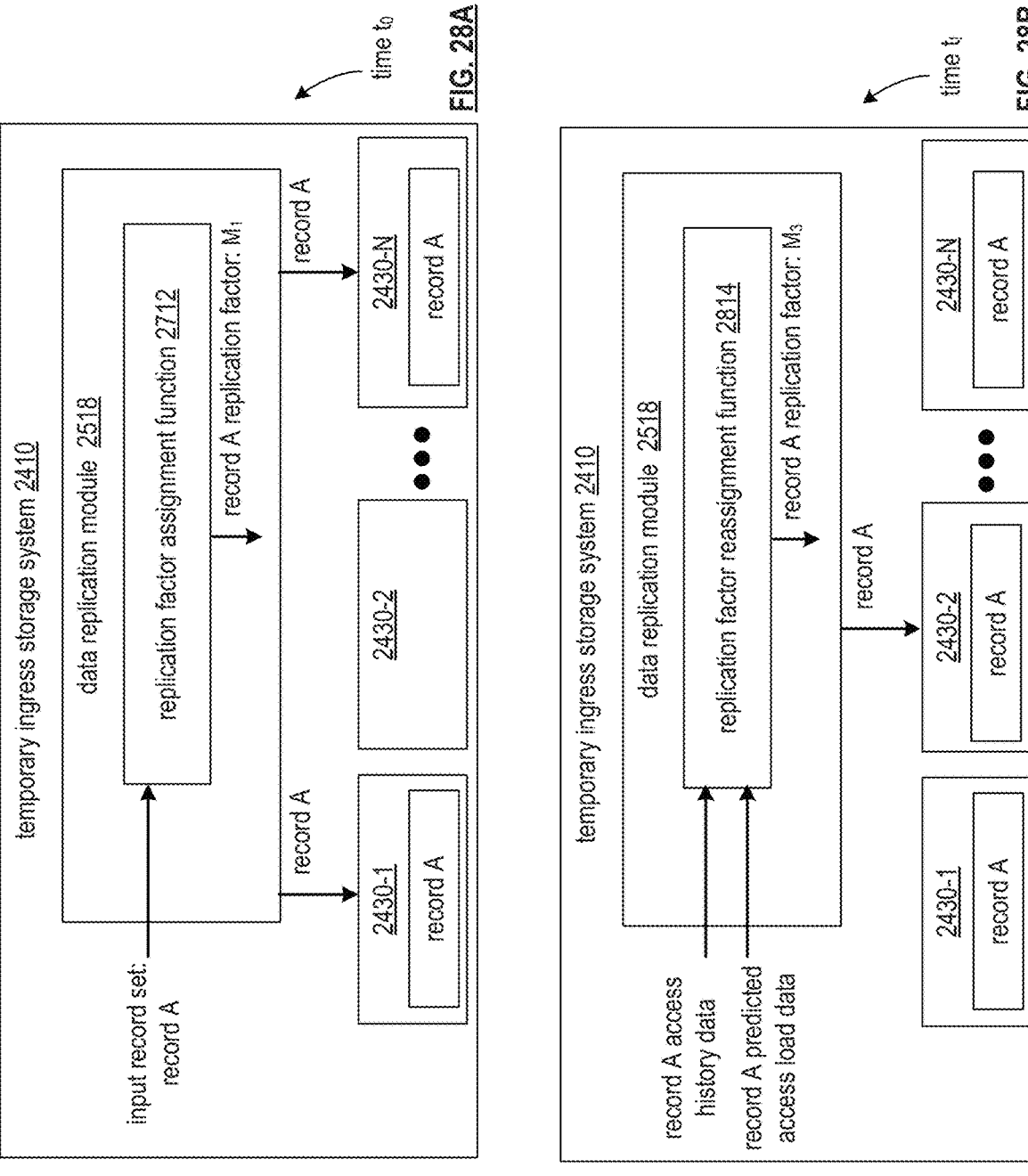

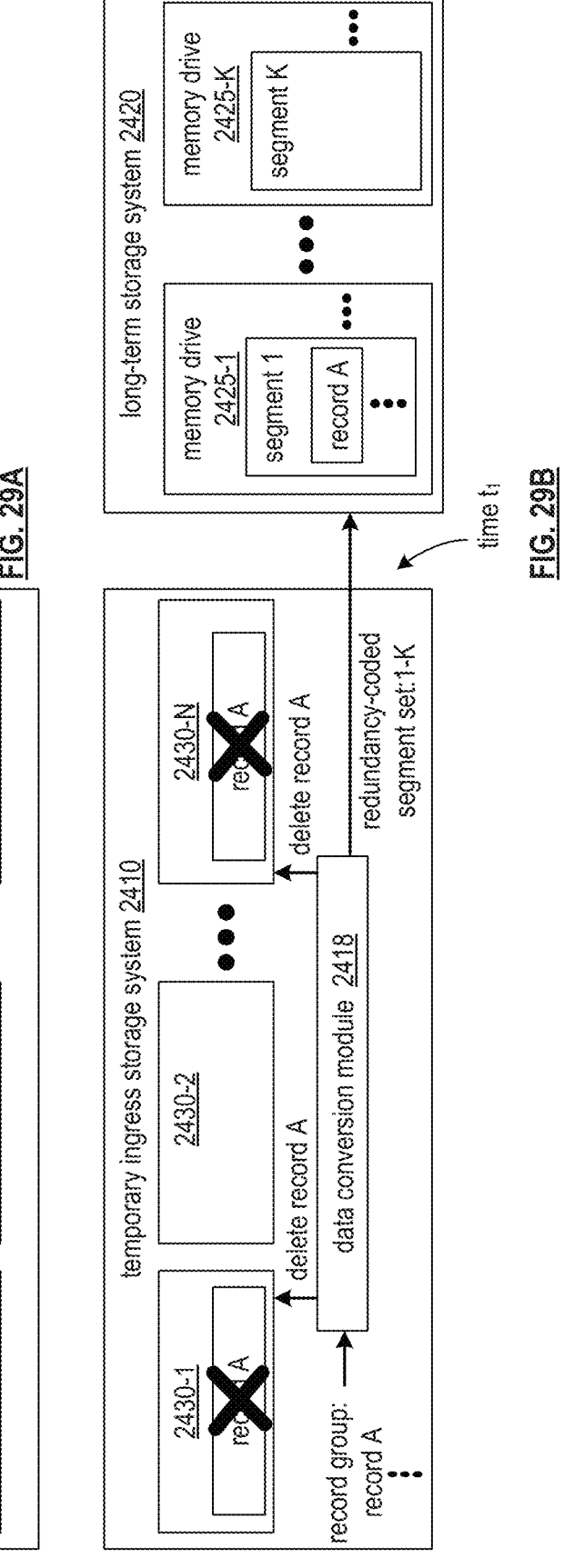

database
system 10

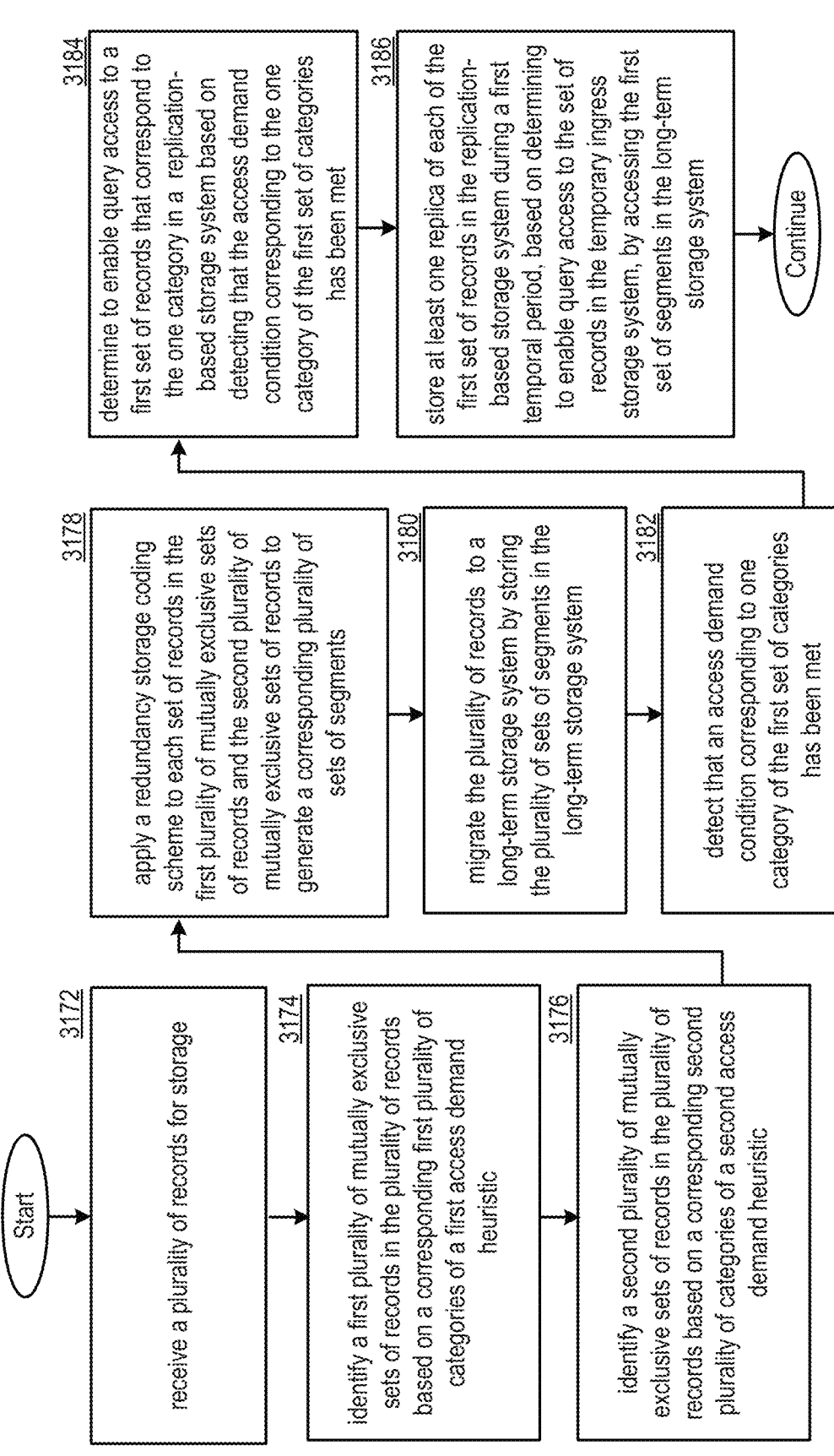

3172 receive a plurality of records for storage 3174 identify a first plurality of mutually exclusive sets of records in the plurality of records based on a corresponding first plurality of categories of a first access demand heuristic 3176 identify a second plurality of mutually exclusive sets of records in the plurality of records based on a corresponding second plurality of categories of a second access demand heuristic 3178 apply a redundancy storage coding scheme to each set of records in the first plurality of mutually exclusive sets of records and the second plurality of mutually exclusive sets of records to generate a corresponding plurality of sets of segments 3180 migrate the plurality of records to a long-term storage system by storing the plurality of sets of segments in the long-term storage system 3182 detect that an access demand condition corresponding to one category of the first set of categories has been met 3184 determine to enable query access to a first set of records that correspond to the one category in a replication-based storage system based on detecting that the access demand condition corresponding to the one category of the first set of categories has been met 3186 store at least one replica of each of the first set of records in the replication-based storage system during a first temporal period, based on determining to enable query access to the set of records in the temporary ingress storage system, by accessing the first set of segments in the long-term storage system Continue

FIG. 31B temporary ingress storage system
2410

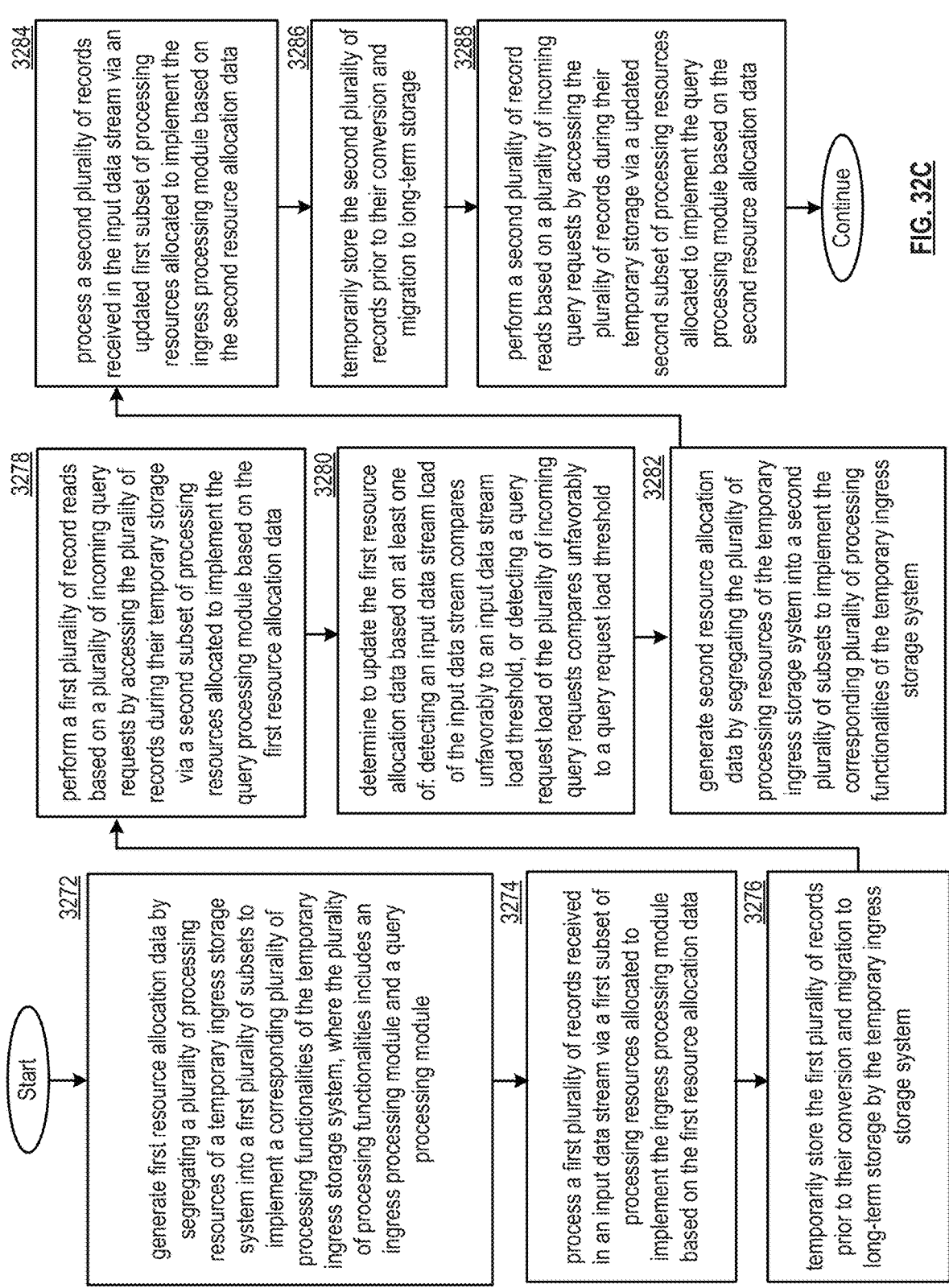

3284 process a second plurality of records received in the input data stream via an updated first subset of processing resources allocated to implement the ingress processing module based on the second resource allocation data

3286 temporarily store the second plurality of records prior to their conversion and migration to long-term storage

3288 perform a second plurality of record reads based on a plurality of incoming query requests by accessing the plurality of records during their temporary storage via a updated second subset of processing resources allocated to implement the query processing module based on the second resource allocation data Continue

3278 perform a first plurality of record reads based on a plurality of incoming query requests by accessing the plurality of records during their temporary storage via a second subset of processing resources allocated to implement the query processing module based on the first resource allocation data

3280 determine to update the first resource allocation data based on at least one of: detecting an input data stream load of the input data stream compares unfavorably to an input data stream load threshold, or detecting a query request load of the plurality of incoming query requests compares unfavorably to a query request load threshold

3282 generate second resource allocation data by segregating the plurality of processing resources of the temporary ingress storage system into a second plurality of subsets to implement the corresponding plurality of processing functionalities of the temporary ingress storage system Start

3272 generate first resource allocation data by segregating a plurality of processing resources of a temporary ingress storage system into a first plurality of subsets to implement a corresponding plurality of processing functionalities of the temporary ingress storage system, where the plurality of processing functionalities includes an ingress processing module and a query processing module

3274 process a first plurality of records received in an input data stream via a first subset of processing resources allocated to implement the ingress processing module based on the first resource allocation data

3276 temporarily store the first plurality of records prior to their conversion and migration to long-term storage by the temporary ingress storage system

FIG. 32C

DATABASE SYSTEM WITH REPLICATION BASED STORAGE AND REDUNDANCY CODING BASED STORAGE

CROSS-REFERENCE TO RELATED APPLICATIONS

The present U.S. Utility Patent Application claims priority pursuant to 35 U.S.C. § 120 as a continuation of U.S. Utility application Ser. No. 18/165,431, entitled "ACCESSING BOTH REPLICATION BASED STORAGE AND REDUNDANCY CODING BASED STORAGE FOR QUERY EXECUTION", filed Feb. 7, 2023, which is a continuation of U.S. Utility application Ser. No. 16/829,554, entitled "SERVICING QUERIES DURING DATA INGRESS", filed Mar. 25, 2020, issued as U.S. Pat. No. 11,599,463 on Mar. 7, 2023, each of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIGS. 15-23 are schematic block diagrams of an example of processing a table or data set for storage in the database system in accordance with the present invention:

FIG. 24F is a schematic block diagram of a database system that includes a temporary ingress storage system, a long-term storage system, and a query processing module in accordance with various embodiments of the present invention;

FIG. 24I is a schematic block diagram of a query processing module that implements a query execution plan via a plurality of nodes in accordance with various embodiments of the present invention:

FIGS. 24O and 24P are logic diagrams illustrating a method of servicing queries during data ingress in accordance with various embodiments of the present invention:

FIG. 25D is a logic diagram illustrating a method of both replicating records during data ingress and utilizing redundancy storage coding scheme for migration to long-term storage in accordance with a required level of fault-tolerance in accordance with various embodiments of the present invention:

FIG. 26B is a logic diagram illustrating a method of utilizing records stored in a replicated-based storage system and records stored in a redundancy-coding based storage system to service queries in accordance with various embodiments of the present invention:

FIGS. 28A-28B are schematic block diagrams of a temporary ingress storage system that implements a data replication reassignment module to change the replication factor of replicated records in temporary storage in accordance with various embodiments of the present invention:

FIGS. 29A-29C are schematic block diagrams of a temporary ingress storage system that implements a data reinstatement assessment module to reinstate records stored in long-term storage for storage as replicated records in accordance with various embodiments of the present invention:

FIG. 31B is a logic diagram illustrating a method of generating segments for long-term storage based on applying heuristic categorization data in accordance with various embodiments of the present invention;

FIG. 32C is a logic diagram illustrating a method of allocating processing resources of a database system in accordance with various embodiments of the present invention:

DETAILED DESCRIPTION OF THE INVENTION

Figure 1:
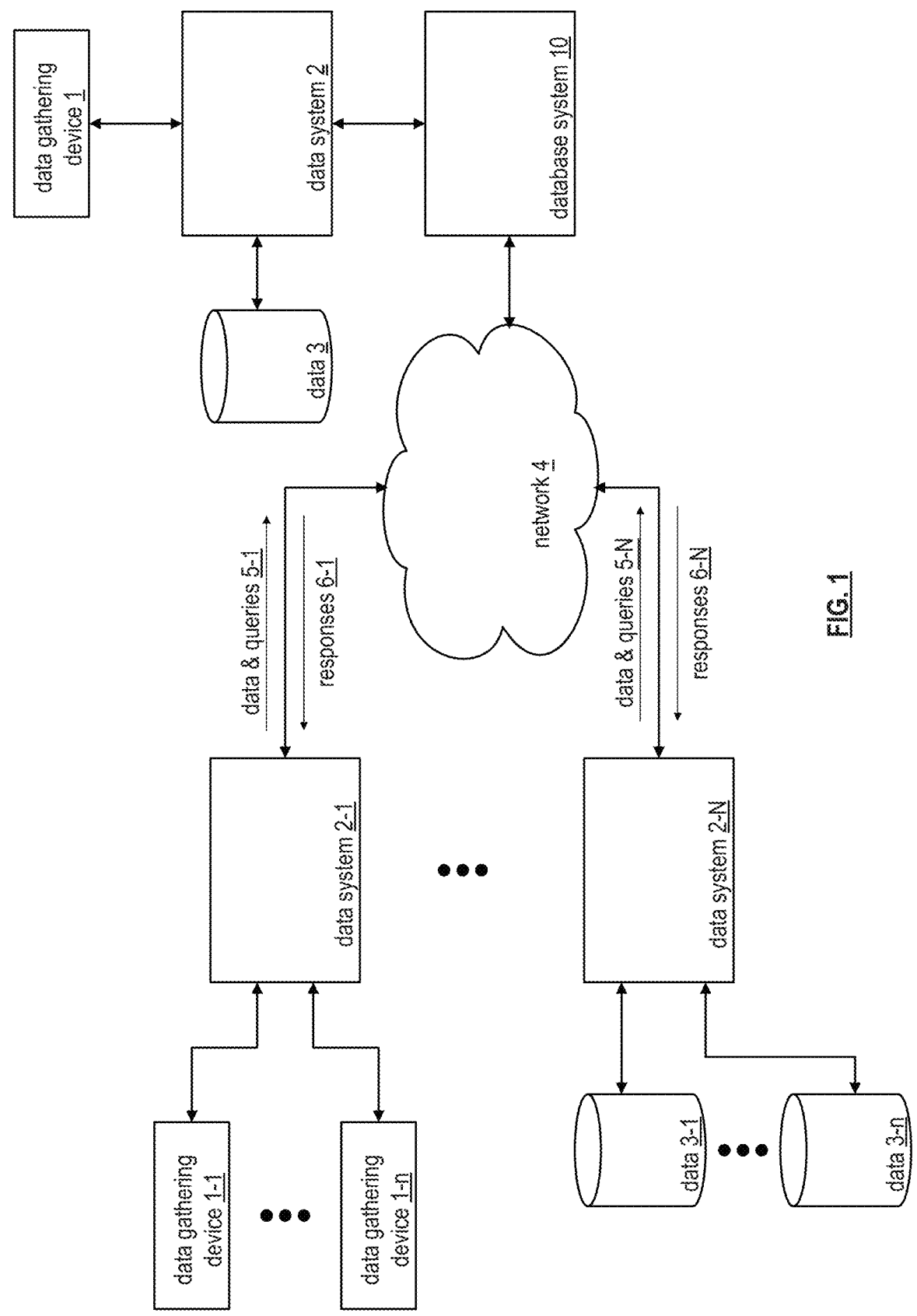
FIG. 1 is a schematic block diagram of an embodiment of a large scale data processing network that includes a database system in accordance with the present invention.

FIG. 1 is a schematic block diagram of an embodiment of a large-scale data processing network that includes data gathering devices (1, 1-1 through 1-n), data systems (2, 2-1 through 2-N), data storage systems (3, 3-1 through 3-n), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
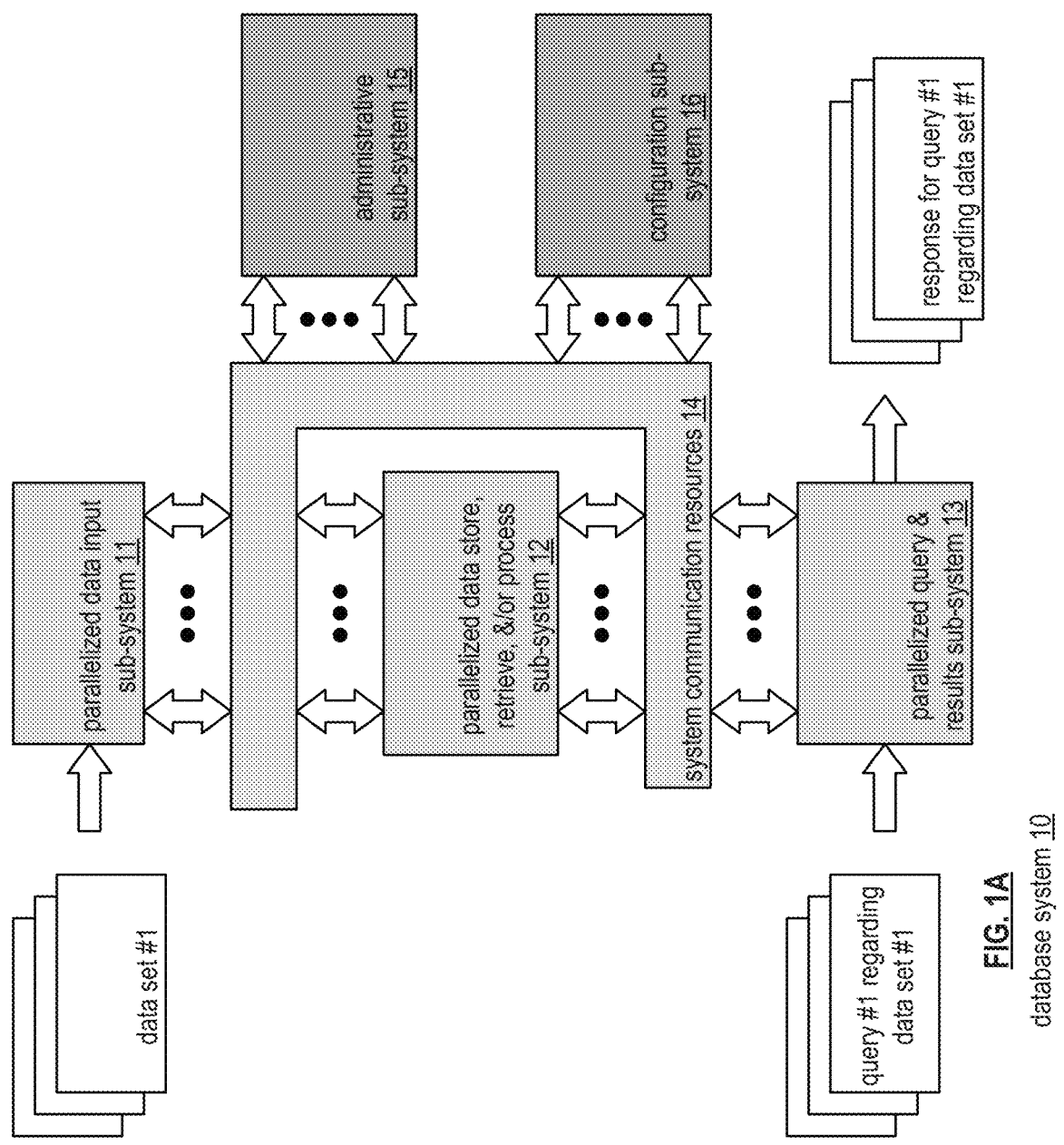
FIG. 1A is a schematic block diagram of an embodiment of a database system in accordance with the present invention.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices: an example of which is discussed with reference to one or more of FIGS. 7-9. Hereafter, the parallelized data input sub-system 11 may be also be referred to as a data input sub-system, the parallelized data store, retrieve, and/or process sub-system may be also be referred to as a data storage and processing sub-system, and the parallelized query and response sub-system 13 may be also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table include payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches divide a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Standard Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figures 2, 3:
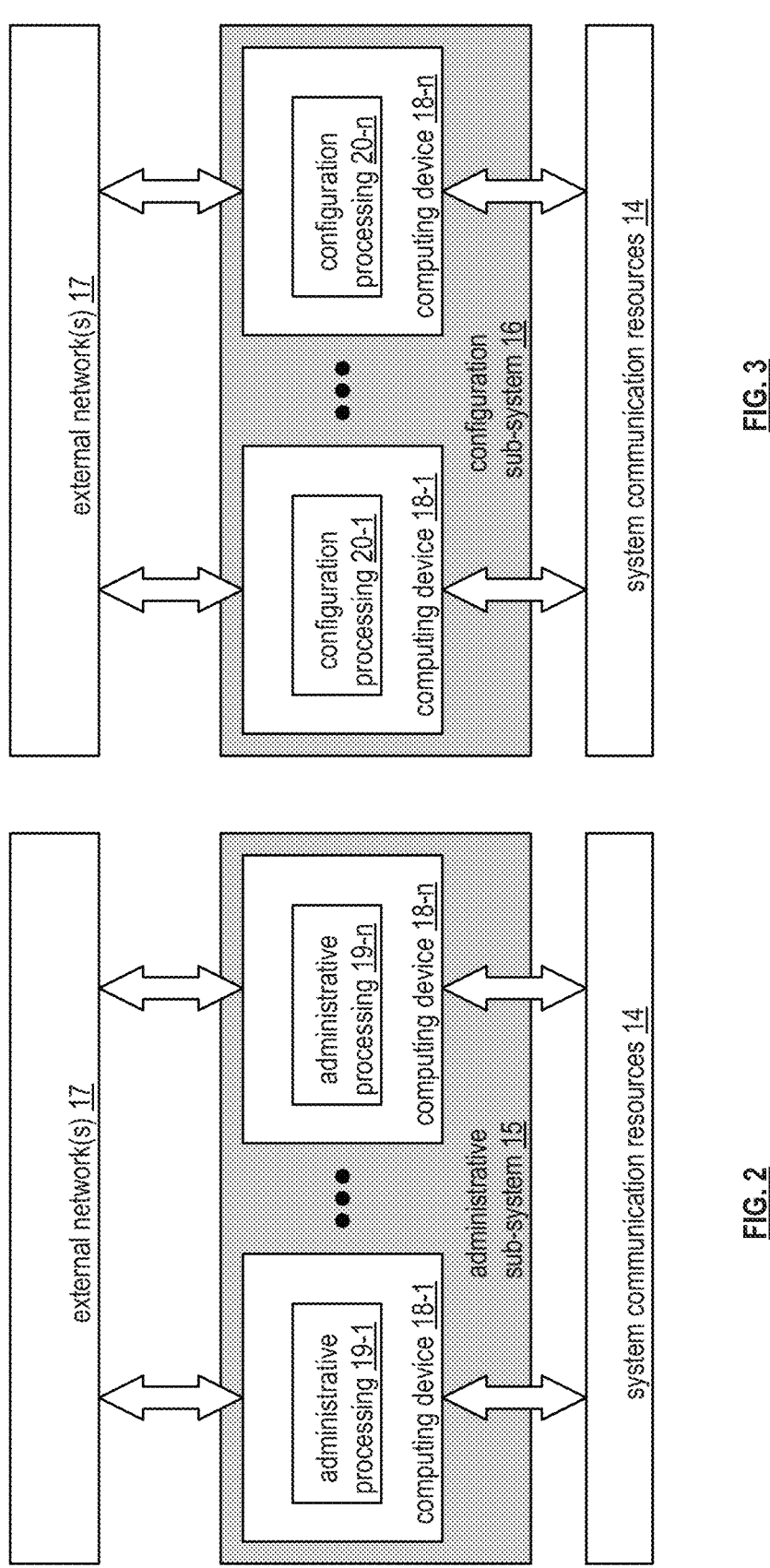
FIG. 2 is a schematic block diagram of an embodiment of an administrative sub-system in accordance with the present invention.
FIG. 3 is a schematic block diagram of an embodiment of a configuration sub-system in accordance with the present invention.

FIG. 2 is a schematic block diagram of an embodiment of the administrative sub-system 15 of FIG. 1A that includes one or more computing devices 18-1 through 18-$n$. Each of the computing devices executes an administrative processing function utilizing a corresponding administrative processing of administrative processing 19-1 through 19-$n$ (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

FIG. 3 is a schematic block diagram of an embodiment of the configuration sub-system 16 of FIG. 1A that includes one or more computing devices 18-1 through 18-$n$. Each of the computing devices executes a configuration processing function 20-1 through 20-$n$ (which includes a plurality of configuration operations) that coordinates system level configurations of the database system. Each computing device is coupled to the external network 17 of FIG. 2, or networks, and to the system communication resources 14 of FIG. 1A.

Figure 4:
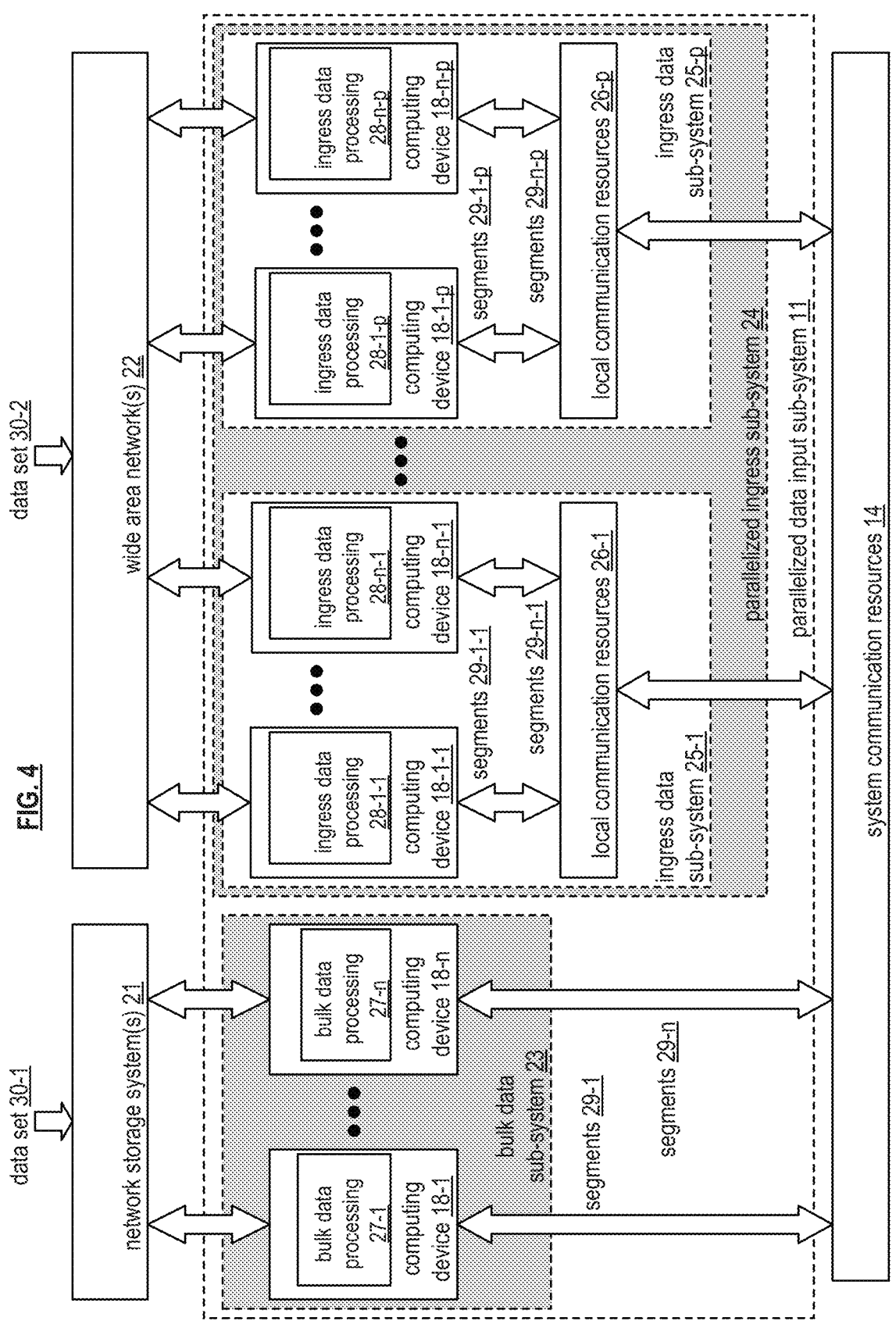
FIG. 4 is a schematic block diagram of an embodiment of a parallelized data input sub-system in accordance with the present invention.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-$n$. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-$p$ that each include a local communication resource of local communication resources 26-1 through 26-$p$ and a plurality of computing devices 18-1 through 18-$n$. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-$p$, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
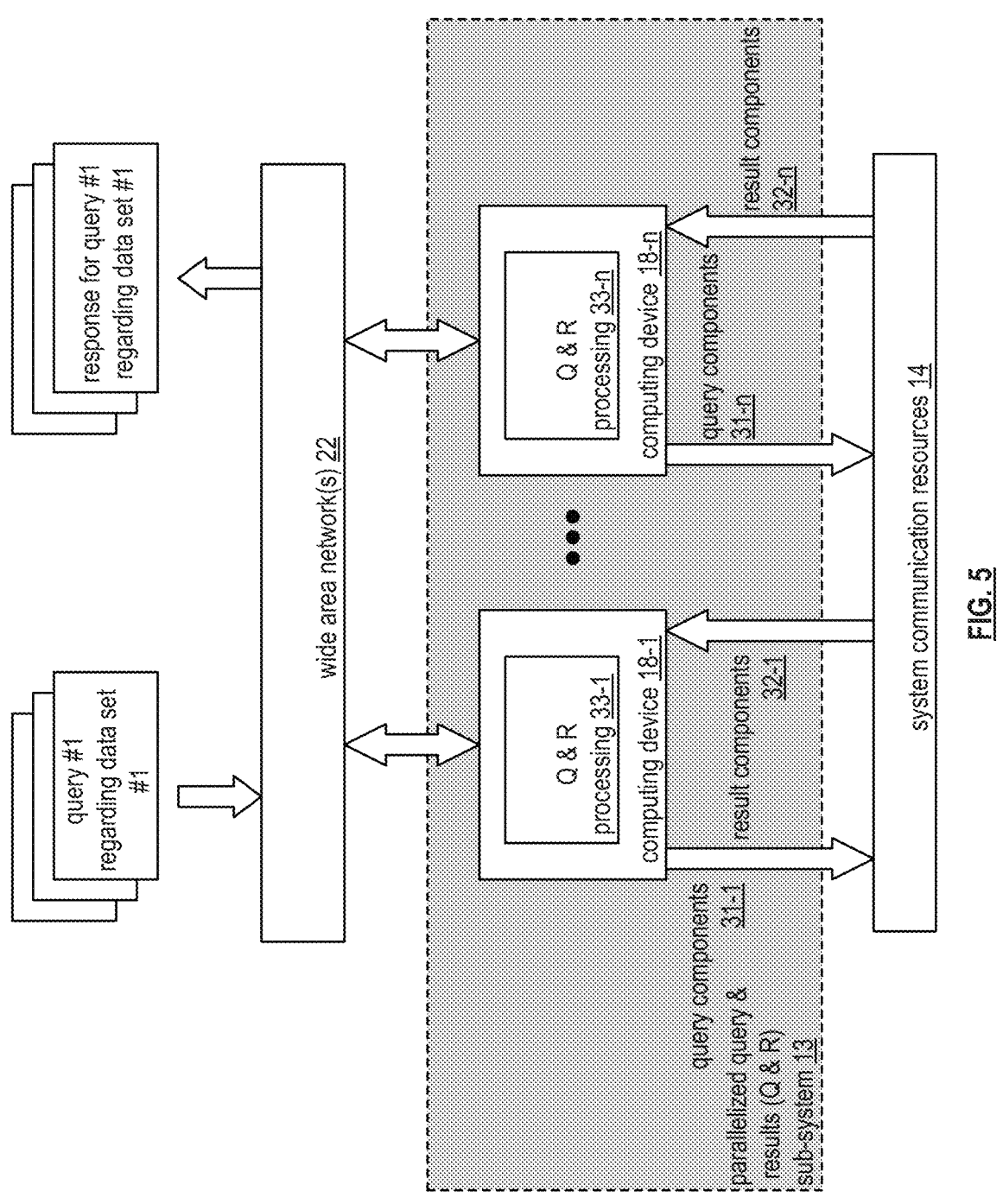
FIG. 5 is a schematic block diagram of an embodiment of a parallelized query and response (Q&R) sub-system in accordance with the present invention.

FIG. 5 is a schematic block diagram of an embodiment of a parallelized query and results sub-system 13 that includes a plurality of computing devices 18-1 through 18-n. Each of the computing devices executes a query (Q) & response (R) processing function 33-1 through 33-n. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-n. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
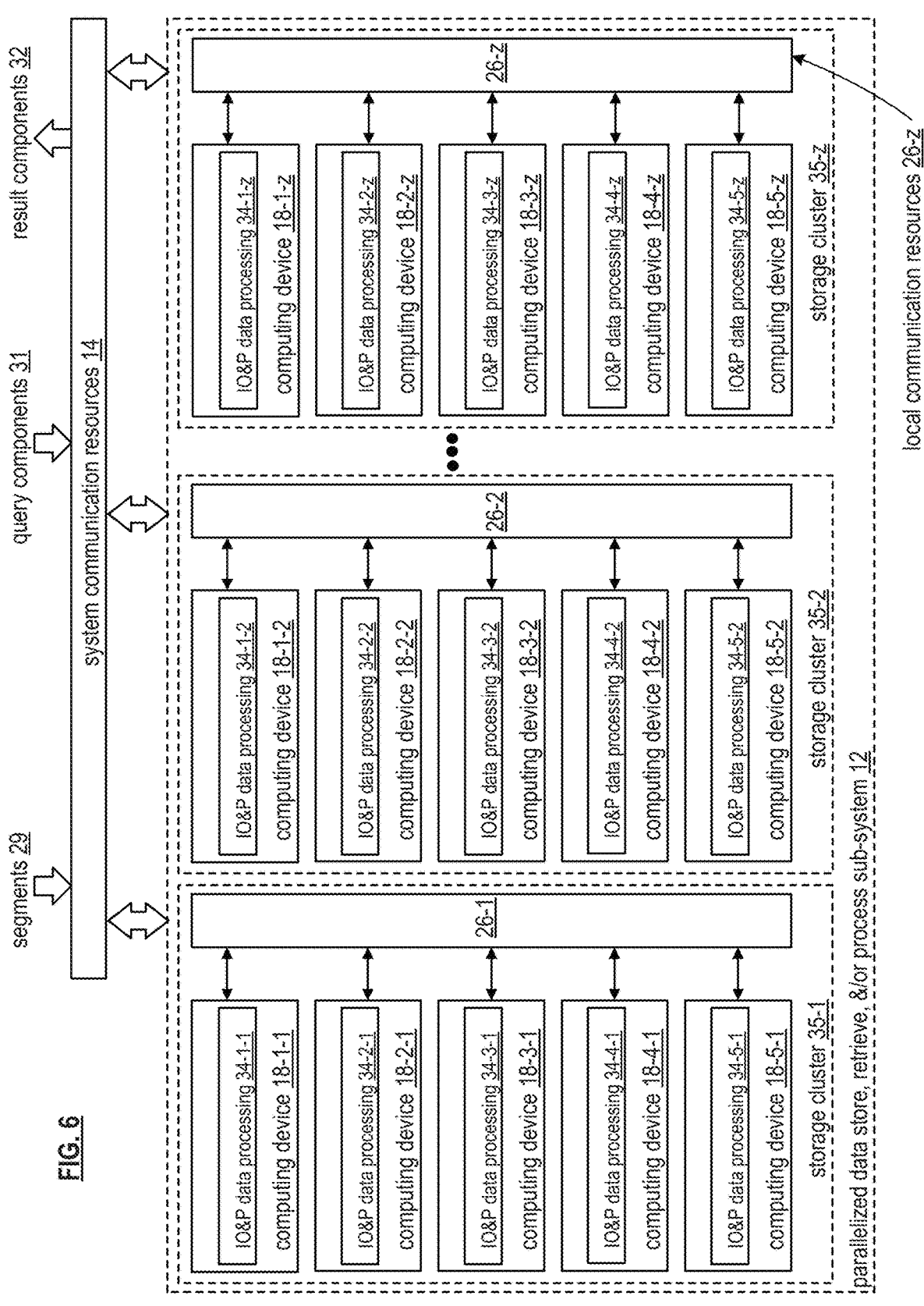
FIG. 6 is a schematic block diagram of an embodiment of a parallelized data store, retrieve, and/or process (IO& P) sub-system in accordance with the present invention.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-z. Each storage cluster includes a corresponding local communication resource 26-1 through 26-z and a number of computing devices 18-1 through 18-5. Each computing device executes an input, output, and processing (IO &P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group: a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-n are storing and/or processing other segment groups. For example, a table is partitioned into three segment groups. Three storage clusters store and/or process the three segment groups independently. As another example, four tables are independently storage and/or processed by one or more storage clusters. As yet another example, storage cluster 35-1 is storing and/or processing a second segment group while it is storing/or and processing a first segment group.

Figure 7:
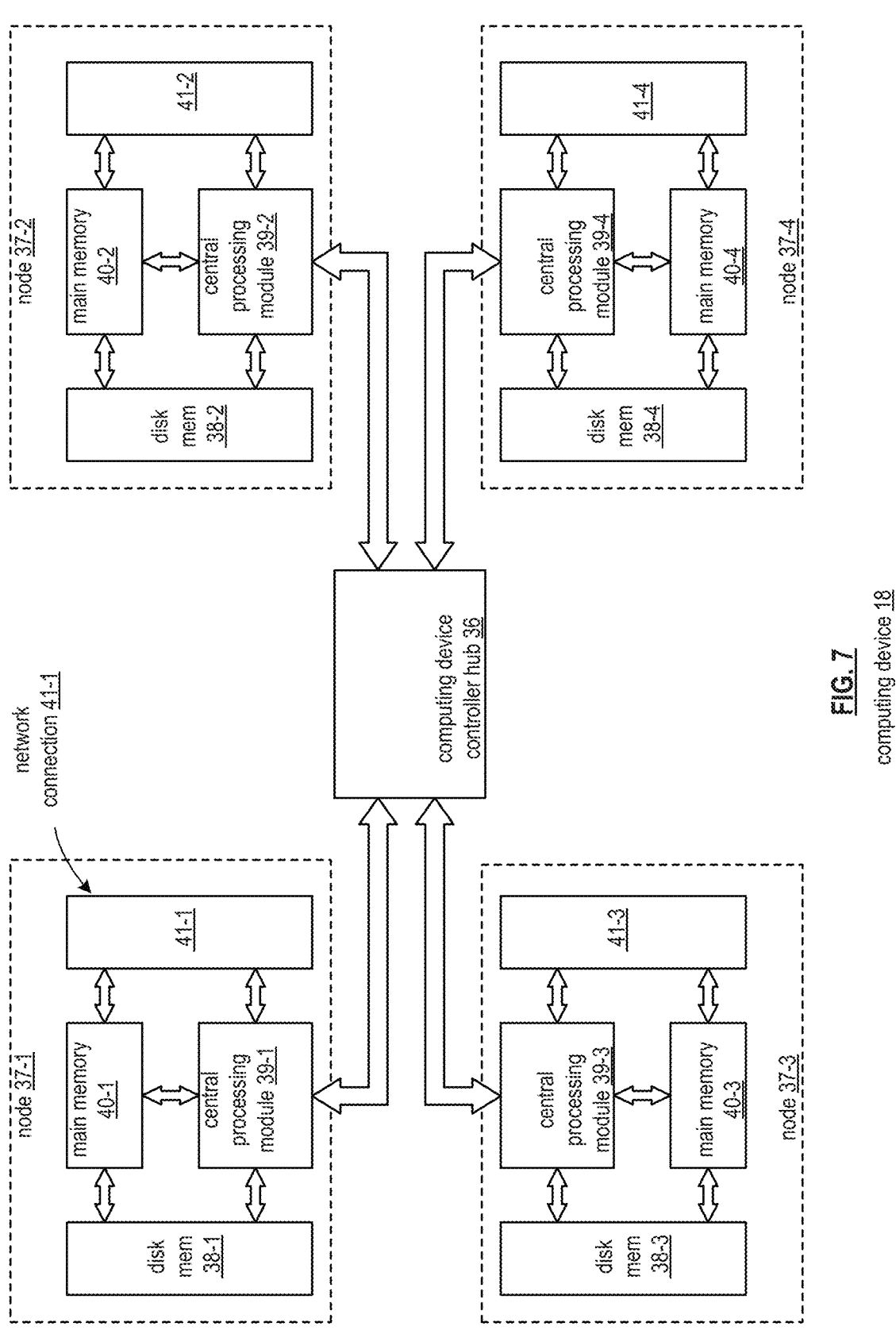
FIG. 7 is a schematic block diagram of an embodiment of a computing device in accordance with the present invention.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
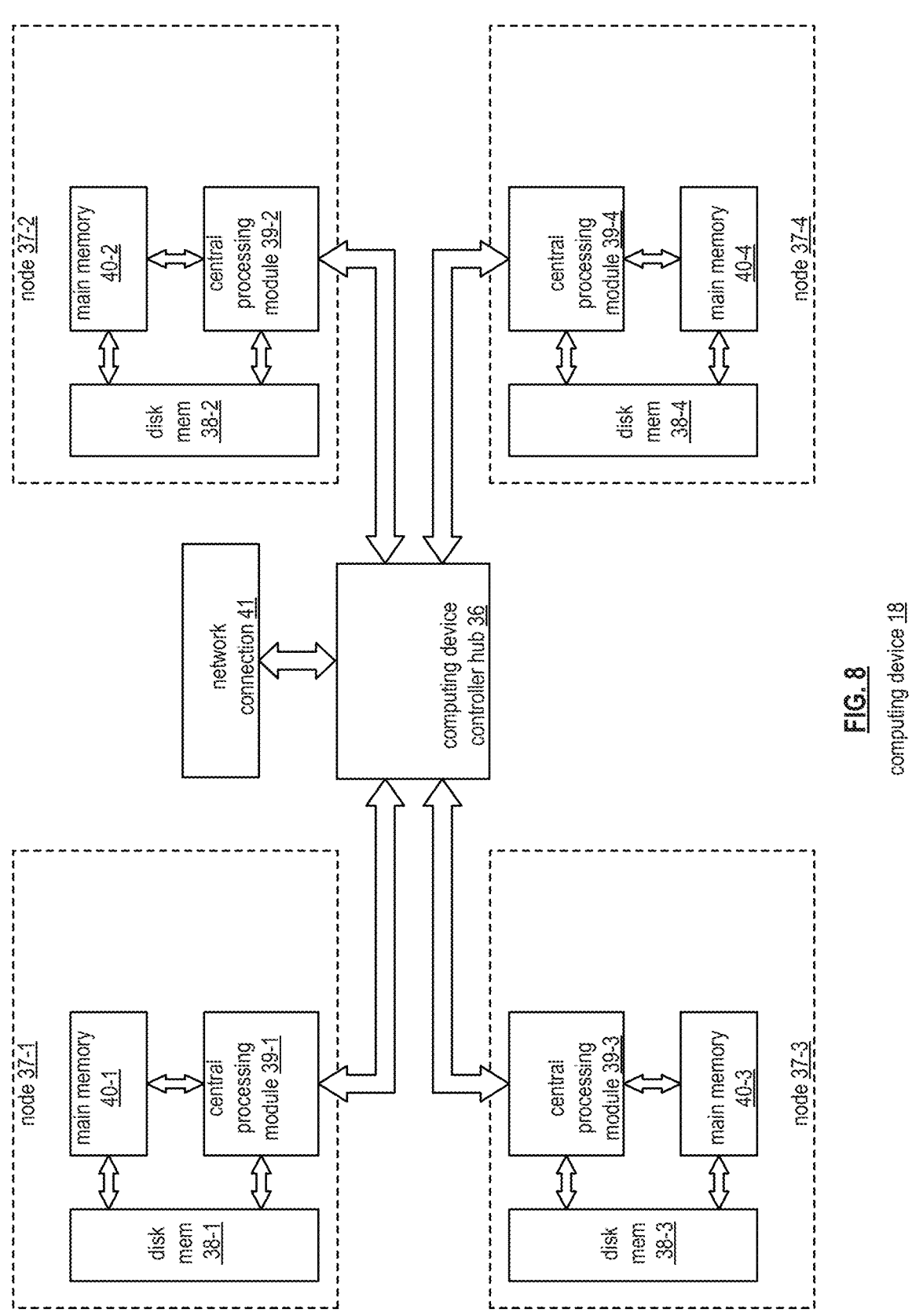
FIG. 8 is a schematic block diagram of another embodiment of a computing device in accordance with the present invention.

FIG. 8 is a schematic block diagram of another embodiment of a computing device is similar to the computing device of FIG. 7 with an exception that it includes a single network connection 41, which is coupled to the computing device controller hub 36. As such, each node coordinates with the computing device controller hub to transmit or receive data via the network connection.

Figure 9:
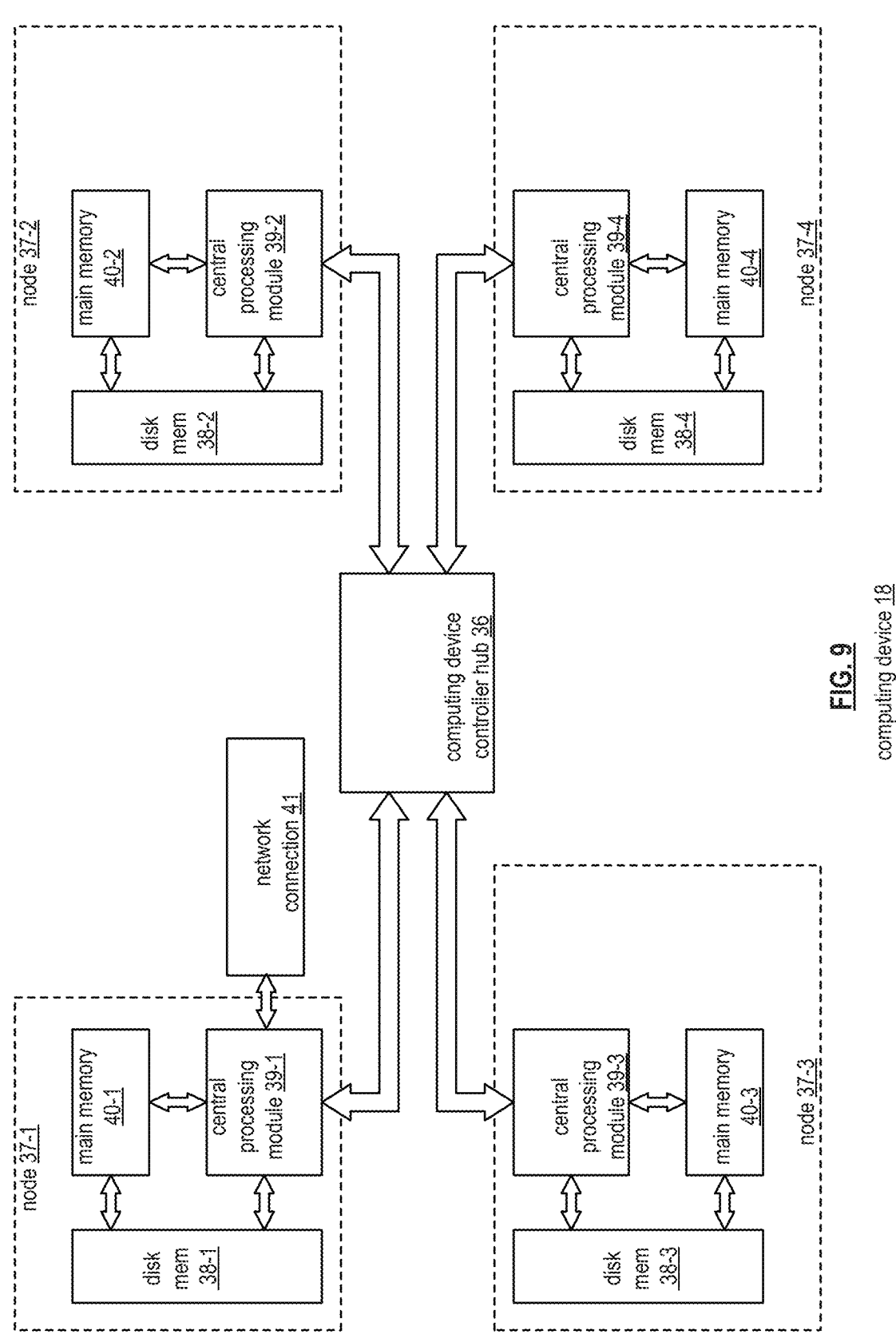
FIG. 9 is a schematic block diagram of another embodiment of a computing device in accordance with the present invention.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
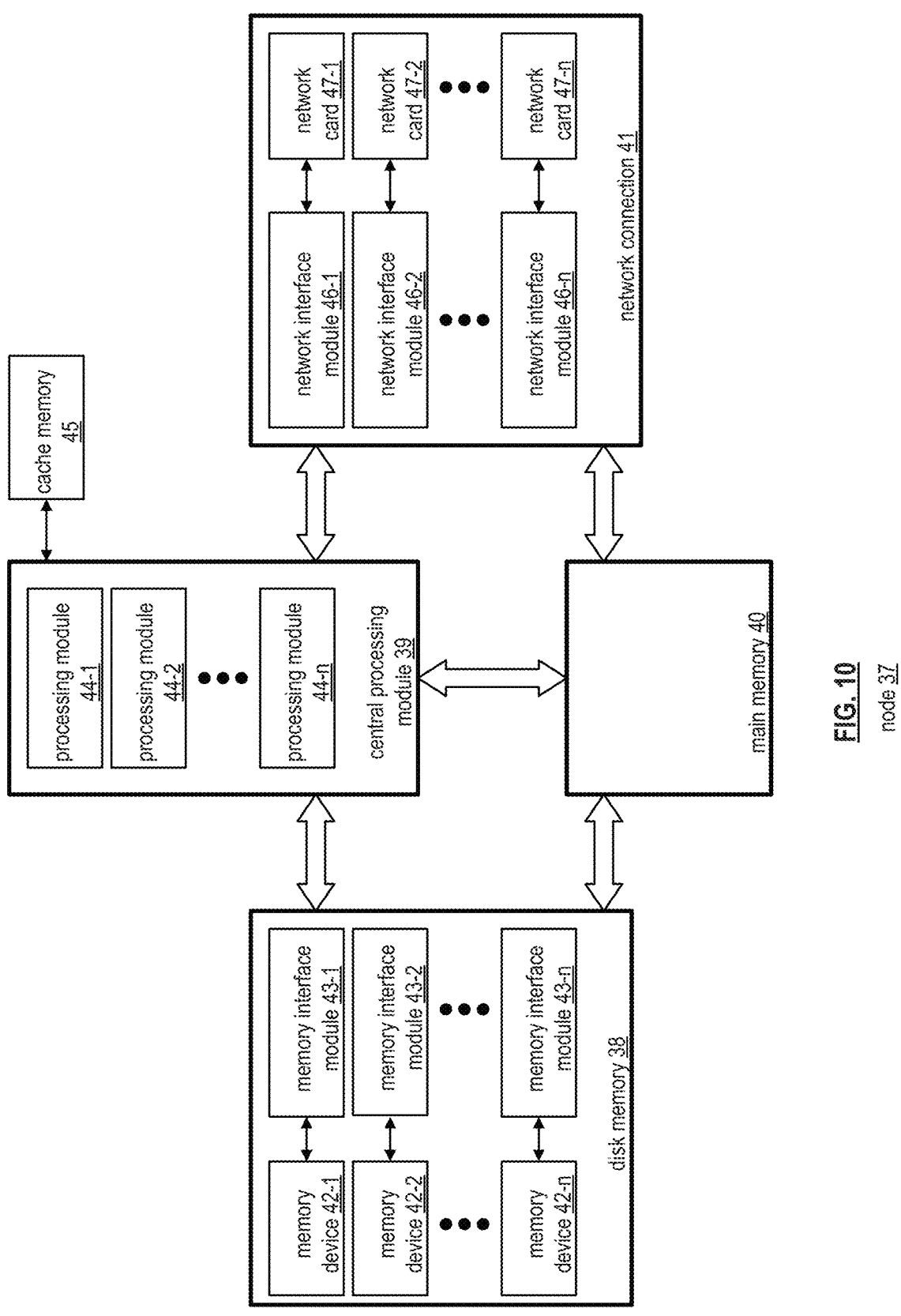
FIG. 10 is a schematic block diagram of an embodiment of a node of a computing device in accordance with the present invention.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-*n* and an associated one or more cache memory 45. A processing module is as defined at the end of the detailed description.

The disk memory 38 includes a plurality of memory interface modules 43-1 through 43-*n* and a plurality of memory devices 42-1 through 42-*n* (e.g., non-volatile memory). The memory devices 42-1 through 42-*n* include, but are not limited to, solid state memory, disk drive memory, cloud storage memory, and other non-volatile memory. For each type of memory device, a different memory interface module 43-1 through 43-*n* is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-*n* and a plurality of network cards 47-1 through 47-*n*. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-*n* include a software driver for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
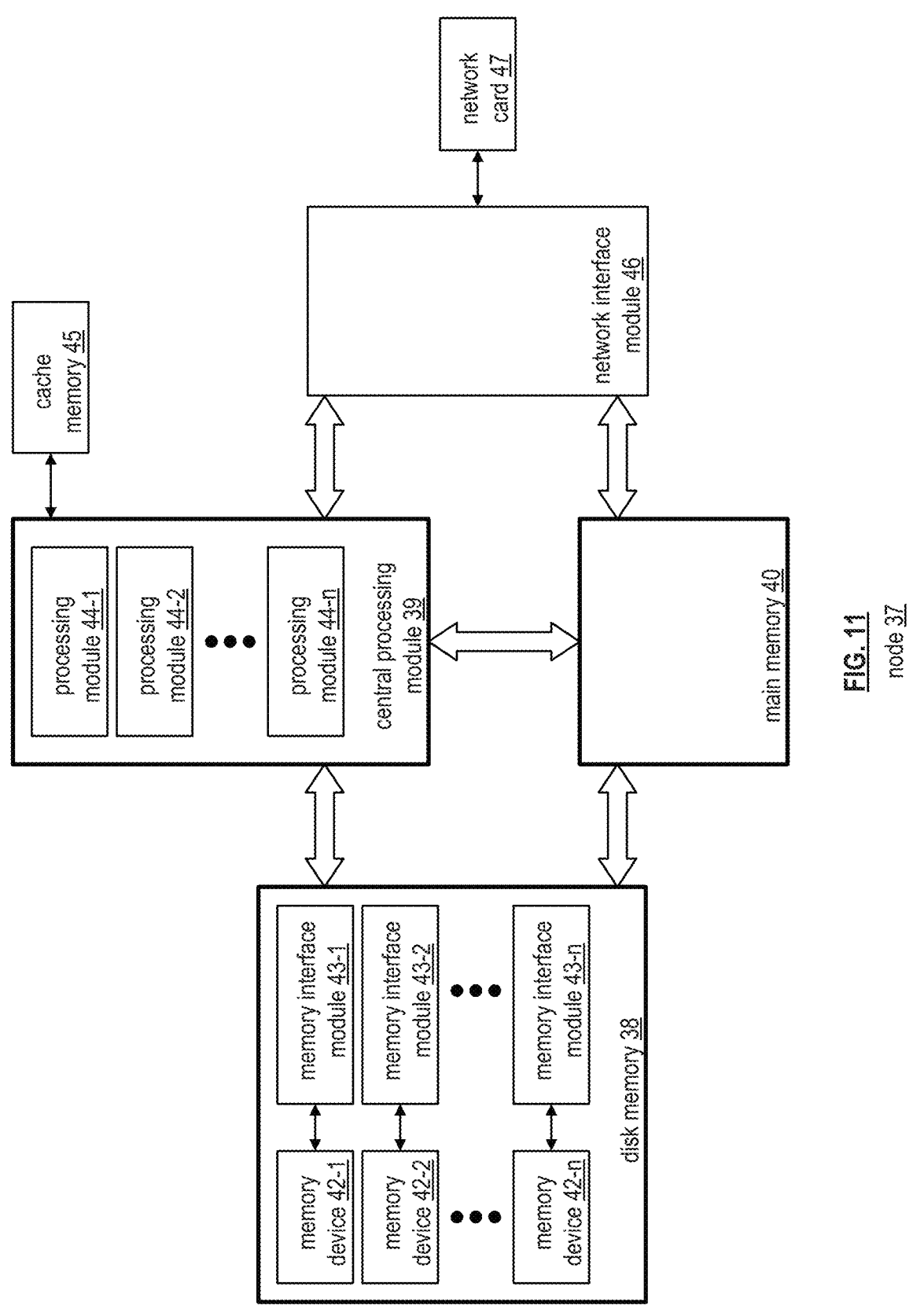
FIG. 11 is a schematic block diagram of an embodiment of a node of a computing device in accordance with the present invention.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
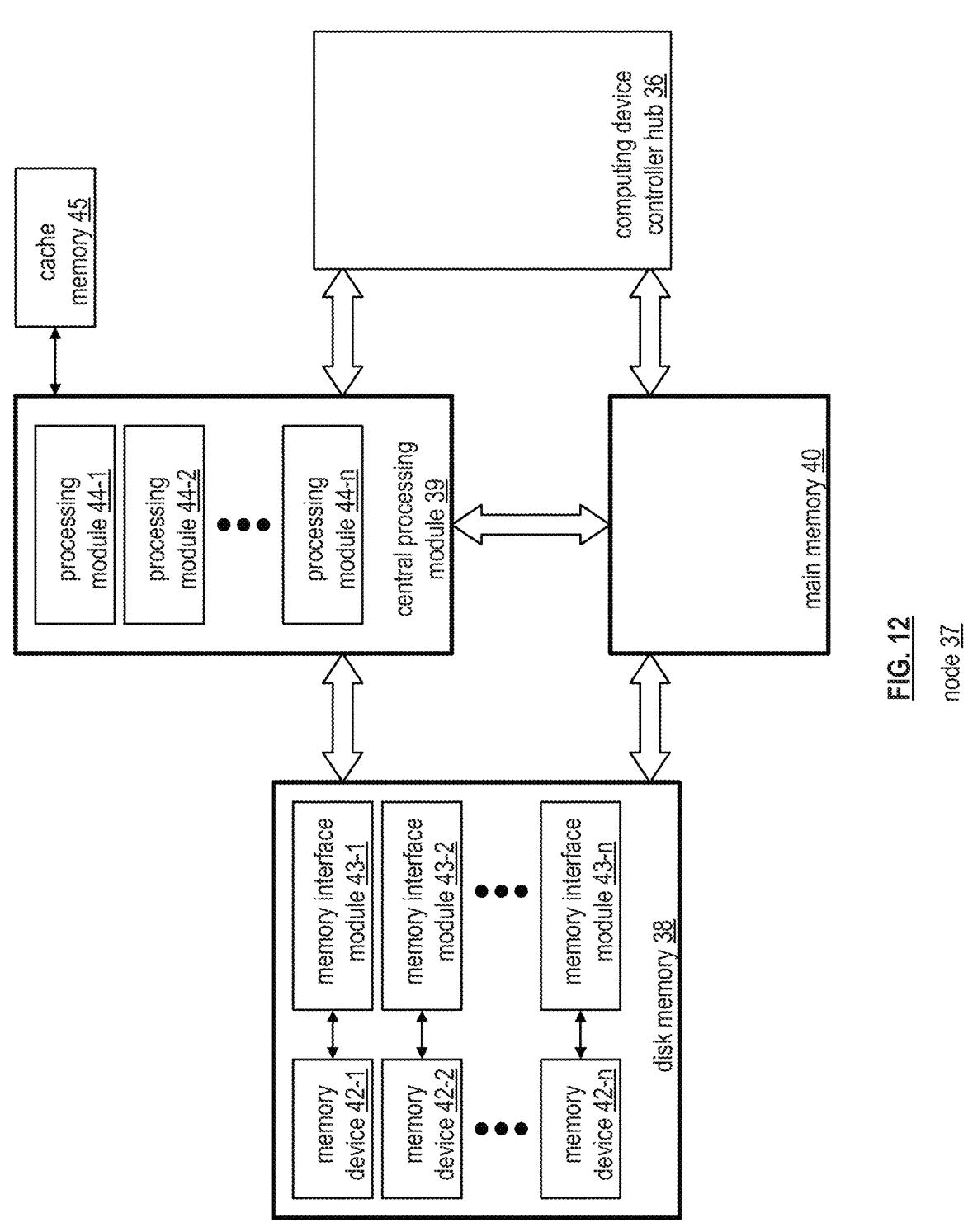
FIG. 12 is a schematic block diagram of an embodiment of a node of a computing device in accordance with the present invention.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
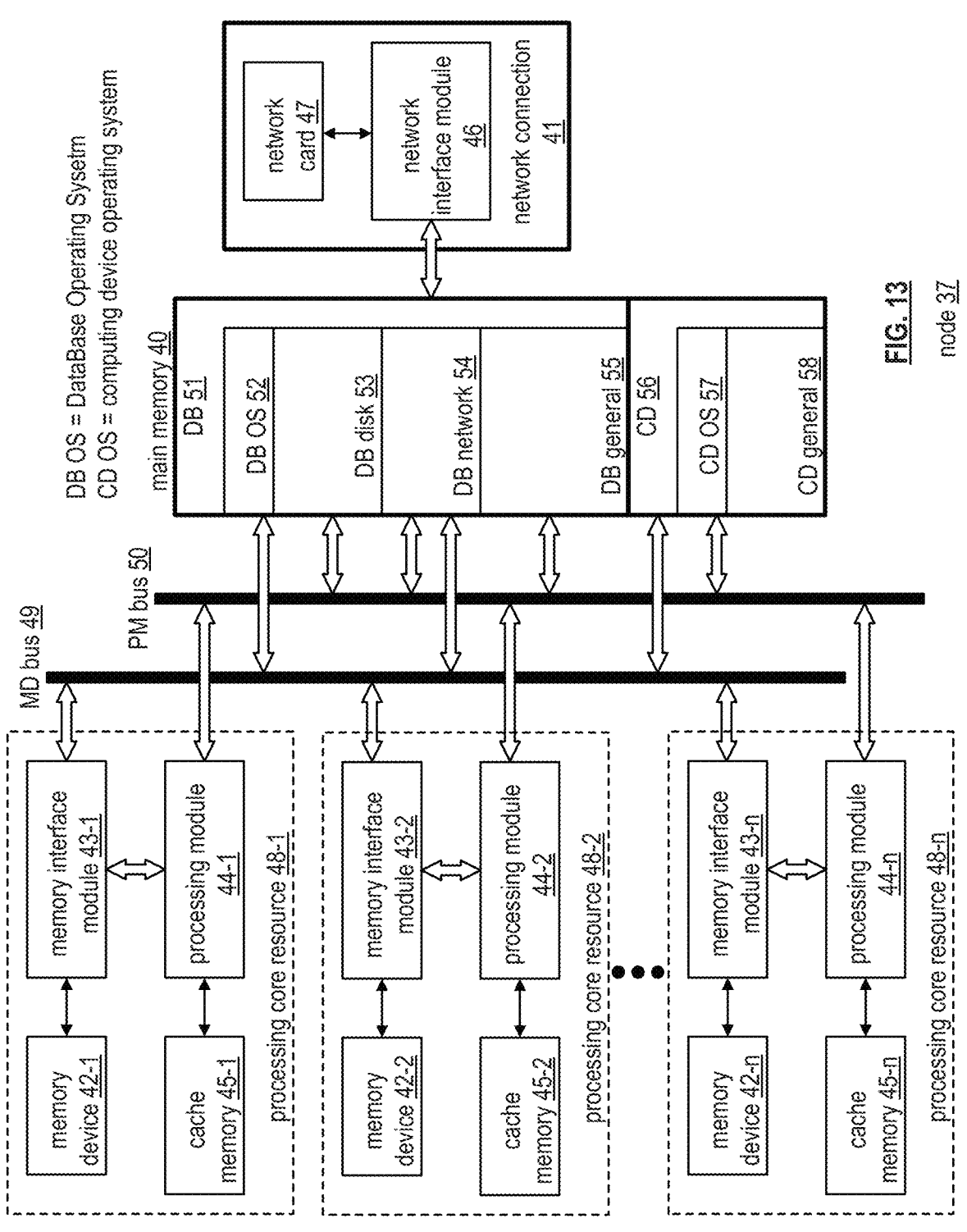
FIG. 13 is a schematic block diagram of an embodiment of a node of a computing device in accordance with the present invention.

FIG. 13 is a schematic block diagram of another embodiment of a node 37 of computing device 18 that includes processing core resources 48-1 through 48-*n*, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-*n*, a corresponding memory interface module 43-1 through 43-*n*, a corresponding memory device 42-1 through 42-*n*, and a corresponding cache memory 45-1 through 45-*n*. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
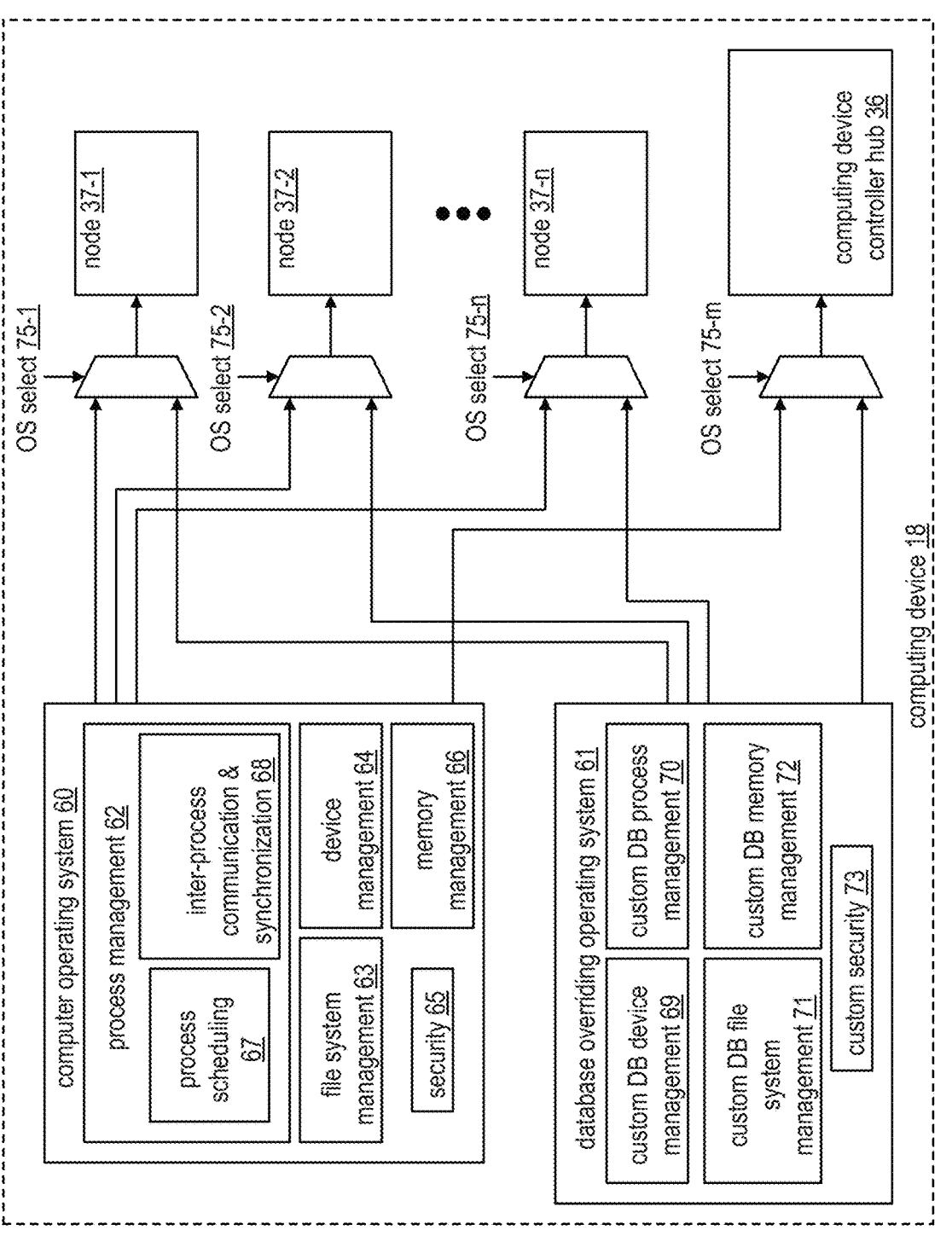
FIG. 14 is a schematic block diagram of an embodiment of operating systems of a computing device in accordance with the present invention.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-*n* when communicating with nodes 37-1 through 37-*n* and via OS select 75-*m* when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

Figure 15:
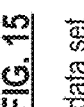

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
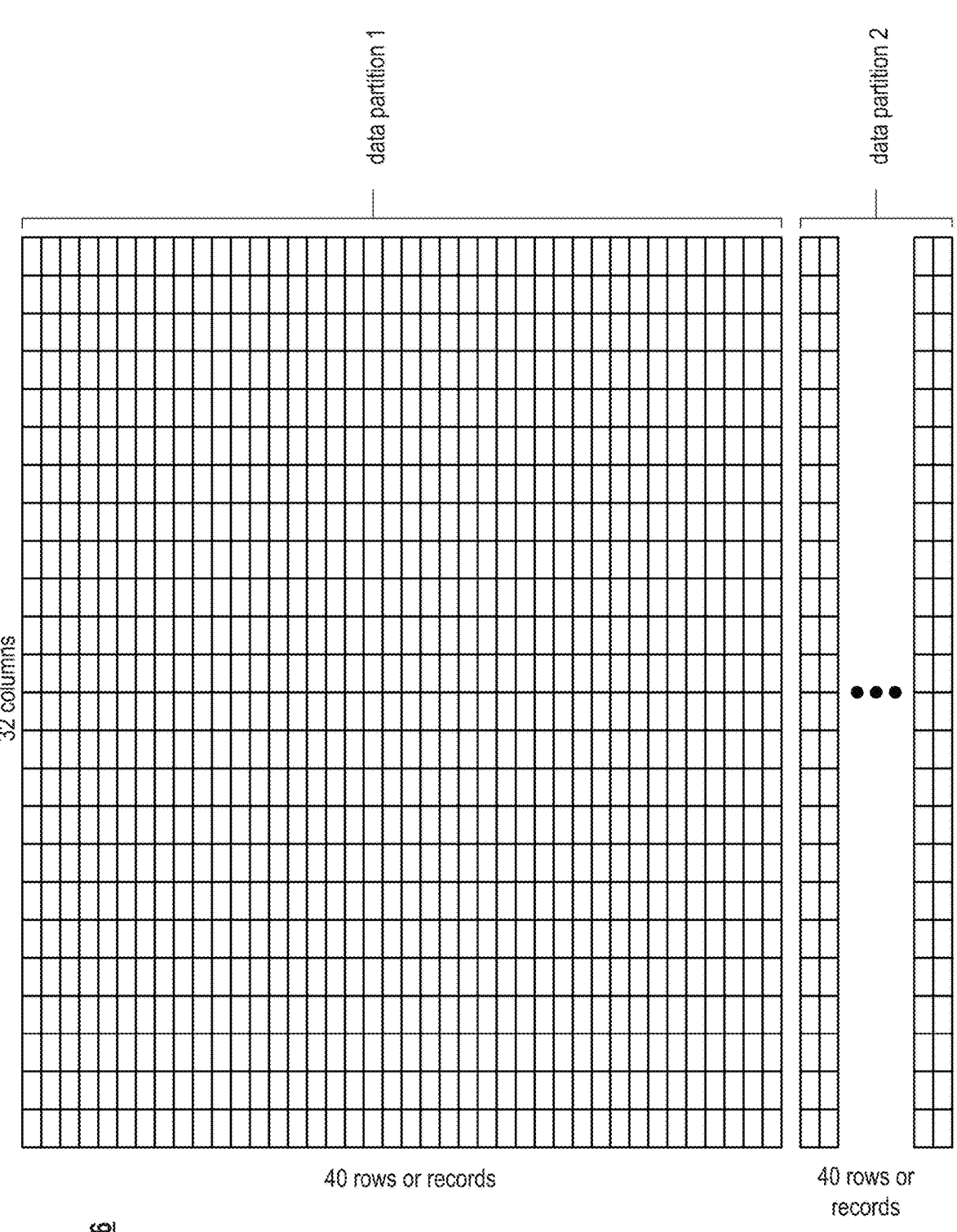

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
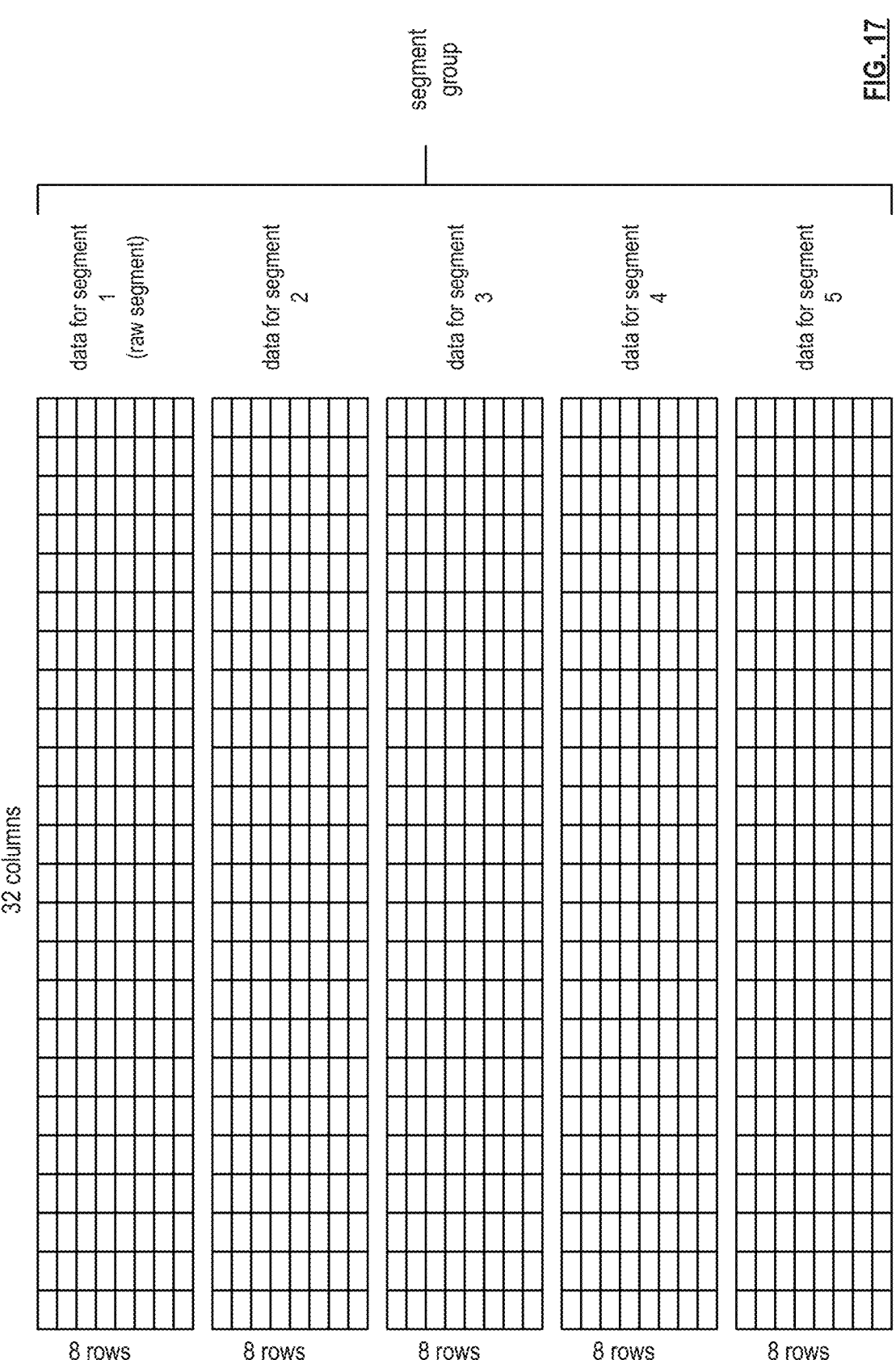

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces: thus, eight segments are created.

Figures 18, 19, 20:
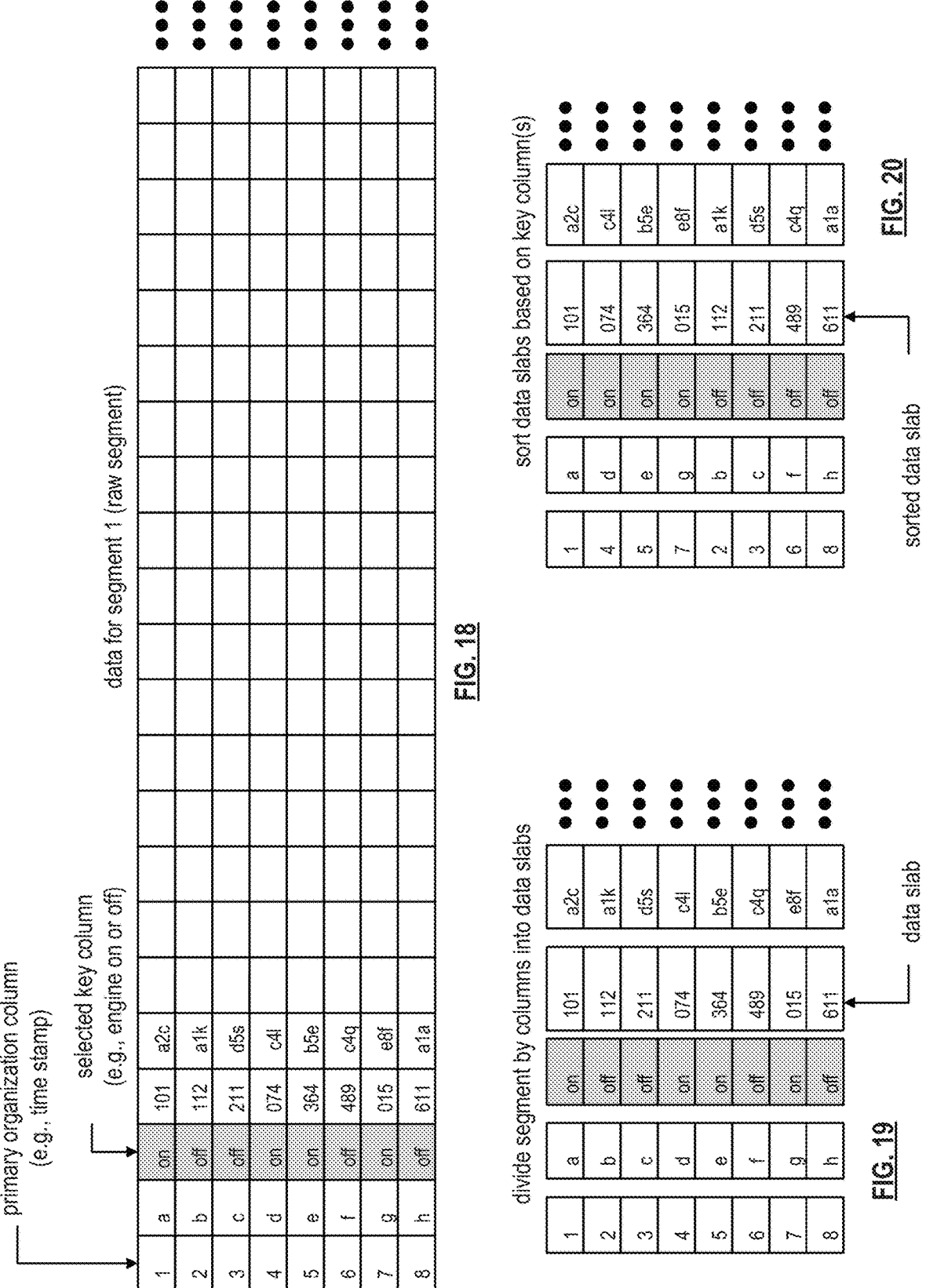

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns stored various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted.

Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
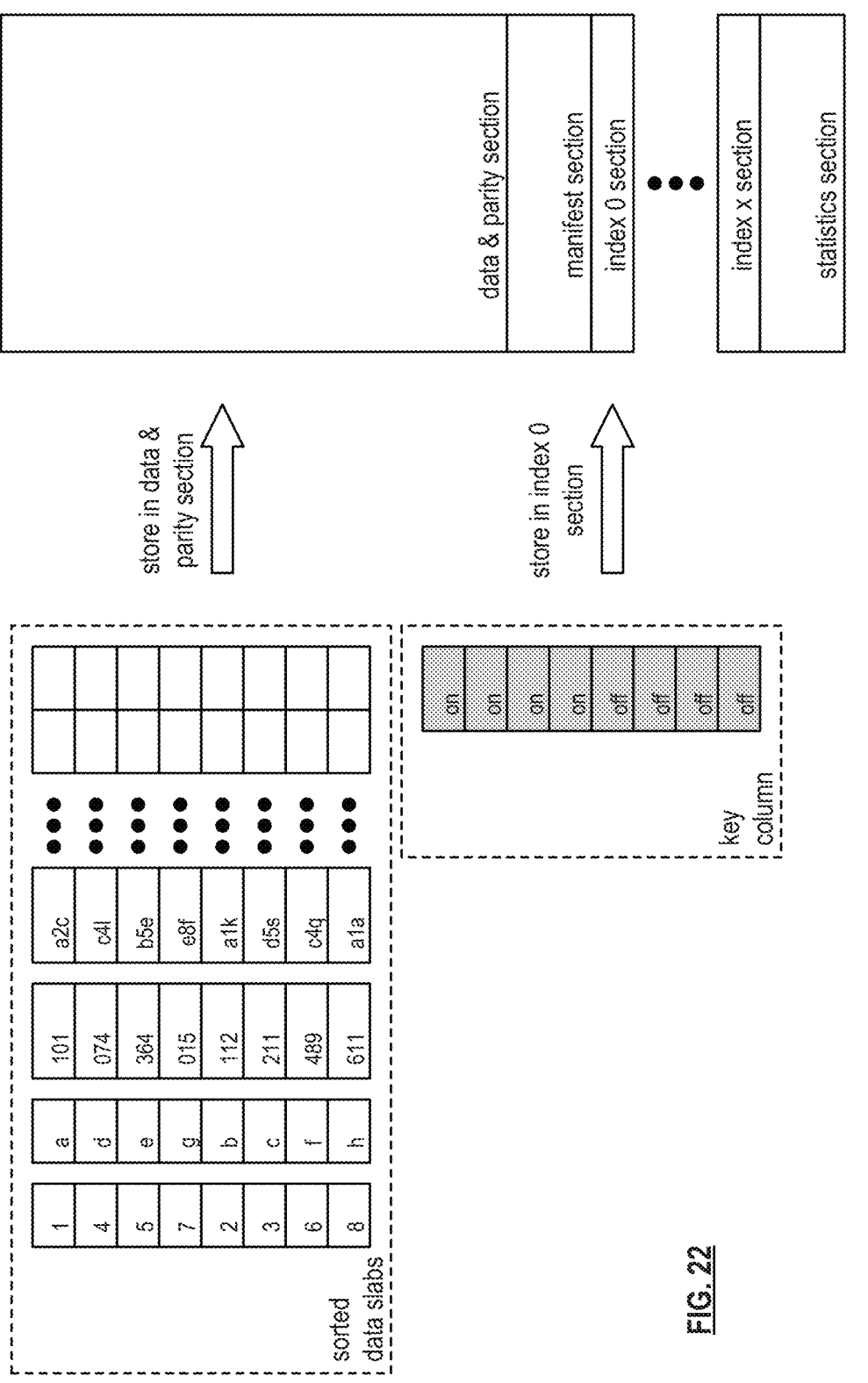

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within in coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). As another example, the redundancy encoding utilizes an erasure coding scheme. An example of redundancy encoding is discussed in greater detail with reference to one or more of FIGS. 29-36.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
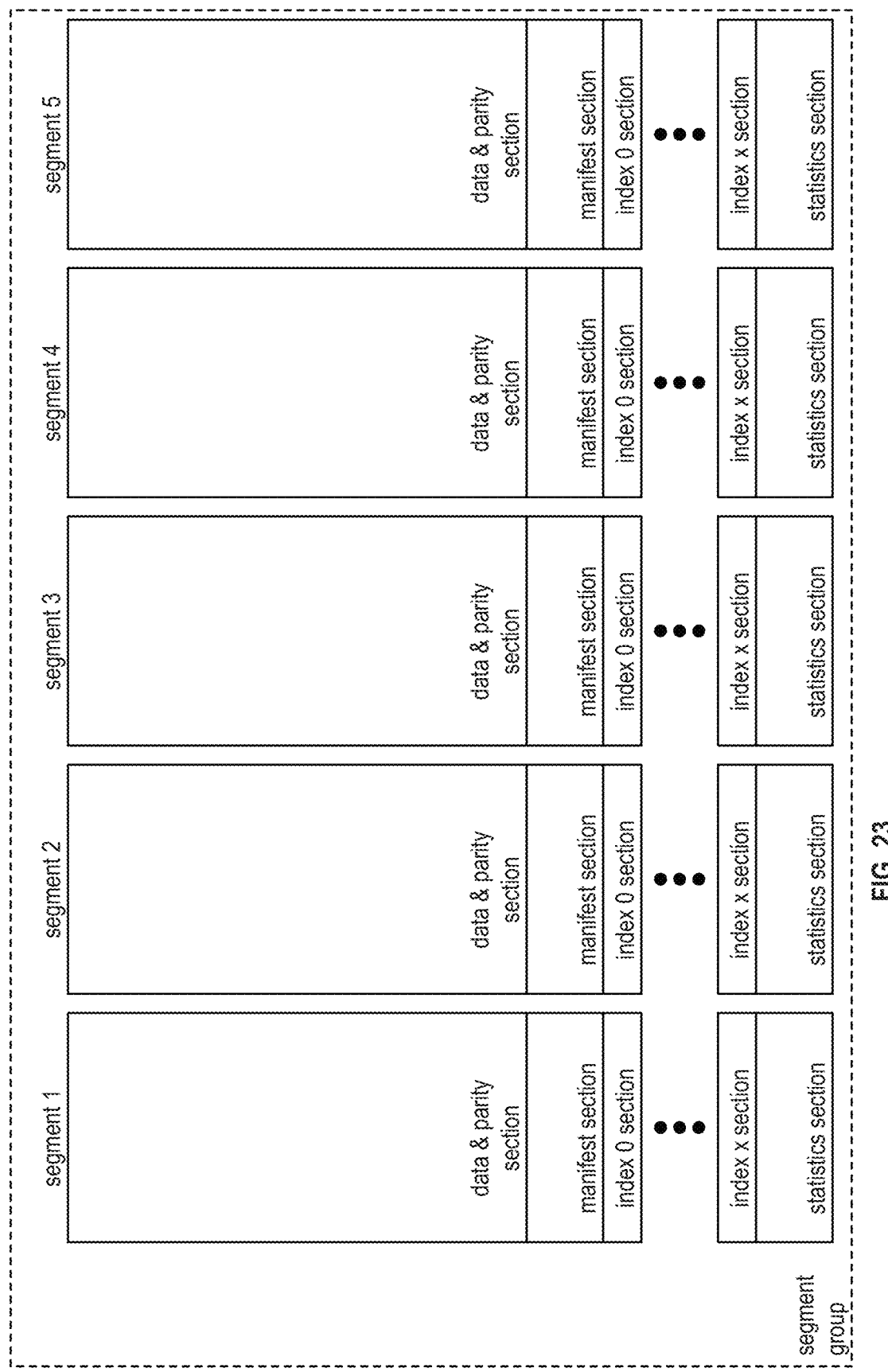

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

FIGS. 24A-24G present embodiments of a database system 10 that includes a temporary ingress storage system 2410 that processes incoming data for long-term storage. In particular, the temporary ingress storage system 2410 can be implemented by utilizing the parallelized data input sub-system 11 of FIG. 4, the bulk data sub-system 23 of FIG. 4, the parallelized ingress sub-system 24 of FIG. 4, and/or the parallelized data store, retrieve, and/or process sub-system 12 of FIG. 6. The temporary ingress storage system 2410 can be implemented to perform the processing upon incoming rows of data for storage, for example, as illustrated and discussed in FIGS. 15-23.

Figure 24A:
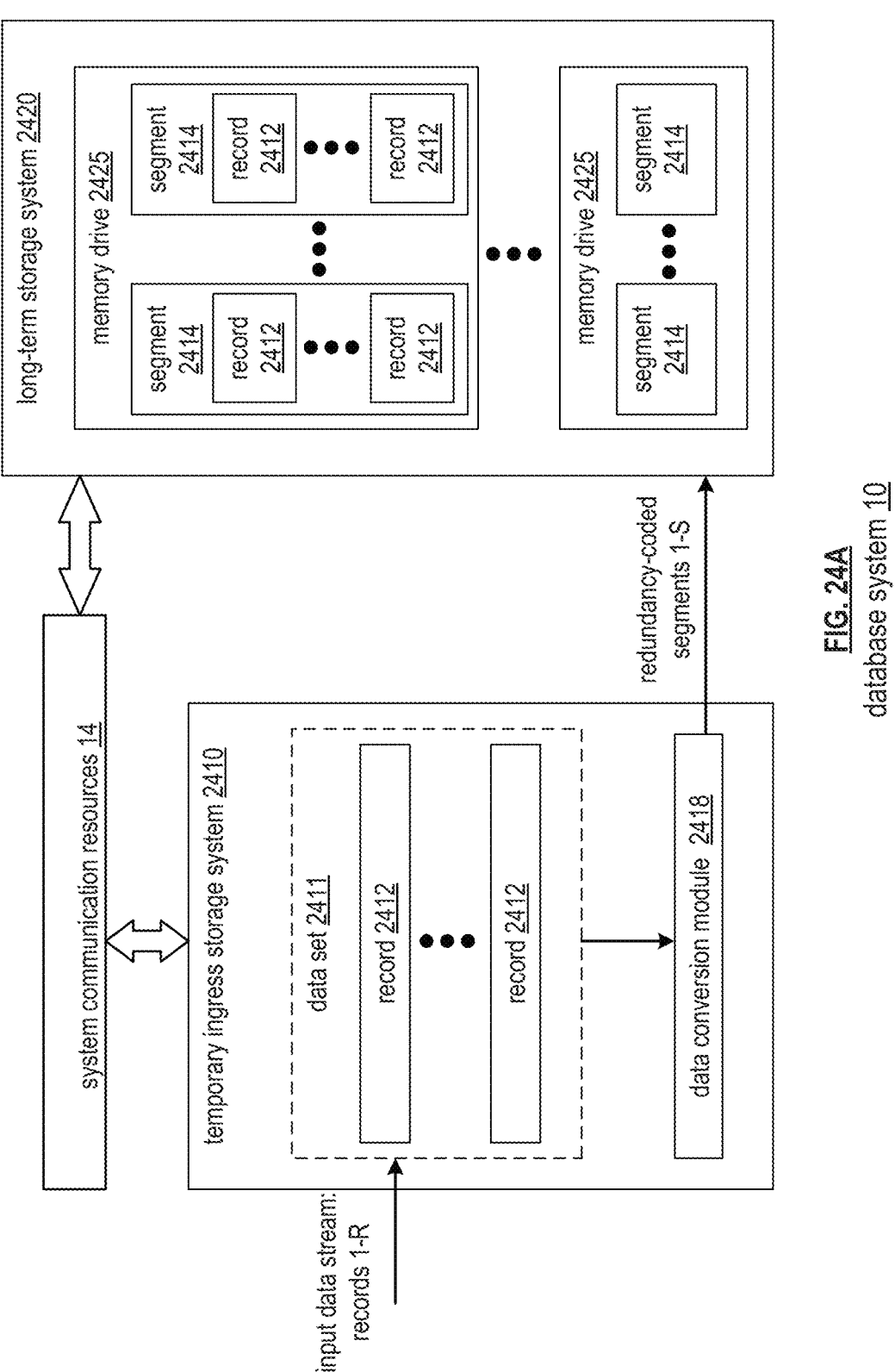
FIG. 24A is a schematic block diagram of a database system that includes a temporary ingress storage system and a long-term storage system in accordance with various embodiments of the present invention.

As illustrated in FIG. 24A, an input data stream of records 1-R can be received by the temporary ingress storage system 2410 of database system 10 for processing. Over time or in bulk, this input data stream can include a data set 2411 that is designated for processing to enable long-term storage of this data set 2411. The data set 2411 can include the received set of records 1-R of the input data stream as a plurality of records 2412. A data conversion module 2418 can convert the data set 2411 into a plurality of redundancy-coded segments 1-S for long-term storage by applying a redundancy storage encoding scheme. The data conversion module 2418 can generate the plurality of redundancy-coded segments 1-S by applying a data conversion function and/or a redundancy coding function based on data conversion function parameters and/or redundancy coding parameters that are: received by the temporary ingress storage system 2410; stored locally by at least one memory of the temporary ingress storage system 2410; accessible by the temporary ingress storage system 2410; and/or that are otherwise determined by the temporary ingress storage system 2410. In some cases, these parameters can be configured via user input to an interactive interface displayed via a display device of a client device communicating with the database system via system communication resources 14 and/or external network(s), for example, in conjunction with the configuration sub-system 16. The data conversion module 2418 can be implemented via one or more computing devices 18, such as the computing devices 18 utilized to implement the parallelized data input sub-system 11 as illustrated in FIG. 4, where the parallelized data input sub-system 11 is utilized to implement the temporary ingress storage system 2410. The data conversion module 2418 can be otherwise implemented via at least one processing module of the temporary ingress storage system 2410.

In some embodiments, the plurality of redundancy-coded segments 1-S can be generated by the data conversion module 2418 based on the mechanism discussed and illustrated in FIGS. 15-23 and/or can be generated by employing any redundancy storage encoding scheme, such as a RAID scheme and/or an erasure coding scheme. Alternatively or in addition to generating the redundancy-coded segments that include the records, the data conversion module 2418 can generate formatted segments by converting the plurality of records from a row-based storage format into a column-based storage format, where the segments include their plurality of rows in the column-based storage format.

These redundancy-coded segments 1-S can then be sent by the temporary ingress storage system 2410 to a long-term storage system 2420 for permanent storage, durable storage, and/or otherwise long-term storage. For example, the system communication resources 14 and/or other communication resources can be utilized to facilitate the transfer of the redundancy-coded segments 1-S from the temporary ingress storage system 2410 to the long-term storage system 2420. The long-term storage system 2420 can be implemented by utilizing the data storage systems 3 of FIG. 1, the parallelized data store, retrieve, and/or process sub-system 12 of FIG. 6, and/or can be otherwise implemented by utilizing a plurality of computing devices 18. The long-term storage system 2420 can include a plurality of distinct memory drives 2425 that are designated for storage of a plurality of segments 2414 received over time from the temporary ingress storage system 2410 as redundancy-coded segments generated by the data conversion module 2418. For example, each memory drive 2425 can be implemented by one or more computing devices 18, and/or by one or more individual nodes 37 of one or more computing devices 18, where a plurality of nodes 37 and/or a plurality of computing devices 18 utilized to implement the long-term storage system 2420 each implement one or more distinct memory drives 2425 of the long-term storage system 2420. As illustrated in FIG. 24A, each segment 2414 stored in the long-term storage system 2410 can include a plurality of records, such as a plurality of individual rows. The segments can include this plurality of records in a data and parity section, and can further include the manifest section, a plurality of index sections, and/or the statistics section as illustrated in FIG. 23.

In this fashion, incoming data is processed for long-term storage via the redundancy storage encoding scheme applied by the temporary ingress storage system 2410. Generating the plurality of redundancy-coded segments can include generating a plurality of segment groups that are each generated from distinct sets of data received by the database system via the redundancy storage encoding scheme, where each segment group includes a set of segments as illustrated in FIG. 23. Each redundancy-coded segment can include a plurality of distinct records 2412, such as a plurality of distinct rows that were received in the input data stream, as well as parity data generated based on some or all of the plurality of distinct records in the same segment group via the redundancy storage encoding scheme. In some embodiments, each segment 2414 is stored in exactly one storage location, such as in exactly one memory drive 2425 of the long-term storage system 2420. To ensure recovery is possible in the case of a drive failure, segments 2414 in the same segment group can each be stored upon different memory drives 2425, for example, of different computing devices 18 and/or in different physical locations, where no single memory drive 2425 and/or computing device 18 stores any two segments of a same segment group.

If a segment 2414 becomes unavailable, for example, due to its memory drive and/or corresponding computing device 18 failing, the segment can be recovered by utilizing a decoding function that corresponds to the redundancy storage encoding scheme upon set of other segments 2414, such as all other segments 2414 or a proper subset of the remaining segments 2414, in its segment group. In particular, these other segments 2414 required for recovery of the unavailable segment can be retrieved from their corresponding nodes 37, and the parity information of these other segments can be utilized to recover the unavailable segment. This recovered segment can be re-stored, for example, in a new location, and/or can persist temporarily to facilitate execution of queries requiring one or more rows included in this recovered segment.

Records 2412 of a segment 2414 are thus recoverable via retrieval and processing of other segments in the segment group in accordance with the redundancy storage encoding scheme. Therefore, segments, or even individual records, need not be duplicated/replicated in the long-term storage 2420. Each distinct record, such as each distinct row that is received and stored by the database system, can be included in exactly one segment stored in this long-term storage system 2420, and each segment can be stored in exactly one location.

Queries can be executed upon records stored by the long-term storage system 2420, where records required for servicing a query are retrieved directly via accessing their corresponding segment, if available, and/or where these records are recovered via retrieving other segments in the segment group and applying the decoding function of the redundancy storage encoding scheme. For example, the parallelized query and results sub-system 13 can access segments 2414 in the long-term storage system 2420 to extract the individual records 2412 as required to service incoming queries. In particular, the parallelized query and results sub-system 13 can communicate with the long-term storage system 2420 via system communication resources 14.

Figure 24C:
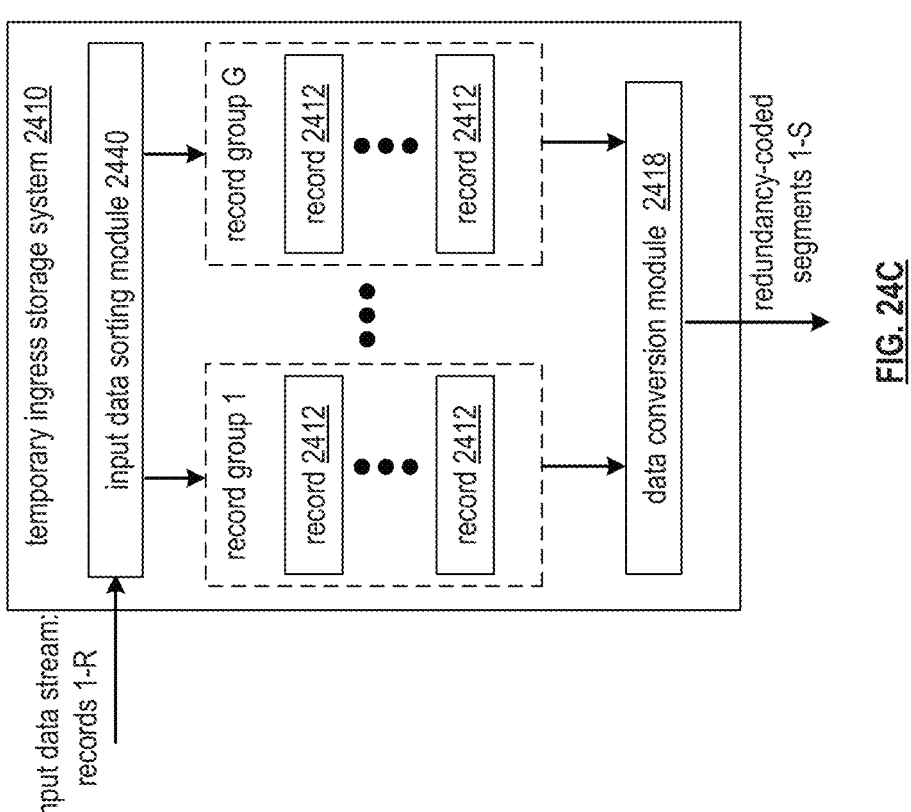
FIGS. 24B-24E are schematic block diagrams of a temporary ingress storage system in accordance with various embodiments of the present invention.
Figure 24B:
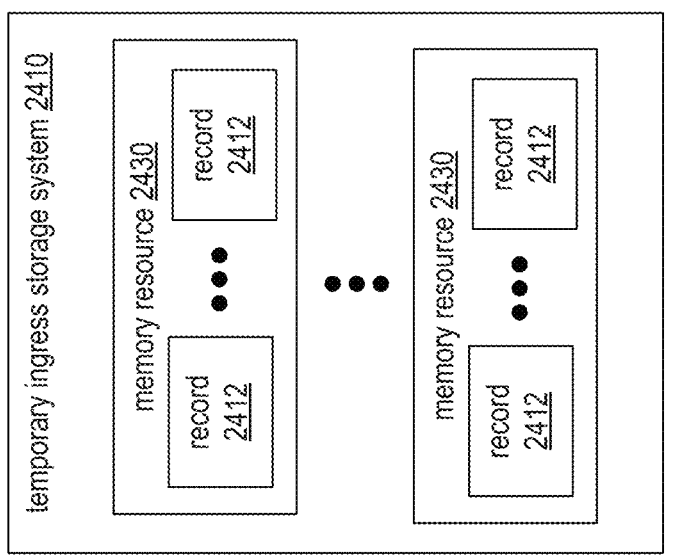

As illustrated in FIG. 24B, the temporary storage system 2410 can store the plurality of records 2412, prior to and/or during processing via the data conversion module 2418, in a plurality of memory resources 2430. In some cases, the plurality of different memory resources 2430 are implemented via different corresponding memory devices, different computing devices, and/or in separate physical locations or separate virtual memory locations. For example, each memory resource 2430 can be implemented by one or more computing devices 18, and/or by one or more individual nodes 37 of one or more computing devices 18, where a plurality of nodes 37 and/or a plurality of computing devices 18 utilized to implement the temporary ingress storage system 2410 each implement one or more distinct memory resources 2430 of the temporary ingress storage system 2410. Some or all features of the embodiment of the temporary storage system 2410 illustrated in FIG. 24B can be utilized to implement the temporary storage system 2410 of FIG. 24A and/or any other embodiment of the temporary storage system 2410 discussed herein.

The memory resources 2430 of the temporary storage system 2410 can be the same or different from memory drives 2425 of the long-term storage system 2420. The memory resources 2430 of the temporary storage system 2410 can be implemented by utilizing a distinct set of resources from those utilized to implement the memory drives 2425 of the long-term storage system 2420. In some cases, memory resources of the database system 10 can be re-designated over time to be implemented as either memory drives 2425 or memory resources 2430, but at any given time, the memory drives 2425 or memory resources 2430 can utilize distinct sets of resources.

The temporary ingress storage system 2410 can utilize the memory resources 2430 to temporarily store the plurality of records 2412 while they await processing for long-term storage and/or during processing for long-term storage. The generating and sending of the redundancy-coded segments 1-S can serve as a migration of the corresponding records 2412 included in original data set 2411 from the temporary ingress storage system 2410 to the long-term storage system 2420. Once the temporary ingress storage system 2410 determines that the redundancy-coded segments 1-S have been properly stored in long-term storage, the original records 2412 can be deleted and/or otherwise removed from memory resources 2430 of the temporary ingress storage system 2410. For example, the long-term storage system 2420 can send a storage confirmation notification to the temporary ingress storage system 2410 indicating receipt and storage of redundancy-coded segments 1-S, and the temporary ingress storage system 2410 can delete the raw records 1-R and/or remnants of the redundancy-coded segments 1-S only once this confirmation notification is received. Thus, at any given time, the temporary ingress storage system 2410 can be implemented to store only records 2412 that are not yet permanently stored in long-term storage system 2420.

In addition to being stored for differing lengths of time, the records 2412 are stored in a different format by the temporary ingress storage system 2410 than the long-term storage system 2420. As discussed previously, the records 2412 in data set 2411 awaiting conversion can be stored in a light-weight state, such as a row-based format where each record 2412 corresponds to a single row and are separately stored as individual rows. The records 2412 can be stored as a single row-formatted copy or as multiple row-formatted copies as discussed in further detail in conjunction with FIGS. 25A-25C. The conversion of records into their redundancy-coded segments can include converting the segments into a column-based format in addition to applying the redundancy-coding scheme.

Based on at least these differing storage needs, the memory resources 2430 of temporary ingress storage system 2410 can be implemented via faster and/or more efficient memory resources than those utilized to implement the memory drives 2425 of long-term storage system 2420. For example, some or all memory resources 2430 can be implemented utilizing DRAM memory, other volatile memory, flash memory, primary storage, and/or efficient memory enabling fast access of records stored on memory resources 2430. On the other hand, some or all memory drives 2425 can be implemented utilizing slower, more permanent resources such as hard disk drives, solid state drives, secondary storage, and/or other memory resources designated for more permanent storage that are less efficient for data access.

FIG. 24C illustrates an embodiment of a temporary ingress storage system 2410 that utilizes an input data sorting module 2440 to generate a plurality of record groups from incoming data to be separately converted into corresponding segment groups of redundancy-coded segments. Some or all features of the embodiment of the temporary storage system 2410 illustrated in FIG. 24C can be utilized to implement the temporary storage system 2410 of FIG. 24A and/or any other embodiment of the temporary storage system 2410 discussed herein.

In some cases, each distinct record group can be utilized as the data set utilized to generate exactly one segment group that includes a set of segments that were jointly redundancy storage encoded. For example, each record group can be generated as a data partition of FIG. 16 from the data set of FIG. 15, where the data set of FIG. 15 includes some or all of data set 2411. Each record group can then be segregated into a plurality of sets of data that will be included in each of a corresponding plurality of segments of the segment group, for example, as illustrated in FIG. 17.

Prior to any column-based reformatting and/or redundancy storage encoding via the data conversion module 2418, for example, as discussed in FIGS. 18-23, the data can persist in its designated groupings in a row-based format. In some cases, this grouping of data includes storing records of the same group via the same memory resources 2430, for example, on a same physical computing device 18. For example, each storage resource can store a plurality of distinct record groups prior to migration of these records to permanent storage. While this can be favorable for record retrieval in the conversion of the records in a same record group to a set of segments, in other cases, the record grouping is otherwise organized by the input sorting module 2440 as a plurality of pointers, memory references, and/or other identifiers of the records designated for the record group. In such cases, the records themselves need not be stored in the same memory resource 2430 while pending conversion and/or need not be stored consecutively in the same memory resource 2430 while pending conversion.

The input data sorting module 2440 can segregate different records into different record groups based on one or more sorting factors that are: received by the temporary ingress storage system 2410: stored locally by at least one memory of the temporary ingress storage system 24101; accessible by the temporary ingress storage system 2410; and/or that are otherwise determined by the temporary ingress storage system 2410. In some cases, these factors can be configured via user input to an interactive interface displayed via a display device of a client device communicating with the database system via system communication resources 14 and/or external network(s), for example, in conjunction with the configuration sub-system 16. The input data sorting module 2440 can be implemented via one or more computing devices 18, such as the computing devices 18 utilized to implement the parallelized data input sub-system 11 as illustrated in FIG. 4, where the parallelized data input sub-system 11 is utilized to implement the temporary ingress storage system 2410. The input data sorting module 2440 can be otherwise implemented via at least one processing module of the temporary ingress storage system 2410.

In some cases, the sorting factors dictating the different record groupings are based on the time the record was collected, such as a time the record was received by the temporary ingress storage system 2410 and/or based on a timestamp associated with the record corresponding to a time the record was collected via a sensor device or data collection device. In such cases, records collected at sufficiently similar times are placed in similar record groups. In some cases, as records are received overtime via the input stream, they are placed in a record group until the record group is full and/or contains at least a pre-determined threshold number of records, at which point a new record group is formed and the full record group is sent to the data conversion module 2418.

The sorting factors can be based on other criteria, where each group is generated to include records that fall under one of a plurality of predefined categories, and where a plurality of different groups 1-R correspond to different ones of the different categories. Each category of this plurality of categories can be correspond to criteria regarding the incoming records such as: the type of record: the type of sensor device or data collection device associated with generating or collecting the data contained in the record: particular values and/or ranges of values of one or more fields/columns of the record such as one or more key columns of the record: the size of the record; the type of data contained in the record; the particular time of day, week, month, or year that the record was collected; and/or other information regarding the record; and/or other criteria that differentiate different records. In some cases, records are grouped into a particular record group based on a particular corresponding category, and when a particular record group becomes full and/or contains at least a pre-determined threshold number of records, this record group is the is sent to the data conversion module 2418 for processing and a new, empty record group corresponding to the same corresponding category is formed for new incoming records that correspond to this particular category.

In some cases, rather than grouping incoming data based on these predefined categories, for example, that are configured via user input, the incoming data can be grouped by applying a similarity function utilized by a clustering algorithm and/or similarity scheme that does not necessarily segregate records into groups based on fixed, categorized criteria, but rather based on their measured level of similarity to other records pending conversion into long-term storage, such as other recently received records that have not yet been stored. The similarity function can be utilized to group a set of pending records into groups, for example, where sets of records that are more similar are grouped together and where sets of records that are less similar are divided into different record groups. The similarity function can be applied to group records into a fixed, predefined number of record groups and/or can dynamically allocate differing numbers of record groups based on the measured similarity of pending records at different points in time. The similarity function can measure similarity based on time the records were received, based on the sources and/or data collection devices that generated and/or collected the data in the records, and/or based on levels of similarity in values of one or more fields/columns of different records. For example, pairs of records with similar values and/or with matching values for one or more fields can be assigned more favorable similarity scores that pairs of records with very different values and/or no matching values for one or more fields. Pairs and/or sets of three or more records with more favorable similarity scores can be placed in the same record group, while pairs and/or sets of three or more records with less favorable similarity scores can be placed in one or more different record groups. Parameters defining the similarity function can be configured via user input and/or can be determined automatically.

Figure 31A:
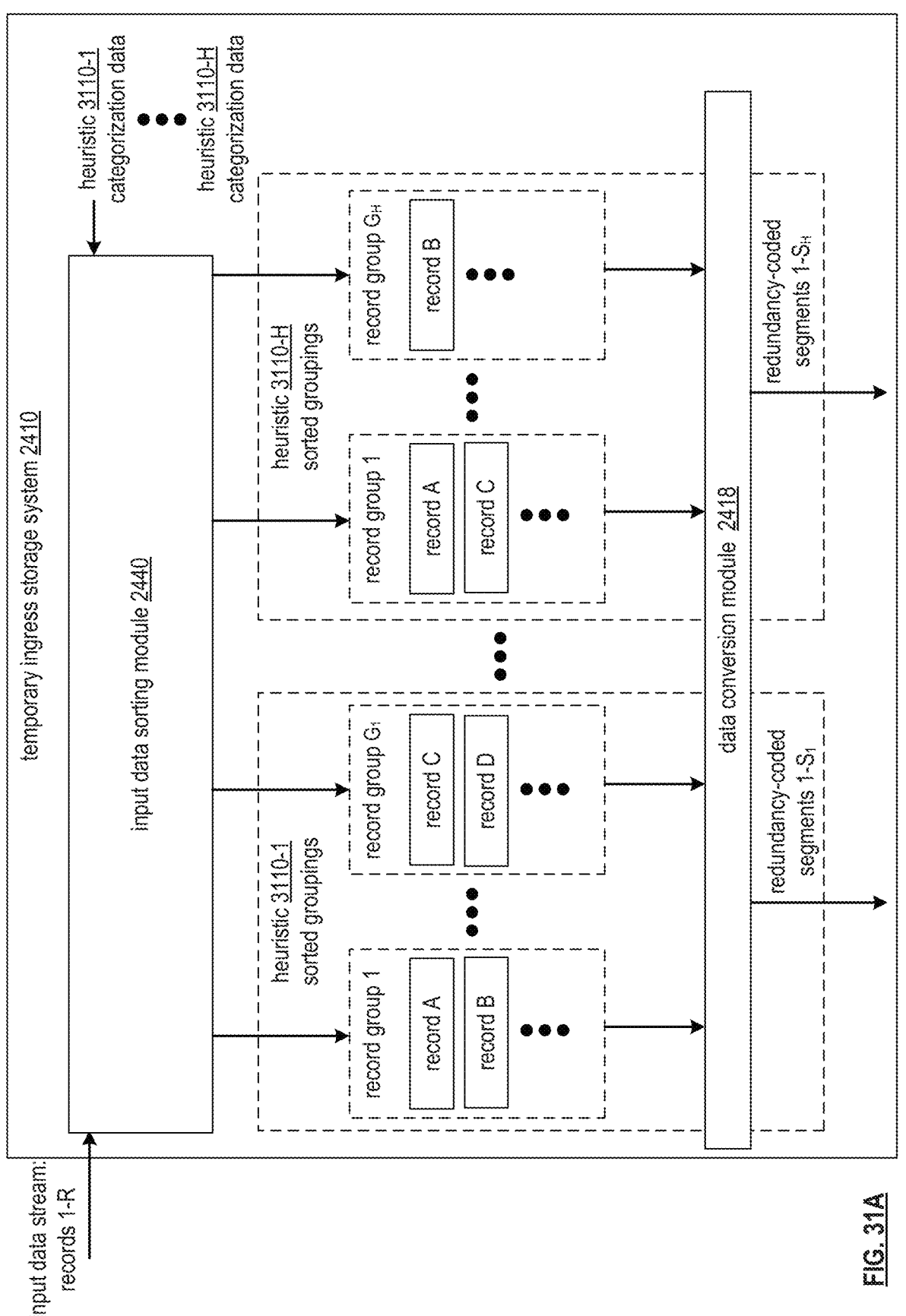
FIG. 31A is a schematic block diagram of a temporary ingress storage system that generates segments for long-term storage based on applying heuristic categorization data in accordance with various embodiments of the present invention.

As discussed in further detail in conjunction with FIGS. 31A-31B, the categories and/or similarity function utilized to group the records into record groups can be determined based on known and/or predicted data demand heuristics that are determined automatically by the database system based on analytics upon access trends to different types of records and/or that are otherwise received, configured via user input, and/or determined.

In some cases, a record group may be formed over a duration of time, for example, where a record group awaits at least a threshold number of records, such as a fixed number of records based on a fixed, predetermined segment size for each segment in the resulting segment group formed from the record group. For example, if records are placed in groups based on fixed criteria or similarity to other records, some record groups may be pending for longer periods of time than others based on waiting to receive additional records that satisfy the criteria of being included in the record group.

Figures 24D, 24E:
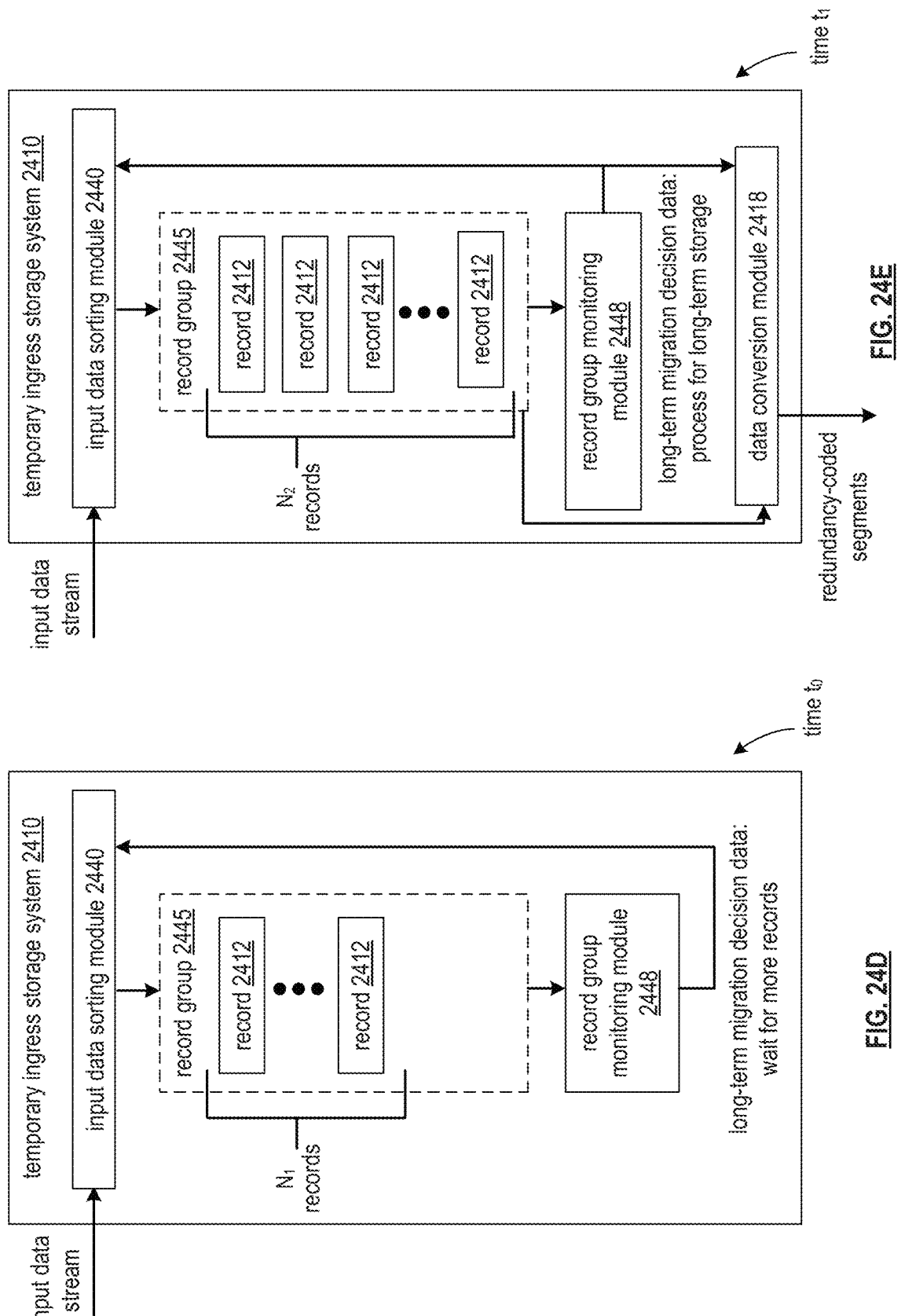
Figure 24E:
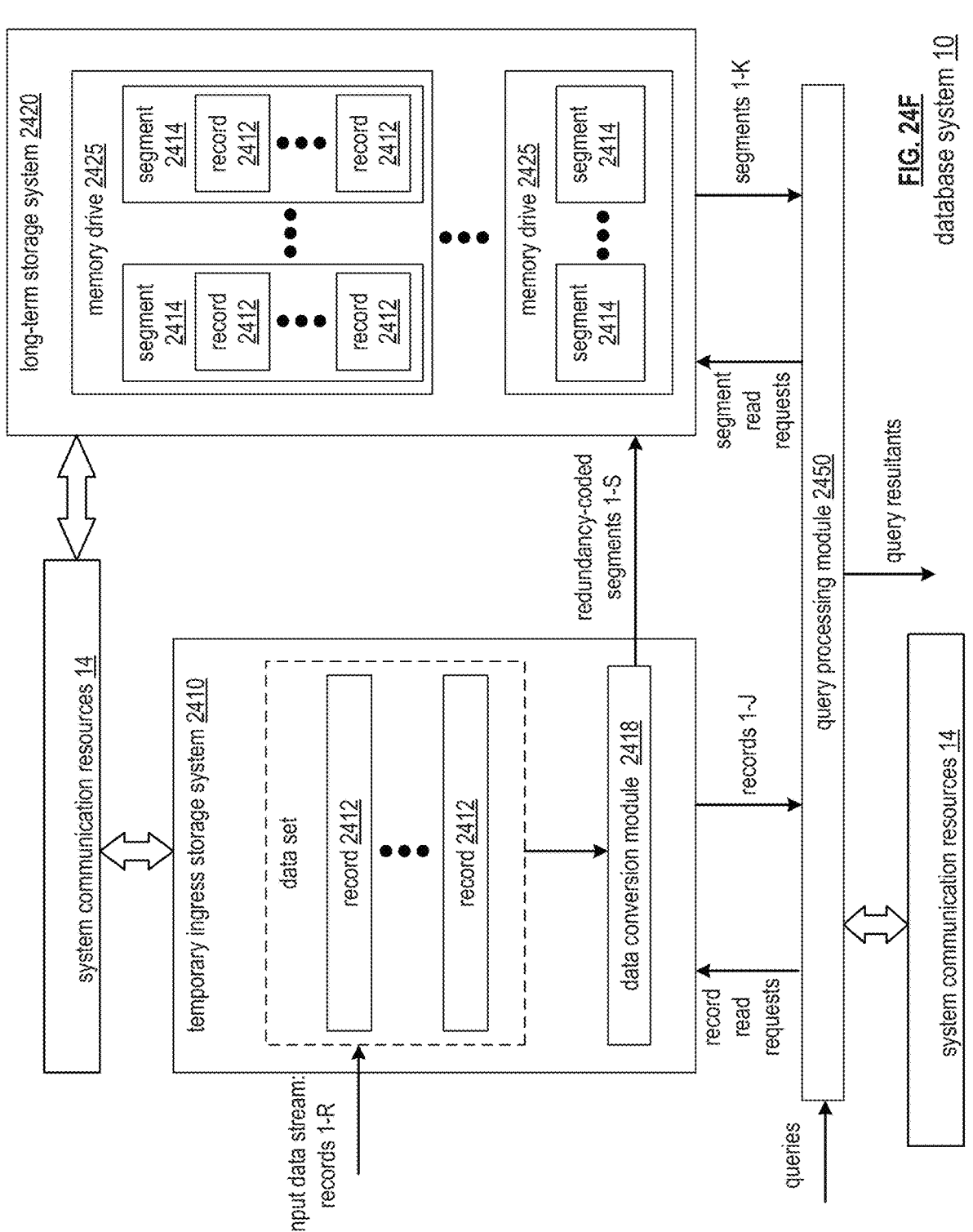

This dynamic waiting-period as record groups accumulate a sufficient amount of records to be converted into segment groups is illustrated in FIGS. 24D-24E, which illustrate embodiments where the temporary ingress storage system 2410 implements a record group monitoring module 2448. Some or all features of the embodiment of the temporary storage system 2410 illustrated in FIGS. 24D and/or 24E can be utilized to implement the temporary storage system 2410 of FIG. 24C and/or any other embodiment of the temporary storage system 2410 discussed herein.

FIG. 24D illustrate the states of a particular record group 2445 in the set of pending record groups 1-G of FIG. 24C at times $t_0$ and $t_1$, respectively. In some cases, this record group 2445 is the only pending record group, where all incoming records are added to this record group. A record group monitoring module 2448 of the temporary ingress storage system 2410 can be responsible for monitoring all pending record groups 1-G, including the particular record group 2445 depicted in FIGS. 24D and 24E, at different points in time including times $t_0$ and $t_1$. The record group monitoring module 2448 can be operable to implement a long-term migration decision function that outputs long-term migration decision data dictating whether or not a given record group, at its current state, is ready to be converted into a set of redundancy-coded segments of a segment group for long-term storage.

The parameters dictating the long-term migration decision function can be: received by the temporary ingress storage system 2410; stored locally by at least one memory of the temporary ingress storage system 24101: accessible by the temporary ingress storage system 2410; and/or can be otherwise determined by the temporary ingress storage system 2410. In some cases, these parameters can be configured via user input to an interactive interface displayed via a display device of a client device communicating with the database system via system communication resources 14 and/or external network(s), for example, in conjunction with the configuration sub-system 16. The record group monitoring module 2448 can be implemented via one or more computing devices 18, such as the computing devices 18 utilized to implement the parallelized data input sub-system 11 as illustrated in FIG. 4, where the parallelized data input sub-system 11 is utilized to implement the temporary ingress storage system 2410. The record group monitoring module 2448 can be otherwise implemented via at least one processing module of the temporary ingress storage system 2410.

These parameters can include a predetermined minimum record number threshold. The long-term migration decision function can generate the long-term migration decision data based on comparing the current number of records in the record group to the predetermined minimum record number threshold, where the long-term migration decision data indicates the record group is ready for conversion when the number of records in the record group exceeds, is equal to, or otherwise compares favorably to the predetermined minimum record number threshold.

Alternatively or in addition, these parameters can include a predetermined minimum record storage size threshold. The long-term migration decision function can generate the long-term migration decision data based on comparing the summation of storage sizes of the current of records in the record group to the predetermined minimum record storage size threshold, where the long-term migration decision data indicates the record group is ready for conversion when this aggregate storage size of records in the record group exceeds, is equal to, or otherwise compares favorably to the predetermined minimum record storage size threshold.

Alternatively or in addition, these parameters can include a predetermined maximum wait time threshold. The long-term migration decision function can generate the long-term migration decision data based on comparing an amount of time one or more records in the record group have been pending to the a predetermined maximum wait time threshold, where the long-term migration decision data indicates the record group is ready for conversion when this amount of time elapsed exceeds, is equal to, or otherwise compares favorably to the predetermined maximum wait time threshold. In some cases, multiple different record groups can be merged into a single record group from joint processing to form a single segment group when one or more of these different record groups have reached the predetermined maximum wait time threshold. In such cases, the multiple record groups can be selected such that a predetermined maximum record group size is not exceeded.

Alternatively or in addition, these parameters can be based on current performance and/or utilization metrics of the temporary ingress storage system 2410. For example, the restrictions of the predetermined minimum record number threshold and/or predetermined minimum record storage size threshold can be automatically loosened by the record group monitoring module, where smaller record groups are approved for processing, in conditions where the memory and/or processing resources of the temporary ingress storage system 2410 are strained, for example, due to storing too many pending records and/or due to unforeseen health problems. The amount to which these parameters are loosened can be an increasing function of the amount of detected and/or measured degradation in performance or health and/or can be loosened when the performance, utilization, or health of the memory and/or processing resources of the temporary ingress storage system 2410 fall below and/or otherwise compare favorably to a predefined processing, utilization, and/or health threshold. As another example, the predetermined maximum wait time threshold can be decreased to process pending record groups that have been waiting for a shorter amount of time under these detected conditions of poor performance and/or high utilization. Similarly, other parameters such as the number of distinct record groups 1-G that are formed by the input data sorting module 2440 and/or that pending can be decreased, for example, where existing groups can be merged automatically, under these detected conditions of poor performance and/or high utilization. Other parameters such as requirements of particular corresponding categories can be loosened under these detected conditions of poor performance and/or high utilization. When performance, utilization, and/or health conditions are again favorable, these parameters can be tightened and/or reset accordingly. In some cases, the parameters can be tightened and/or loosened in conjunction with and/or based on resource monitoring, resource allocation, and/or additional hardware recommendations as discussed in further detail in conjunction with FIGS. 32A-33B.

In the example illustrated in FIG. 24D, the particular record group 2445 includes $N_1$ records at time $t_0$. The record group monitoring module 2448 generates long-term migration decision data indicating the record group 2445 is not ready for long term storage, and should wait for more records. For example, this output is generated based on $N_1$ being less than the predetermined minimum record number threshold and/or being less than the minimum record number threshold determine for at this point of time as a decreasing function of current performance or utilization of the memory drive 2425 storing the record group and/or based on current performance or utilization of the temporary ingress storage system as a whole. This information can be relayed to the input data sorting module 2440 to indicate that the input data sorting module 2440 should continue grouping records into this particular record group 2445. Alternatively, the input data sorting module 2440 continues to add records to record groups until receiving notification that these record groups are pushed to processing for long-term migration. For example, no notification is generated by the record group monitoring module 2448 because no change in action should be taken at this time.

At a later time $t_1$ that is after $t_0$, more records have been received via the input stream, and at least a subset of these new records have been added to the record group 2445 to increase the number of records in record group 2445 to a number of records $N_2$ that is greater than $N_1$. The record group monitoring module 2448 generates long-term migration decision data indicating the record group 2445 is ready to be processed for long-term storage. For example, this output is generated based on $N_2$ being greater than the predetermined minimum record number threshold. Alternatively or in addition, the minimum record number threshold determined for $t_1$ may be different than that determined for time $t_0$ based on changes in performance or utilization of the memory drive 2425 storing the record group since time $t_0$ and/or based on changes in performance or utilization of the temporary ingress storage system as a whole since time $t_0$. In particular, the minimum record number threshold may have decreased from time $t_0$ to enable the number of records $N_2$ to be sufficient.

In response to the long-term migration decision data indicating the record group 2445 is ready to be processed for long-term storage, the data conversion module 2418 can be sent and/or can retrieve the set of records in the record group 2445, and can generate a segment group of redundancy-coded segments from this set of records. This information can also be relayed to the input data sorting module 2440. Based on record group 2445 being deemed complete, the input data sorting module 2440 can allocate a new record group with the same or different sorting criteria, and can begin sorting new incoming records into this new record group.

FIG. 24F illustrates an embodiment of the database system 10 that utilizes a query processing module 2450 to execute queries by accessing not only segments stored in long-term storage, but also by accessing the temporarily stored records 2412 stored by memory resources 2430 of temporary ingress storage system 2410 that are pending processing in data set 2411 and/or a particular record group 2445 of a set of record groups 1-G. Some or all features of the embodiment of database system 10 illustrated in FIG. 24F can be utilized to implement the database system 10 of FIG. 1A, of FIG. 24A, and/or any other embodiment of the database system 10 discussed herein. In particular, the embodiment of FIG. 24F leverages the availability of unprocessed records that are temporarily stored as they await conversion for and migration to long-term storage by enabling queries to be executed via access to these records in the temporary ingress storage system 2410, despite not yet being available for access in the long-term storage system 2420.

As illustrated in FIG. 24F, the database system 10 can include a query processing module 2450. In particular, the query processing module 2450 can be implemented by utilizing the parallelized query and results sub-system 13 of FIG. 5 and/or can be implemented by utilizing a plurality of computing devices 18. The query processing module 2450 can receive and/or otherwise determine queries for processing. The query processing module 2450 can determine the necessary set of records required for access to execute the query, for example, by identifying records corresponding to one or more tables identified by the query and/or that satisfy filtering parameters utilized to identify records required for processing. The query processing module 2450 can determine that at least a subset of these required records is stored via the temporary ingress storage system 2410. The query processing module 2450 can send read requests for records required for execution of the query for access from memory resources 2430. The query processing module 2450 can also send read requests for segments containing required for execution of the query for access from memory drives 2425 of the long-term storage system 2420. In particular, some queries may require access to records stored in both the long-term storage system 2420 and the temporary ingress storage system 2410—a first subset of a plurality of records utilized to execute a particular query can be accessed from memory resources 2430 of the temporary ingress storage system 2410, and a second subset of the plurality of records utilized to execute the particular query can be accessed from memory drives 2425 of the long-term storage system 2420 as redundancy-coded and/or column-formatted segments, from which records of the second subset can be extracted.

This functionality introduces numerous improvements to database systems. Rather than waiting for data to be permanently stored, queries can be serviced by using data that is still in ingress by accessing the memory resources 2430 of temporary ingress storage system 2410. Records 2412 that satisfy the query domain of the query, satisfy filtering parameters of the query, and/or that otherwise are included in a table indicated by the query can be accessed and utilized to execute this query, even if these records are still undergoing ingress and are not yet permanently stored via long-term storage system 2420. This mechanism of enabling servicing of queries via data ingress, prior to long-term storage, improves existing database systems because queries requiring access to newly received data can be executed immediately, without needing to delay the query execution due to waiting for the data to be permanently stored. This also improves existing database systems because a resultant can be generated via unhindered query execution that reflects all of the data that has been received, rather than only the data that was already processed for long-term storage.

Additionally, as discussed previously, the data in ingress utilized faster and/or more efficient memory such as DRAM memory, enabling faster access to the data stored in the temporary ingress storage system 2410. This enables faster access to the newer records via accessing the faster memory resources 2430, while the older records stored in more permanent memory drives 2425 are more slowly accessed. In many cases, "data-hotness" of records, dictating their as their demand for query execution, is highest when they are new and/or recently received, and this level of "data-hotness" decreases over time as the data ages, as newer data is more desirable. In other words, newer records tend to be requested for query execution at higher rates and/or are otherwise accessed more heavily than older records due to the demand for newer data being higher than the demand for older data. The mechanism of first storing new data in temporary ingress for access via more efficient memory resources 2430 and later migrating this data as it ages to slower, permanent storage for access via less efficient memory drives 2425 leverages this inherent trend of "data-hotness", and thus records' expected access load in query executions, decreasing with time. The embodiment of database system 10 presented in FIG. 24F that enables query execution upon data that is temporarily stored in ingress additionally improves database systems by enabling fastest access to data while it is new and in higher demand, in conjunction with the necessary processing of this data for its long-term storage.

Figure 24G:
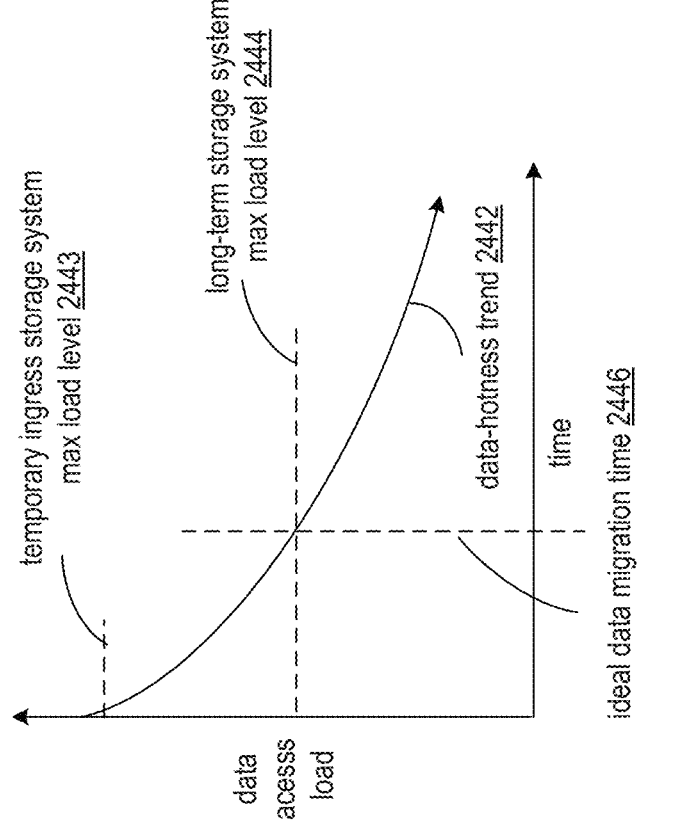
FIG. 24G is a graphical illustration illustrating the relationship between access load required by data demand over time and the access load levels enabled by the temporary ingress storage system and the long-term storage system as data is ingested and migrated over time.

This improvement to database systems that leverages data-hotness to most efficiently access the new, highest demand data, in addition to enabling any query execution on newest data, is illustrated in FIG. 24G. A graph is illustrated with time, beginning from data being collected and/or being inputted into the system on the x-axis and data access load for this data on the y-axis. The data-hotness trend 2442 illustrates that the access load required for data decreases over time as the data ages. A maximum access load level 2443 of the temporary ingress storage system 2410, such as an average access load for data that the temporary ingress storage system 2410 can handle, is higher than a maximum access load level 2444 of the long-term storage system 2420. In particular, the lightweight, row-formatted storage of records in DRAM enables faster, more efficient access to records in temporary ingress storage system 2410 than the slower, less efficient access to records extracted from redundancy-coded segments in a column-format stored in permanent storage. Ideally, data flows from the temporary ingress storage system 2410 to the long-term storage system 2420 at an ideal data migration time 2446 relative to being collected, for example, around the time the corresponding data-hotness diminishes to match the access load capabilities of the long-term storage system 2420. This graph serves to illustrate how natural decrease in "data-hotness" as data ages follows the progression of the data's storage state in the system—while it is new, it is accessible in more efficient memory resources 2430 such as DRAM, and when it is older, it is accessible in slower, permanent storage. This illustration serves as a high-level example of these overarching trends: an exact maximum access load level 2443 and/or maximum access load level 2444 may not be determinable and/or may vary for different data, the exact data-hotness trend 2442 may not be determinable and/or may vary for different data, and/or the migration time may not be determinable and/or may vary for different data. Furthermore, the maximum access load level 2443 to records in temporary ingress storage system 2410 can further be improved and can be different for different types of records via storage of greater numbers of replications of the records in ingress to balance access load to these records, as discussed in further detail in conjunction with FIGS. 25A-25D and FIGS. 27A-27C.

Figure 24H:
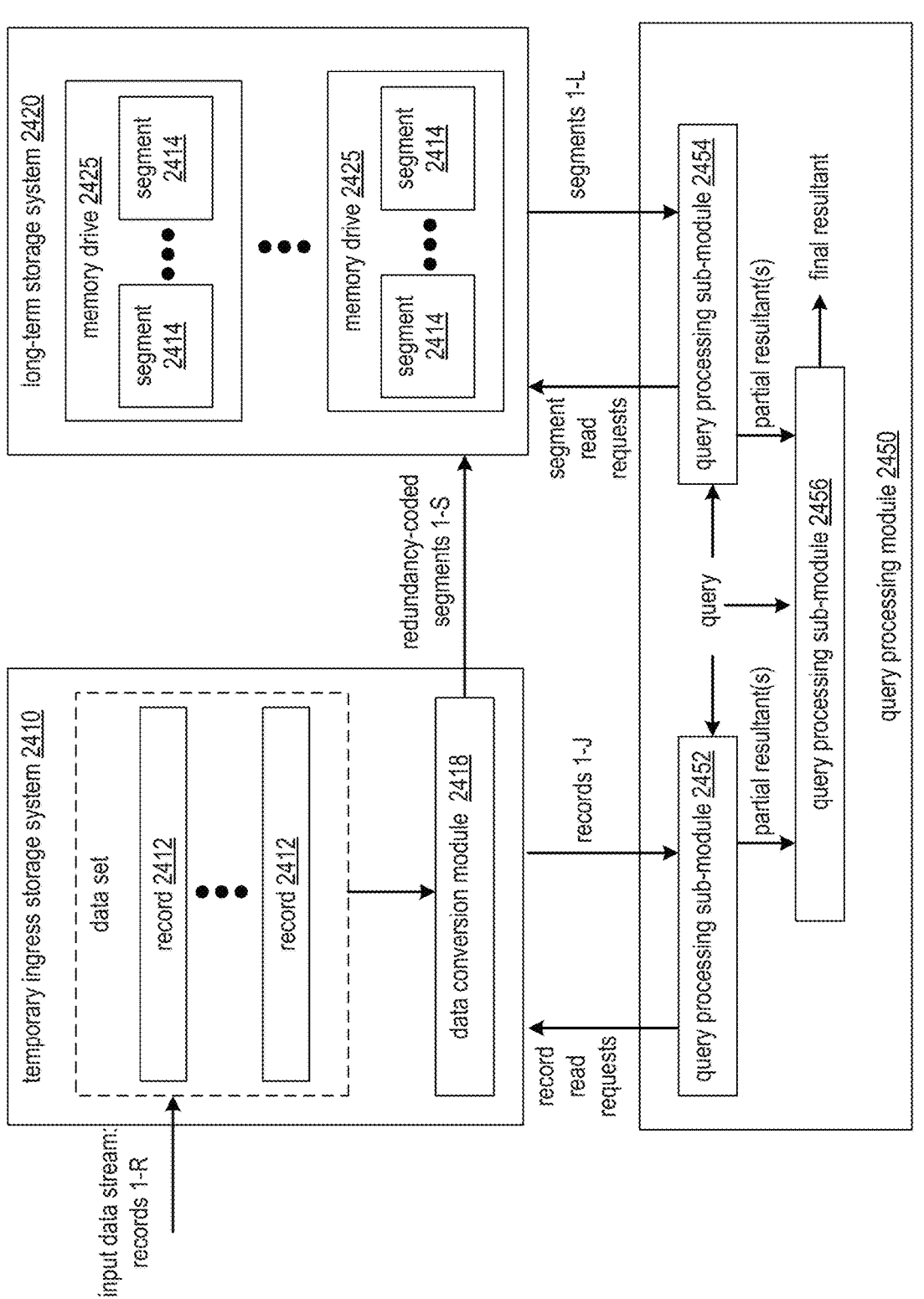
FIG. 24H is a schematic block diagram of a database system that includes a temporary ingress storage system, a long-term storage system, and a query processing module in accordance with various embodiments of the present invention.

FIG. 24H illustrates a further embodiment of a database system 10 with a query processing module 2450 that includes query processing sub-modules 2452, 2454, and 2456. Each query processing subsystem can be implemented via distinct or overlapping sets of one or more computing devices 18 and/or via designated processing modules. Some or all features of the embodiment of database system 10 illustrated in FIG. 24H can be utilized to implement the database system 10 of FIG. 1A, of FIG. 24A, of FIG. 24F, and/or any other embodiment of the database system 10 discussed herein.

Execution of a query requires reading of a plurality of records, such as some or all fields of a plurality of rows required to execute the query, and further requires applying one or more query operators of the query to these rows to generate a resultant of the query. The step of reading rows can be performed independently in parallel. In some cases, one or more operators of the query, such as filtering parameters induced by a WHERE clause or conditional statements such as AND and/or OR statements of SQL queries, can be performed on individual rows independently, enabling this parallelized execution to continue further via application of some or all query operators. Because the temporary ingress storage system 2410 and the long-term storage system 2420 are separate systems with differently formatted data from which records can be extracted, parallelized reading of rows and/or parallelized execution of a subset of query operators upon these read rows can be leveraged to separately handle rows accessed from these different systems.

Thus, a first query processing sub-module 2452 can be designated to perform row reads from the temporary ingress storage system 2410 for a query's execution and/or to further perform one or more query operators on these read rows to generate a partial resultant of the query based on records read from the temporary ingress storage system 2410. In the illustrated example, the query processing sub-module 2452 sends read requests or otherwise facilitates access to the required rows stored in the temporary ingress storage system 2410 to read a set of records 1-J, for example, corresponding to a set of rows 1-J.

Similarly, a second query processing sub-module 2454 can be designated to perform row reads via access to the long-term storage system 2420 for a query's execution and/or to further perform one or more query operators on these read rows to generate a partial resultant of the query based on records read from the long-term storage system 2420. In the illustrated example, the query processing sub-module 2454 sends read requests or otherwise facilitates access to the required rows stored in the long-term storage system 2420 to read a set of segments 1-L, for example, which each include one or more rows required for the query, where a second set of rows 1-M is extracted from the set of segments 1-L, where M is greater than L. Note that one or more of the segments 1-L may be recovered by the query processing sub-module 2454 rather than being read directly, for example, in response to being unavailable for access. For example, an unavailable segment can be recovered via reading of the required number of other segments in this unavailable segment's segment group to regenerate the unavailable segment, where the required records are then extracted from the regenerated segment.

The partial resultants generated by the query processing sub-module 2452 and the query processing sub-module 2454 can be utilized as input to a final query processing sub-module 2456 that generates a final resultant of the query by performing any remaining query operators on rows included in these partial resultants. For example, aggregation operators, join operators, or other operators that involve use of all rows and/or require use of any set of rows that include both rows accessed from the temporary ingress storage system and the long-term storage system are performed by the query processing sub-module 2456 based on processed or unprocessed sets of rows received from both storage systems. The partial resultants generated by the query processing sub-module 2452 and the query processing sub-module 2454 can collectively include all of the rows required for the query, for example, as raw input rows upon which all query operands are to be applied by the query processing sub-module 2456. The partial resultants generated by the query processing sub-module 2452 and the query processing sub-module 2454 can alternatively include filtered sets of rows accessed from the temporary ingress storage system and/or the long-term storage system based on applying query operators to the read rows prior to sending to the query processing sub-module 2456.

Because query processing sub-module 2452 is responsible for access to records stored by the temporary ingress storage system 2410 and because the query processing sub-module 2454 is responsible for access to records stored by the long-term storage system 2420, the temporary ingress storage system 2410 can utilize its own processing resource to implement the query processing sub-module 2452 and/or the long-term storage system 2420 can implement the utilize its own processing resource to implement the query processing sub-module 2454. For example, query processing sub-module 2452 can be integrated within and/or otherwise implemented by the temporary ingress storage system 2410 to perform the necessary reads to its own memory resources, where the read records are further processed and/or directly sent to the query processing sub-module 2456 by the temporary ingress storage system 2410. Similarly, the query processing sub-module 2454 can be integrated within or otherwise implemented by the long-term storage system 2420 to perform the necessary reads to its own memory drives, where the read records are further processed and/or directly sent to the query processing sub-module 2456 by the long-term storage system 2420. As discussed herein, embodiments of the temporary ingress storage system 2410 can include the query processing sub-module 2452 and/or embodiments of the long-term storage system 2420 can include the query processing sub-module 2454.

FIG. 24I illustrates an embodiment of a query processing module 2450 that utilizes a plurality of nodes 37 in accordance with a tree-structured query execution plan 2465 to execute one or more queries. This implementation of the query processing module 2450 via this tree-structured plurality of nodes of FIG. 24I can be utilized to implement the query processing module 2450 of FIG. 24F, FIG. 24H, and/or any other embodiment of the query processing module 2450 discussed herein.

A query execution plan 2465 can be implemented by the database system 10 to execute one or more queries by utilizing a plurality of nodes 37. Each node 37 can be utilized to implement some or all of the plurality of nodes 37 of some or all computing devices 18-1-18-$n$, for example, of the of the parallelized data store, retrieve, and/or process sub-system 12, and/or of the parallelized query and results sub-system 13. The query execution plan can include a plurality of levels 2460. In this example, a plurality of H levels in a corresponding tree structure of the query execution plan 2465 are included. The plurality of levels can include a top, root level 2462; a bottom, IO level 2466, and one or more inner levels 2464. In some embodiments, there is exactly one inner level 2464, resulting in a tree of exactly three levels 2460.1, 2460.2, and 2460.3, where level 2460.H corresponds to level 2460.3. In such embodiments, level 2460.2 is the same as level 2460.H-1, and there are no other inner levels 2460.3-2460.H-2. Alternatively, any number of multiple inner levels 2464 can be implemented to result in a tree with more than three levels.

This illustration of query execution plan 2465 illustrates the flow of execution of a given query by utilizing a subset of nodes across some or all of the levels 2460. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2466 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2466 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2466 can include all nodes in a given storage cluster 35 and/or can include some or all nodes in multiple storage clusters 35, such as all nodes in a subset of the storage clusters 35-1-35-$z$ and/or all nodes in all storage clusters 35-1-35-$z$. For example, all nodes 37 and/or all currently available nodes 37 of the database system 10 can be included in level 2466. As another example, IO level 2466 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the IO level, but can be included at one or more inner levels 2464 and/or root level 2462.

The query executions discussed herein by nodes in accordance with executing queries at level 2466 can include retrieval of records from the temporary ingress storage system 2410: extracting some or all necessary columns from retrieved records: retrieval of segments from the long-term storage system 2420; extracting some or all necessary records from retrieved segments with some or all necessary columns; and sending these retrieved records to a node at the next level 2460.H-1 as rows of a query resultant generated by the node 37. For each node 37 at IO level 2466, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2464 can include a subset of nodes 37 in the database system 10. Each level 2464 can include a distinct set of nodes 37 and/or some or more levels 2464 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2464 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2464 can further perform a gather function to collect, union, and/or aggregate resultants sent from a previous level, for example, in accordance with one or more corresponding operators of the given query.

The root level 2462 can include exactly one node for a given query that gathers resultants from every node at the top-most inner level 2464. The node 37 at root level 2462 can perform additional query operators of the query and/or can otherwise collect, aggregate, and/or union the resultants from the top-most inner level 2464 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24I, resultants are sent by nodes upstream with respect to the tree structure of the query execution plan as they are generated, where the root node generates a final resultant of the query. While not depicted in FIG. 24I, nodes at a same level can share data and/or send resultants to each other, for example, in accordance with operators of the query at this same level dictating that data is sent between nodes. For example, nodes at an inner level 2464 can exchange resultants, such as particular rows, amongst themselves to be capable of performing operations requiring information regarding other rows such as JOIN operations.

In some cases, the IO level 2466 always includes the same set of nodes 37, such as a full set of nodes and/or all nodes that are in a storage cluster 35 that stores data required to process incoming queries. In some cases, the lowest inner level corresponding to level 2460.H-1 includes at least one node from the IO level 2466 in the possible set of nodes. In such cases, while each selected node in level 2460.H-1 is depicted to process resultants sent from other nodes 37 in FIG. 24I, each selected node in level 2460.H-1 that also operates as a node at the IO level further performs its own row reads in accordance with its query execution at the IO level, and gathers the row reads received as resultants from other nodes at the IO level with its own row reads for processing via operators of the query. One or more inner levels 2464 can also include nodes that are not included in IO level 2466, such as nodes 37 that do not have access to stored segments and/or that are otherwise not operable and/or selected to perform row reads for some or all queries.

The node 37 at root level 2462 can be fixed for all queries, where the set of possible nodes at root level 2462 includes only one node that executes all queries at the root level of the query execution plan. Alternatively, the root level 2462 can similarly include a set of possible nodes, where one node selected from this set of possible nodes for each query and where different nodes are selected from the set of possible nodes for different queries. In such cases, the nodes at inner level 2460.2 determine which of the set of possible root nodes to send their resultant to. In some cases, the single node or set of possible nodes at root level 2462 is a proper subset of the set of nodes at inner level 2460.2, and/or is a proper subset of the set of nodes at the IO level 2466. In cases where the root node is included at inner level 2460.2, the root node generates its own resultant in accordance with inner level 2460.2, for example, based on multiple resultants received from nodes at level 2460.3, and gathers its resultant that was generated in accordance with inner level 2460.2 with other resultants received from nodes at inner level 2460.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2465 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Figures 24J, 24K, 24L:
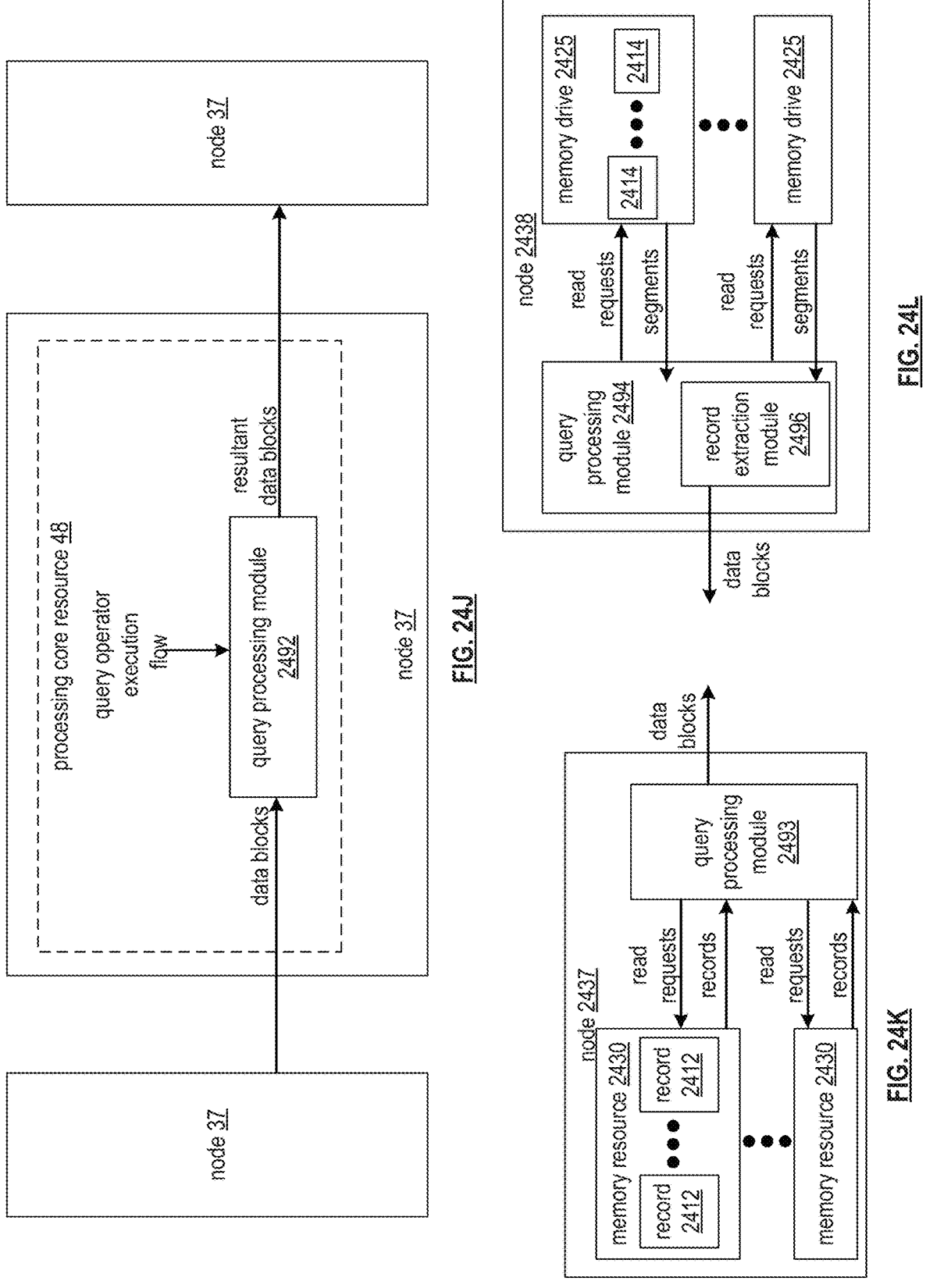
FIG. 24J is a schematic block diagram of a node of that is utilized to facilitate query execution in accordance with various embodiments of the present invention.
FIG. 24K is a schematic block diagram of a node that is utilized to facilitate query execution via access to records stored by the temporary ingress storage system in accordance with various embodiments of the present invention.
FIG. 24L is a schematic block diagram of a node that is utilized to facilitate query execution via access to records stored by the long-term storage system in accordance with various embodiments of the present invention.

FIG. 24J illustrates an embodiment of a node 37 executing a query in accordance with the query execution plan 2465 by implementing a query processing module 2492. Some or all of the features of node 37 of FIG. 24J can be utilized to implement some or all of the nodes 37 of FIG. 24I and/or any other embodiments of node 37 discussed herein. The query processing module 2492 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2465. This embodiment of node 37 that utilizes a query processing module 2492 can be utilized to implement some or all of the plurality of nodes 37 of some or all computing devices 18-1-18-$n$, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2465.

This portion of the particular query assigned to a particular node can correspond to execution plurality of operators indicated by a query operator execution flow 2433. In particular, the execution of the query for a node 37 at an inner level 2464 and/or root level 2462 corresponds to generating a resultant by processing all incoming resultants received from nodes at a lower level of the query execution plan 2465 that send their own resultants to the node 37.

Thus, as used herein, a node 37's full execution of a given query corresponds to only a portion of the query's execution across all nodes in the query execution plan 2465. In particular, a resultant generated by an inner node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2462 can be gathered into a final result of the query, for example, by the node 37 at root level 2462 if this inner level is the top-most inner level 2464 or the only inner level 2464. As another example, resultants generated by each of the plurality of nodes at this inner level 2462 can be further processed via additional operators of a query operator execution flow 2433 being implemented by another node at a consecutively higher inner level 2464 of the query execution plan 2465, where all nodes at this consecutively higher inner level 2464 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

The execution of the query for a node 37 at the IO level can correspond to generating all resultant data blocks by retrieving all of a set of records assigned to the node 37 for execution. This can include simply reading the records from corresponding memory resources 2430 if the rows are stored by the temporary ingress storage system 2410. This can include retrieving and/or recovering all of a set of corresponding, assigned segments that include these records node 37, for example, if the rows are instead stored in the long-term storage system 2420. As will be discussed in further detail in conjunction with FIG. 24K, in some embodiments, each node at the IO level is assigned records corresponding to either the temporary ingress storage system 2410 or the long-term storage system 2420, where each node at the IO level is responsible from reading/extracting rows from only one of these storage systems.

The query processing module 2492 can be implemented by a single core processing resource 48 of the node 37. In such embodiments, each one of the core processing resources 48-1-48-$n$ of a same node 37 can be executing at least one query concurrently via their own query processing module 2492, where a single node 37 implements each of set of query processing modules 2435-1-2435-$n$ via a corresponding one of the set of core processing resources 48-1-48-$n$. A plurality of queries can be concurrently executed by the node 37, where each of its core processing resources 48 can each independently execute at least one query within a same temporal period by utilizing a corresponding at least one query operator execution flow 2433 to generate at least one query resultant corresponding to the at least one query.

FIGS. 24K and 24L illustrate example embodiments of nodes at the IO level 2466 of the query execution plan 2465 of FIG. 24I. The nodes 2437 and 2438 illustrated in FIGS. 24K and 24L, respectively, can be utilized to implement some or all nodes 37 at the IO level of the query execution plan 2465 of FIG. 24I, and can be utilized to implement the query processing module 2450. The nodes 2437 and 2438 can be implemented utilizing functionality and/or hardware of nodes 37 discussed herein, and can be considered as two distinct types of nodes 37, can be considered as nodes 37 configured with particular functionality, and/or can be considered as nodes 27 operating under particular modalities. In particular, a set of nodes 2437 can be utilized to implement a subset of nodes 37 at the IO level 2466. Each node 2437 can be operable to perform row reads for records stored in temporary ingress storage system 2410 output data blocks that include the retrieved rows to be sent to another node 37 at an inner level for processing. Similarly, another set of nodes 2438 can be utilized to implement a different subset of nodes 37 at the IO level 2466. Each node 2438 can be operable to perform row reads for records stored in long-term storage system 2420 to generate output data blocks that include the retrieved rows to be sent to another node 37 at an inner level for processing. Note that nodes 37 can change modalities, can be reassigned functionality, and/or can have their processing and/or memory resources reallocated to change between operating as nodes 37 of FIG. 24I, as nodes 2437 of 24K, and/or as nodes 2438 of 24L over time and/or for different queries within a same time frame.

The query processing modules 2492, 2493, and/or 2494 can be implemented by a single core processing resource 48 of the corresponding node 37, 2437, and/or 2438 respectively. In such embodiments, each one of the core processing resources 48-1-48-$n$ of a same node 37, 2437, and/or 2438 can be executing at least one query concurrently via their own query processing module 2492, 2493, and/or 2494. A single node 37 can implement each of a set of query processing modules 2492-1-2492-$n$ via a corresponding one of the set of core processing resources 48-1-48-$n$. A single node 2437 can similarly implement each of a set of query processing modules 2493-1-2493-$n$ via a corresponding one of the set of core processing resources 48-1-48-$n$. A single node 2438 can similarly implement each of a set of query processing modules 2494-1-2494-$n$ via a corresponding one of the set of core processing resources 48-1-48-$n$. A plurality of queries can be concurrently executed by a node 37, 2437, and/or 2438 where each of its core processing resources 48 can each independently execute at least one query within a same temporal period to generate at least one query resultant corresponding to the at least one query.

As illustrated in FIG. 24K, a node 2437 can utilize its own memory resources, such as some or all of its disk memory 38 and/or some or all of its main memory 40 to implement at least one memory resource 2430 of the temporary ingress storage system 2410. For example, one or more memory devices 42 can be utilized to implement least one corresponding memory resource 2430 of the temporary ingress storage system 2410. In particular, a node 2437 can be responsible for retrieval of only the records stored in its own one or more memory resources 2430. Partial executions of queries corresponding to retrieval of records stored by a particular node 2437 can be assigned to that particular node 2437. In other embodiments, a node 2437 does not use its own resources to store records. A node 2437 can access its assigned records for retrieval via memory resources of another node 2437 and/or via other access to memory resources 2430, for example, by utilizing system communication resources 14. The query processing module 2493 of the node 2437 can be utilized to retrieve the records from memory resources 2430. Once the necessary records of a query are read by the node 2437, the node can further utilize query processing module 2493 to send the retrieved records all at once, or in a stream as they are retrieved from memory resources 2430, as data blocks to the next node 37 in the query execution plan 2465 via system communication resources 14 or other communication channels. In this fashion, one or more nodes 2437 can be utilized to implement the query processing sub-module 2452 of FIG. 24H, as discussed in further detail in conjunction with FIG. 24N.

In addition to performing the first stage of query execution by being responsible for row reads, nodes 2437 can further be integrated within the temporary ingress storage system 2410 by locally storing a set of records in its own memory resource 2430 prior to migration to long-term storage. Nodes 2437 can each also implement their own data conversion module 2418, input data sorting module 2440, record group monitoring module 2448, and/or other modules and/or functionality of embodiments of the temporary ingress storage system 2410 discussed herein. For example, each node 2437 can implement its own independent version of the temporary ingress storage system 2410, where an instance of temporary ingress storage system 2410 can be implemented utilizing processing and memory resources of single node, and where the entirety of the temporary ingress storage system 2410 of the database system can be implemented as a plurality of temporary ingress storage system instances 2410-1-2410-n that are each implemented via one of a corresponding set of nodes 2437-1-2437-n.

Similarly, as illustrated in FIG. 24L, a node 2438 can utilize its own memory resources, such as some or all of its disk memory 38 and/or some or all of its main memory 40 to implement at least one memory drive 2425 of the long-term storage system 2420. For example, one or more memory devices 42 can be utilized to implement least one corresponding memory drive 2425 of the long-term storage system 2420. In particular, a node 2438 can be responsible for retrieval of only the records stored in its own one or more memory drives 2425 as one or more segments 2414. Thus, in addition to performing the first stage of query execution by being responsible for row reads, nodes 2438 can further be integrated within the long-term storage system 2420 by locally storing a set of segments in its own memory drives 2425 after their migration from the temporary ingress storage system 2410. Partial executions of queries corresponding to retrieval of records stored by a particular node 2438 can be assigned to that particular node 2438. In other embodiments, a node 2438 does not use its own resources to store segments. A node 2438 can access its assigned records for retrieval via memory resources of another node 2438 and/or via other access to memory resources 2430, for example, by utilizing system communication resources 14.

The query processing module 2494 of the node 2438 can be utilized to read the assigned by first retrieving or otherwise accessing the corresponding redundancy-coded segments 2414 that include the assigned records its one or more memory drives 2425. Query processing module 2494 can include a record extraction module 2496 that is then utilized to extract or otherwise read some or all records from these segments 2414 accessed in memory drives 2425, for example, where record data of the segment is segregated from other information such as parity data included in the segment and/or where this data containing the records is converted into row-formatted records from the column-formatted record data stored by the segment. Once the necessary records of a query are read by the node 2438, the node can further utilize query processing module 2494 to send the retrieved records all at once, or in a stream as they are retrieved from memory resources 2430, as data blocks to the next node 37 in the query execution plan 2465 via system communication resources 14 or other communication channels. In this fashion, one or more nodes 2438 can be utilized to implement the query processing sub-module 2454 of FIG. 24H, as discussed in further detail in conjunction with FIG. 24N.

Figure 24M:
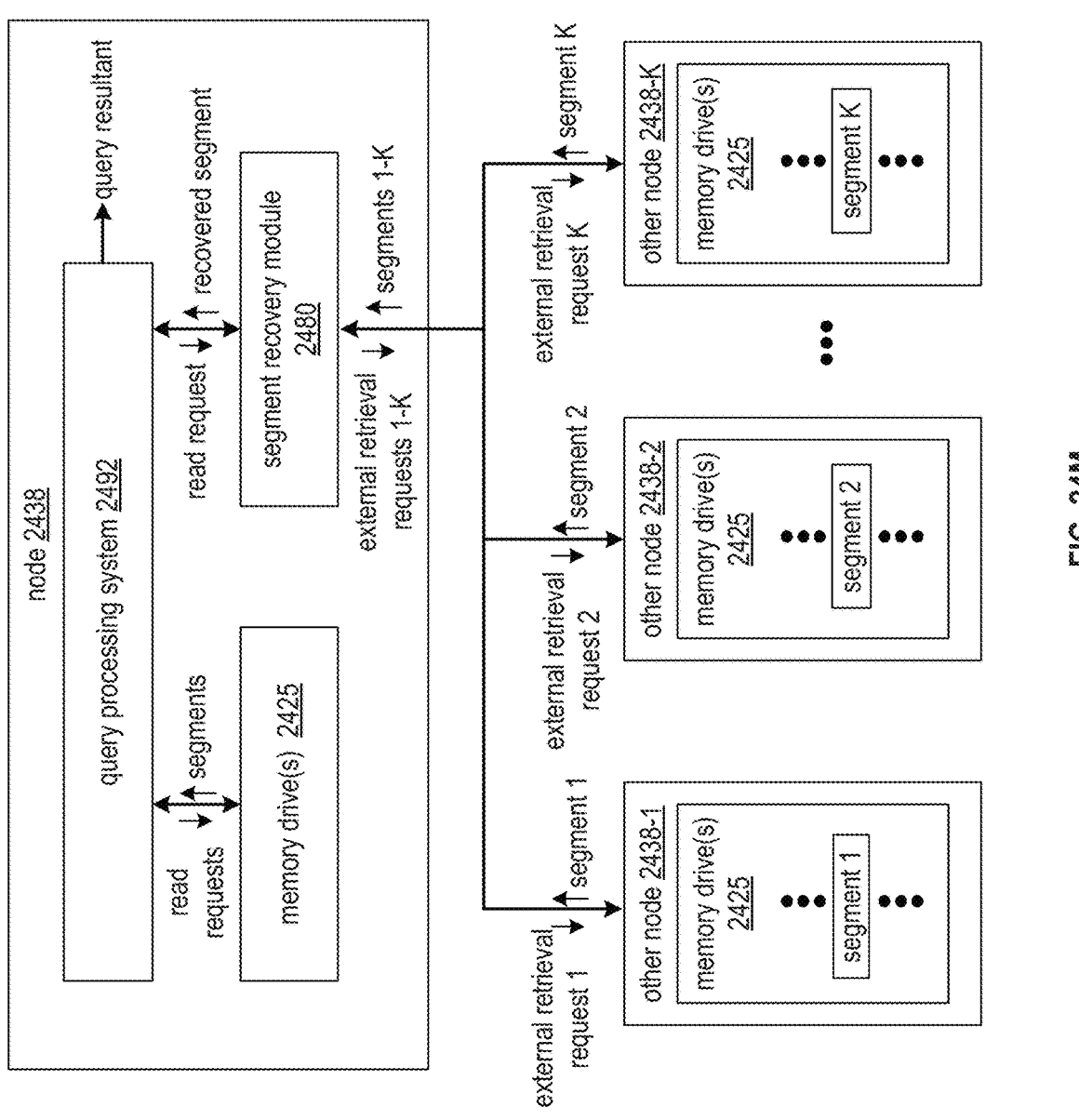
FIG. 24M is a schematic block diagram of a node that is utilized to facilitate query execution via recovery of records stored by the long-term storage system in accordance with various embodiments of the present invention.

FIG. 24M illustrates an embodiment of a node 2438 that implements a segment recovery module 2480 to recover some or all segments that are assigned to the node for retrieval, in accordance with processing one or more queries, that are unavailable. For example, a node 2438 may store segments on one of its own memory drives 2425 that becomes unavailable, or otherwise determines that a segment assigned to the node for partial execution of a query is unavailable for access via a memory drive the node 2438 accesses via system communication resources 14. The segment recovery module 2480 can be implemented via at least one processing module of the node 2438, such as resources of central processing module 39. The segment recovery module can retrieve the necessary number of segments 1-K in the same segment group as an unavailable segment from other nodes 37, such as a set of other nodes 2438-1-2438-K that store segments in accordance with the long-term storage system 2420. Using system communication resources 14 or other communication channels, a set of external retrieval requests 1-K for this set of segments 1-K can be sent to the set of other nodes 2438-1-2438-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2496, and can be sent as data blocks to another node 37 for processing in conjunction with other records extracted from available segments retrieved by the node 2438 from its own memory drives 2425. Some or all of the features of the embodiment of node 2438 illustrated in FIG. 24M can be utilized to implement the node 2428 of FIG. 24L and/or other embodiments of nodes 37 and/or nodes 2438 discussed herein. In some cases, the segment recovery module 2480 can be implemented by other nodes 37, such as nodes 2437.

Figure 24N:
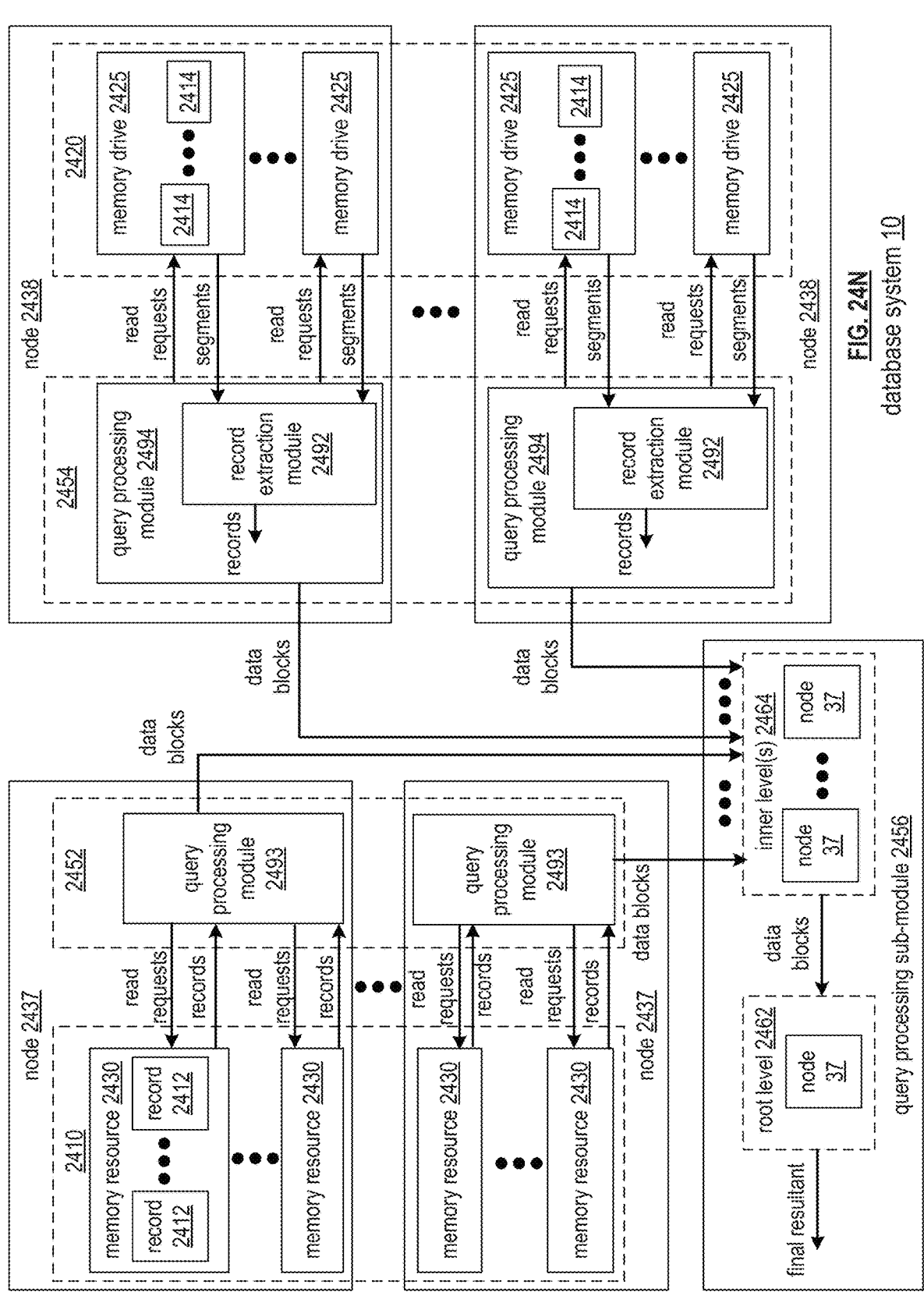
FIG. 24N is a schematic block diagram of a database system that implements a plurality of nodes to facilitate query execution via access to records stored by the long-term storage system and the temporary ingress storage system in accordance with various embodiments of the present invention.

FIG. 24N illustrates an embodiment of a database system 10 that implements the temporary ingress storage system

2410, the long-term storage system 2420, and the query processing module 2450 via a plurality of nodes 37, a plurality of nodes 2437, and a plurality of nodes 2438. In particular, this plurality of nodes can correspond to the set of nodes of a query execution plan 2465 as discussed in conjunction with of FIG. 24I, where some or all nodes 37, 2437, and/or 2438 are implemented as discussed in FIG. 24K. Some or all of the features of database system 10, including the implementation of the temporary ingress storage system 2410, the long-term storage system 2420, and/or the query processing module 2450 via a plurality of nodes 37 can be utilized to implement the database system 10 of FIG. 24A, FIG. 24F, FIG. 24H, and/or any other embodiments of the database system 10 discussed herein.

In particular, a plurality of nodes 2437 can be implemented as a first subset of the set of nodes 37 at the IO level 2466 of query execution plan 2465 of FIG. 24I, and a plurality of nodes 2438 can be implemented as a second subset of the set of nodes 37 at the IO level 2466 of query execution plan 2465 of FIG. 24I. The first subset and second subset can be mutually exclusive and/or collectively exhaustive with regards to the set of nodes at the IO level 2466.

The collective set of memory resources 2430 across the plurality of nodes 2437 that constitute the first subset of the set of nodes 37 of IO level 2466 are integrated within and/or utilized to implement some or all of memory resources 2430 the temporary ingress storage system 2410 itself. Additionally, the collective query processing modules 2493 of this plurality of nodes 2437 can be utilized to implement the query processing sub-module 2452, as they are each utilized for reading of the necessary set of records from the memory resources 2430 of the corresponding node 2437.

Similarly, collective set of memory drives 2425 across of the plurality of nodes 2438 that constitute the second subset of the set of nodes 37 of IO level 2466 are integrated within and/or utilized to implement some or all of memory resources 2430 the temporary ingress storage system 2410 itself. Additionally, the collective query processing modules 2494 of this plurality of nodes 2438 can be utilized to implement the query processing sub-module 2454, as they are each utilized for reading of the necessary set of records from the memory resources 2430 of the corresponding node 2437.

The final query processing sub-module 2456 can receive the data blocks from all nodes 2437 and 2438 for further processing, for example, by applying some or all query operators to records included in these data blocks. In particular, each node 2437 and 2438 of the IO level 2466 sends their data blocks to the designated next node 37 in the bottom-most inner level 2464 of the query execution plan 2465 as illustrated in FIG. 24I for processing, and these nodes 37 process the data blocks accordingly and data blocks are propagated up the tree until the root node processes its data blocks to generate the final resultant. Query processing sub-module 2456 can thus be implemented by utilizing the nodes 37 of one or more inner levels 2464 and/or the root level node 37 of root level 2462. Note that as different queries may have different query execution plans 2465 with different sets of nodes 37 assigned to each level, different sets of nodes 37 can be utilized to implement the query processing sub-modules 2452, 2454, and/or 2456 for different queries processed by the system. Also note that as some nodes 37 may be included in multiple levels of the query execution plan 2465, some nodes 2437 of query processing sub-module 2452 may also be implemented as nodes 37 of query processing sub-module 2456 for one or more same queries and or one or different queries, where nodes 2437 are also operable to implement query processing module 2492 by execution query operators upon records received in data blocks from other nodes. Similarly, some nodes 2438 of query processing sub-module 2454 may also be implemented as nodes 37 of query processing sub-module 2456 for one or more same queries and or one or different queries, where nodes 2438 are also operable to implement query processing module 2492 by execution query operators upon records received in data blocks from other nodes.

In various embodiments, a database system includes a temporary ingress storage system, a long-term storage system, and a query processing module. At least one processing module of the database system includes at least one processor and memory that stores operational instructions that, when executed by the at least one processing module, cause the at least one processing module of the database system to receive, via a temporary ingress storage system, a set of records for storage via the database system. The operational instructions, when executed by the at least one processing module, further cause the at least one processing module of the database system to temporarily store, via the temporary ingress storage system, the set of records during a first temporal period. The operational instructions, when executed by the at least one processing module, further cause the at least one processing module of the database system to receive, via the query processing module, a query for execution during the first temporal period. The operational instructions, when executed by the at least one processing module, further cause the at least one processing module of the database system to identify, via the query processing module, a subset of the set of records that are required to execute the query. The operational instructions, when executed by the at least one processing module, further cause the at least one processing module of the database system to facilitating execution of the query by accessing the subset of the set of records from the temporary ingress storage system during the first temporal period. The operational instructions, when executed by the at least one processing module, further cause the at least one processing module of the database system to migrate the set of records from the temporary ingress storage system to a long-term storage system for storage during a second temporal period that begins after the first temporal period has elapsed.

In various embodiments, a temporary ingress storage system includes a plurality of memory resources. The temporary ingress storage system includes at least one processor and memory that stores operational instructions that, when executed by the temporary ingress storage system, cause the temporary ingress storage system to: receive a set of records for storage via the database system, temporarily store the set of records in a set of memory resources of the temporary ingress storage system during a first temporal period, facilitate execution of a query by accessing a subset of the set of records from at least one memory resource of the set of memory resources during the first temporal period, process the set of records to generate a set of segments for long-term storage, and facilitate migration of the set of records from the set of memory resources to a long-term storage system for storage during a second temporal period that begins after the first temporal period has elapsed by sending the set of segments to the long-term storage system.

FIG. 24O illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 24O. Some or all of the method of FIG. 24O can otherwise be performed by the temporary ingress storage system 2410 and/or the query processing module 2450, for example, by utilizing at least one processor and memory of the temporary ingress storage system 2410 to implement the data conversion module 2418 and/or by utilizing at least one processor and memory of query processing module 2450 to implement the query processing sub-module 2452. This can include utilizing the query processing module 2493 of at least one of a plurality of nodes 2437 with memory resources 2430 utilized to implement the temporary ingress storage system 2410. Some or all of the steps of FIG. 24O can optionally be performed by any other processing module of the database system 10. Some or all of the steps of FIG. 24O can be performed to implement some or all of the functionality of the database system 10 described in conjunction with FIGS. 24A-24N. Some or all steps of FIG. 24O can be performed by database system 10 in accordance with other embodiments of the temporary ingress storage system 2410 discussed herein.

Step 2471 includes receiving a set of records for storage via the database system. Step 2472 includes temporarily storing the set of records in a temporary ingress storage system of the database system during a first temporal period, for example, by utilizing a plurality of memory resources 2430. Step 2473 includes receiving and/or determining a query for execution during the first temporal period. Step 2474 includes identifying a subset of the set of records that are required to execute the query. Step 2475 includes facilitating execution of the query by accessing the subset of the set of records from the temporary ingress storage system during the first temporal period. Step 2476 includes migrating the set of records from the temporary ingress storage system to a long-term storage system for storage during a second temporal period that begins after the first temporal period has elapsed.

FIG. 24P illustrates a method for execution by at least one processing module of a temporary ingress storage system 2410. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 24P. Some or all of the method of FIG. 24P can otherwise be performed by the temporary ingress storage system 2410, for example, by utilizing at least one processor and memory of the temporary ingress storage system 2410 to implement the data conversion module 2418 and/or the memory resources 2430. Some or all of the steps of FIG. 24P can optionally be performed by any other processing module of the database system 10. Some or all of the steps of FIG. 24P can be performed to implement some or all of the functionality of the temporary ingress storage system 2410 described in conjunction with FIGS. 24A-24N. Some or all steps of FIG. 24P can be performed by database system 10 in accordance with other embodiments of the temporary ingress storage system 2410 discussed herein.

Step 2482 includes receiving a set of records to be processed for long-term storage. Step 2484 includes temporarily storing the set of records in a set of memory resources during a first temporal period. Step 2486 includes facilitating execution of a query by accessing a subset of the set of records from at least one memory resource of the set of memory resources during the first temporal period. Facilitating execution of the query can further include performing at least one query operation of the query on the subset of the set of records to generate resultant data. Step 2488 includes processing the set of records to generate a set of segments for long-term storage. Step 2490 includes facilitating migration of the set of records from the temporary ingress storage system to a long-term storage system for storage during a second temporal period that begins after the first temporal period has elapsed by sending the set of segments to the long-term storage system. This can further include removing the set of records from storage in the set of memory resources, for example, via a plurality of deletion requests to delete the set of records.

In various embodiments, the set of records are stored in the set of memory resources of the temporary ingress storage system in accordance with a row format. The method can further include generating the set of segments from the set of records to each include column-formatted record data, where the column-formatted record data of each segment of the set of segments indicates a plurality of records of the set of records in accordance with a column-format. In various embodiments, the method further includes performing a redundancy storage coding function on the set of records and/or on the column-formatted record data to generate the set of segments as redundancy-coded segments.

In various embodiments, the method further includes generating a set of replicas for each of the set of records in accordance with the row format. For example, the data replication module presented in FIG. 25A and discussed in further detail herein can be utilized to generate the set of replicas. Temporarily storing the set of records in the set of memory resources can include storing the set of replicas for each of the set of records in the set of memory resources as discussed in further detail herein. The method can further include removing the set of replicas for each of the set of records from storage in the set of memory resources in conjunction with the migrating the set of records from the temporary ingress storage system.

In various embodiments, facilitating execution of the query includes accessing exactly one selected replica of the set of replicas for each record in the subset. In various embodiments, a first one of a first set of replicas of a first record in the subset of the set of records is selected for access of a first record in facilitating execution the query. The method can further include facilitating execution of a second query during the first temporal period that requires access to the first record. The method can further include selecting a second one of the first set of replicas of the first record for access of the first record in execution of the second query. The method can further include facilitating execution of the second query by accessing the second one of the first set of replicas.

In various embodiments, the memory resources are implemented utilizing at least one first type of memory device. The long-term storage system is implemented utilizing at least one second type of memory device. The first type of memory device enables more efficient access of the set of records than the second type of memory device. In various embodiments, the first type of memory device is implemented utilizing a Dynamic Random Access Memory (DRAM).

In various embodiments, the set of records are received over a plurality of sequential time slices within the first temporal period. The method can further include determining to migrate the set of records to the long-term storage system based on a number of records in the set of records comparing favorably to a predefined threshold. In various embodiments, the method includes receiving a plurality of records within the first temporal period, and further includes grouping the plurality of records into a plurality of sets of records based on applying a similarity function, where the plurality of sets of records includes the set of records.

In various embodiments, the method further includes temporarily storing a second set of records in the set of memory resources during the second temporal period, for example, based on being received after the set of records are migrated to the long-term storage system. The method further includes facilitating execution of a second query during the second temporal period by accessing a subset of the second set of records in the set of memory resources. Full execution of the query by a query processing module is facilitated via access to a second subset of the set of records that are stored in the long-term storage system during the second temporal period as a result of migrating the second subset of the set of records stored in the long-term storage system. For example, the second subset of the set of records accessed from the long-term storage system and the subset of the second set of records accessed from temporary ingress storage system are all utilized by the query processing module for executing the second query.

In various embodiments, a non-transitory computer readable storage medium includes at least one memory section that stores operational instructions that, when executed by a processing module that includes a processor and a memory, cause the processing module to receive a set of records to be processed for long-term storage: to temporarily store the set of records in a set of memory resources during a first temporal period; to facilitate execution of a query by accessing a subset of the set of records from at least one memory resource of the set of memory resources during the first temporal period: to process the set of records to generate a set of segments for long-term storage; and/or to facilitate migration of the set of segments to a long-term storage system for storage during a second temporal period that begins after the first temporal period has elapsed by sending the set of records to the long-term storage system.

Figures 25A, 25B:
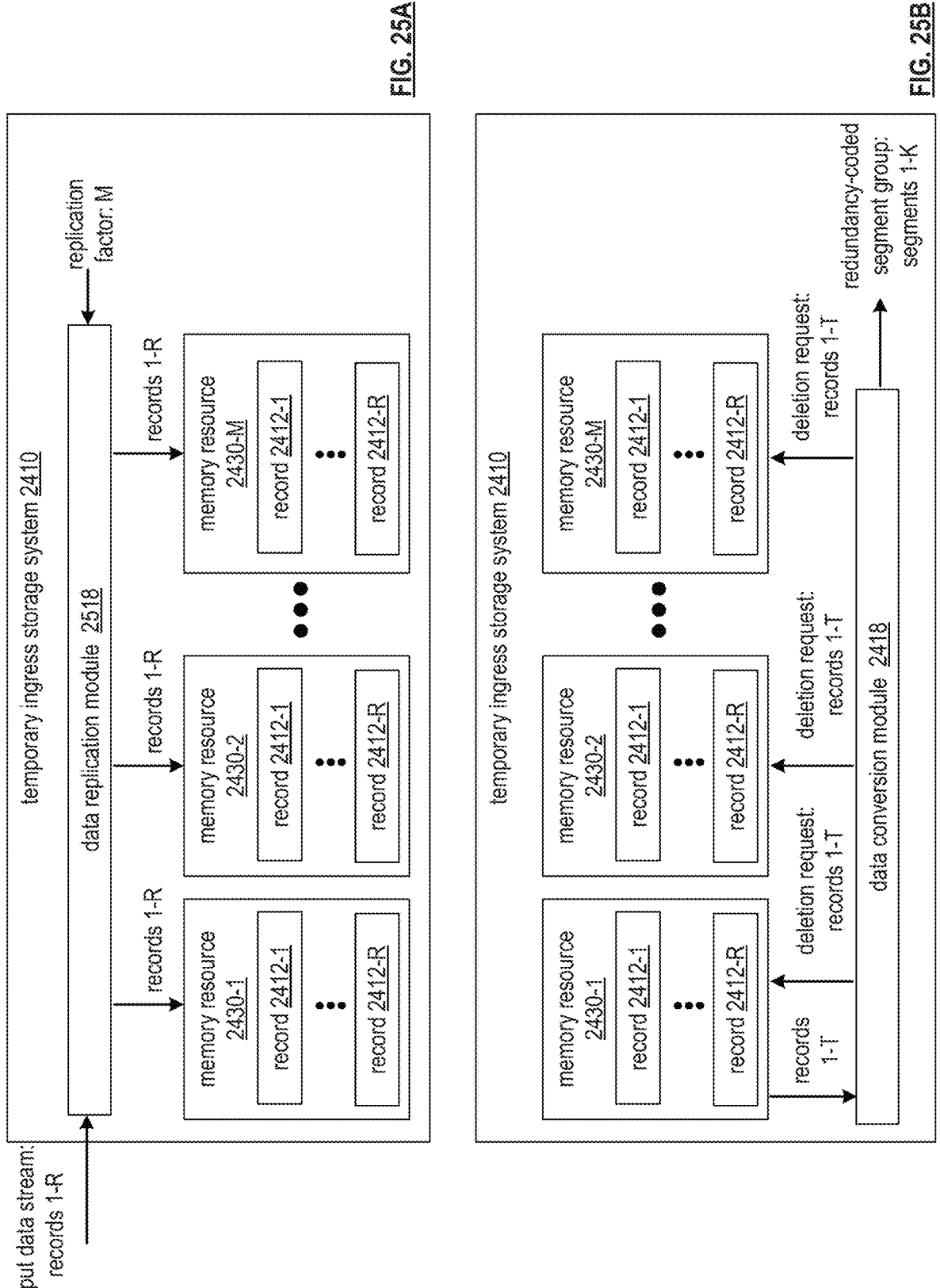
FIGS. 25A-25C are schematic block diagrams of a temporary ingress storage system that implement a data replication module to replicate records for temporary storage and a data conversion module to generate redundancy-coded segments for long-term storage in accordance with various embodiments of the present invention.
Figure 25C:
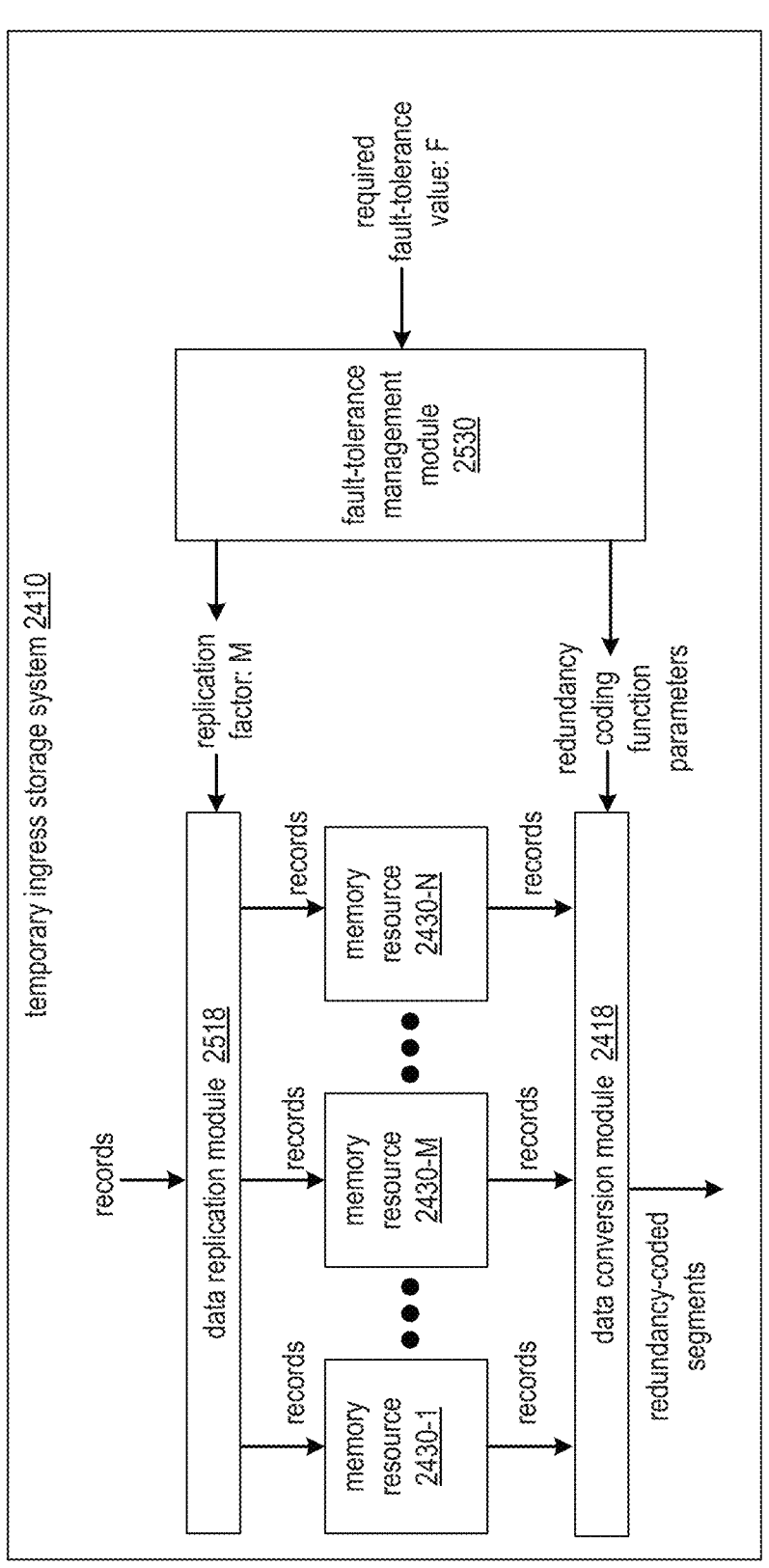

FIGS. 25A-25C present embodiments of a temporary ingress storage system 2410 that implements a data replication module 2518 to replicate incoming records, where a set of multiple replicas of some or all records pending long-term storage are stored in memory resources 2430. Some or all features of the embodiments of temporary ingress storage system 2410 of FIGS. 25A-25C can be utilized to implement the temporary ingress storage system 2410 of FIGS. 24A-24N and/or any other embodiments of the temporary ingress storage system 2410 discussed herein.

Given that records received by the database system are first stored in temporary ingress storage system 2410 and then migrated to the long-term storage 2420, ideally, any record that has been received by the database system in the input data stream and/or in a bulk input of records should be accessible for query execution via either temporary ingress storage system 2410 or the long-term storage system 2420 at any given point in time. Drive failures or other faults in long-term storage system 2420 can be handled to a fault-tolerance level dictated by the redundancy storage coding scheme: if a record is be unavailable due to its segment being unavailable in the long-term storage system 2420, it is still recoverable given that the required number of other segments in the segment group are available in the long-term storage system 2420. In some cases, a similar fault-tolerance is desired to be implemented in the temporary ingress storage system 2410 to ensure access to its records to a similar degree. However, as the main purpose of the temporary ingress storage system 2410 is to process records for long-term storage by generating the necessary redundancy-coded segments, a redundancy storage coding scheme such as the RAID scheme or erasure coding scheme utilized to generate and store segments 2414 cannot be effectively utilized by the temporary ingress storage system 2410 for its own fault-tolerance because these redundancy-coded segments take time to form, and are intended for migration to long-term storage 2420 once formed. Instead, utilizing replication as a fault-tolerance mechanism while in ingress is effective as it is low cost from a time and processing perspective, which is ideal for the lightweight, temporary nature of records stored in the temporary ingress storage system 2410.

To achieve the desired fault-tolerance in the temporary ingress storage system 2410, a replication mechanism can be utilized to more robustly store records awaiting their conversion to redundancy-coded segments. In particular, to ensure that incoming data is sufficiently robust to service queries at a same level of robustness as permanently stored data in long-term storage, the records being processed in ingress can be replicated while in ingress by a replication factor dictated by the redundancy storage encoding scheme utilized in long-term storage. For example, both the replication scheme, utilized to temporarily store pending records 2412 stored in the temporary ingress storage system 2410 while they await conversion to segments 2414 for migration long-term storage, and the erasure coding scheme and/or RAID encoding scheme of the redundancy storage encoding scheme utilized by the data conversion module 2418 to actually generate the segments 2414 for storage in in long-term storage system 2420, can be configured in accordance with a same fault-tolerance level. This common fault-tolerance level can correspond to allowance of up to a same number of outages of memory drives 2425 as memory resources 2430 for access/recovery of records to be guaranteed; up to a same failure rate of memory drives 2425 as memory resources 2430 for access/recovery of records to be guaranteed; and/or up to a same failure rate of nodes 2437 utilized to implement the temporary ingress storage system 2410 as the failure rate of nodes 2438 utilized to implement the long-term storage system 2420 for access/recovery of records to be guaranteed. This common fault-tolerance level can alternatively or additionally correspond to allowing up to a same number unavailable replicas of a same record in the temporary ingress storage system 2410 to guarantee access to the record as the number of unavailable segments in a segment group allowed by the redundancy storage coding scheme to guarantee recovery of a segment.

In this fashion, records can be durably stored by the database system in two ways: records can be robustly stored in the temporary ingress storage system 2410 as a set of row-formatted replicas in accordance with the common fault-tolerance level, such as a fault-tolerance level of up to N failures, and records can be robustly stored in the long-term storage system 2420 as column-formatted segments generated via the redundancy storage coding scheme in accordance with the common fault-tolerance level. As discussed herein, records being stored by the temporary ingress storage system 2410 as multiple records in accordance with a required fault-tolerance level can be considered "durably stored", and records being stored by the long-term storage system 2420 as column-formatted segments generated via the redundancy storage coding scheme in accordance with the common fault-tolerance level can also be considered "durably stored." Records that are not stored via either of these requirements, such as records received by the temporary ingress storage system 2410 prior to having the appropriate number of replicas generated and stored by the temporary ingress storage system 2410, are not "durably stored", and can be considered "non-durably stored."

In some embodiments, records will not be utilized to service queries until they are durably stored. For example, within timeframe starting from a first time when the record is received in the input data stream by the temporary ingress storage system 2410 and ending at a second time that the number of necessary replicas as dictated by the common fault-tolerance level are generated are generated and stored by the temporary ingress storage system 2410, the record will not be utilized in query execution, despite having a single copy accessible via the temporary ingress storage system 2410. This can be advantageous in ensuring that records that are not yet durably stored in this timeframe, and thus not guaranteed to be accessible to the common fault-tolerance level, will not cause deviation in resultants of multiple queries performed on the records during this timeframe. In particular, if queries are performed utilizing records that are not yet durably stored, these queries are not guaranteed to be correct up to the common fault-tolerance level. For example, query resultants are not guaranteed to include and/or have their resultant reflect the record if it is not durably stored, which could cause query resultants to be unreliable or contradictory based on such records being represented in some resultants but not others due to being non-durably stored and thus not being capable of withstanding the required number of faults.

In such embodiments, a record is not considered to be ingested by the database system 10 and/or accessible for query execution until it has been durably stored by having the required number of replicas generated and stored in the by the temporary ingress storage system 2410 to render the record durably stored. For example, in response to confirming the record has been durably stored via the temporary ingress storage system 2410, the database system can generate a notification for transmission to a client device for display via a display device to a user, such as an end user that generates query requests and/or a data supplying user that is responsible for some or all records in the input data stream, to notify the end user that the data has been ingested and will thus be utilized in executing future queries.

Alternatively or in addition, once a record is durably stored by the temporary ingress storage system 2410 via a set of replicas, the record will always persist as a durably stored record by the database system from its remaining time in ingress, through its migration to long-term storage system 2420, and while it is stored in long term storage. The change in storage medium and/or storage format rendered by migrating a record from temporary ingress storage system 2410 long-term storage system 2420 does not change or disrupt the durable storage of the record. Rather than risking conflicting resultants of query executions that could be generated by the record being reflected in some resultants but not others if the record were to re-enter a period of non-durable storage, this seamless maintenance of a record's durability as it undergoes migration is advantageous as it ensures continuity in query resultants from the time the record is first available for query execution. For example, by ensuring there are no timeframes once a record is durably stored where it again becomes non-durably stored, query resultant correctness can be guaranteed. In particular, any durably stored record will always show up in query resultants (if applicable) from the time it becomes durable, regardless of whether the record is durably stored in temporary ingress storage system 2410 via a set of replicas or is durably stored the long-term storage system 2420 as column-formatted segments generated via the redundancy storage coding scheme. To an end user that requests queries to be performed against the database system, the current location and/or current storage format of a durably stored record will not matter nor be distinguishable, as it will always be reflected in query resultants once durable regardless of whether it is currently stored in ingress, long-term storage, or in the process of being migrated.

This mechanism of storing multiple replicas of records as they await conversion for migration to long-term storage improves database systems by further ensuring that queries can be serviced by utilizing this newest, incoming data prior to conversion for long-term storage because it further increases the robustness of access to records temporarily stored in ingress to achieve durable storage while in ingress. Furthermore, setting the replication factor utilized to store incoming data based on a system-wide fault tolerance standard that is also adhered to by the redundancy storage coding scheme of the segments in long-term storage enables consistent fault-tolerance levels to be attained for all records stored in the database system 10 and/or for all records that are accessible for query execution. Finally, as discussed previously in conjunction with FIG. 24G, as the data-hotness of the new data in the temporary ingress storage system 2410 tends to be in highest demand and therefore often has a higher corresponding access load, multiple replicas of the same data enables different queries, for example, being executed concurrently, to be executed on the same, high demand data in the temporary ingress storage system 2410 more effectively, as the access load can be balanced across the different copies stored in different memory resources, for example, by different nodes 2437.

As illustrated in FIG. 25A, a data replication module 2518 can be implemented to generate a plurality of replicas for each of a plurality of incoming records 1-R. Each record can be replicated in accordance with a replication factor M. The replication factor M can be: received by the temporary ingress storage system 2410; stored locally by at least one memory of the temporary ingress storage system 24101; accessible by the temporary ingress storage system 2410; and/or that are otherwise determined by the temporary ingress storage system 2410. The replication factor M can be selected by and/or received from the fault-tolerance management module of FIG. 25C. In some cases, the replication factor is configured via user input to an interactive interface displayed via a display device of a client device communicating with the database system via system communication resources 14 and/or external network(s), for example, in conjunction with the configuration sub-system 16. In some cases, different replication factors can be determined for different records, where different types of records are replicated to generate different numbers of copies. Each set of replicated records can be stored across a set of memory resources 2430-1-2430-M, where each memory resource 2430 in a set of M resources store one replica of a given record.

Note that prior to a record having a set of M replicas being stored in the set of M resources of the temporary ingress storage system 2410, this record is non-durably stored, and in some cases, will thus not be utilized to service queries during this time based on being non-durably stored. Once all of the set of M replicas are successfully stored in the set of M resources of the temporary ingress storage system, this record is durably stored, and is some cases, will persist as a durably stored record for its remaining time in temporary ingress storage system 2410, while being migrated to long-term storage system 2420, and while being stored in long-term storage system 2420 as discussed previously.

In some embodiments, the set of memory resources 2430-1-2430-M storing a set of replicas can all be integrated via different corresponding nodes 2437 of the temporary ingress storage system 2410, and/or distinct computing devices 18-1-18-M that each implement one or nodes 2437, to further ensure that node outages isolate the impact on replicas. For example, a particular node 2437, and/or a particular computing device 18 that implements one or more nodes 2437, stores exactly one replica of each of its records, where all of its records have M-1 records stored on M-1 other nodes 2437 and/or M-1 other computing devices 18. Alternatively or in addition, a set of replicas of a records can be distributed across memory resources implemented via distinct memory devices and/or implemented in distinct physical locations. This mechanism for distributing the replicas across different nodes, devices, and/or physical locations can be ideal in ensuring replicas persist in the case of a failure and/or outage of a particular node, device, and/or physical location.

In some cases, a primary copy of each record is utilized by the data conversion module 2418 to generate redundancy-coded segments. In the example illustrated in FIG. 25B, a particular memory resource 2430-1 stores primary copies of a set of records 1-R, and remaining backup copies of each record are stored on M minus 1 other memory resources 2430. The data conversion module 2418 can determine a particular subset of records 1-T of the set of records 1-R is ready to be processed, for example, based on being included in a record group 2445 that is determined by the record group monitoring module 2448 to be ready for migration. The primary copies of records 1-T are accessed and/or otherwise utilized by the data conversion module 2418 to generate a segment group of redundancy-coded segments 1-K. While it can be advantageous for the same memory resource 2430 or consistent set of memory resources to store all primary copies of records in a record group being converted, in some cases, different records being processed in a same record group for conversion are accessed by the data conversion module 2418 from storage in different memory resources 2430, for example, to balance access load induced by the data conversion module 2418 across a vaster set of memory resources.

This set of primary copies is sufficient to generate the set of segments 1-K, and backup copies of the records 1-T need not be accessed for conversion, Instead they persist for backup purposes only, and can be accessed by the data conversion module 2418 only in cases where the primary copies become unavailable, for example, due to memory resource 2430-1 failing. Furthermore, the backup copies can be accessed to service query executions. In some cases, to ensure data conversion is not disrupted or congested, all query executions are serviced via access to backup copies of records, while primary copies are only accessed for the purposed of data conversion via data conversion module 2418.

Once a particular record stored by the temporary ingress storage system 2410 as a set of M replicas is successfully migrated to long-term storage, all of the copies of the record can be deleted from their respective memory resources 2430. Once confirmation is received or determined indicating that the records 1-T have been successfully converted and migrated to long-term storage system 2420, all copies of the records 1-T can be deleted. As illustrated in FIG. 25B, this can include sending of deletion requests to the set of memory resources 1-M storing the set of records 1-T, where the memory resources delete their respective copies of these records in response. These requests can be generated and sent by the data conversion module 2418 or other processing module of the temporary ingress storage system 2410 that determines migration was successful.

FIG. 25C illustrates an embodiment of the temporary ingress storage system 2410 that utilizes a fault-tolerance management module 2530 to ensure that the level of fault-tolerance achieved via copies of records while stored in the temporary ingress storage system 2410 matches or otherwise compares favorably to the level of fault-tolerance achieved in long-term storage as dictated by the redundancy storage coding scheme utilized by the data conversion module 2418 to generate the redundancy-coded segments. The fault-tolerance management module 2530 can determine a required fault-tolerance value F, which can indicate a maximum number of memory outages and/or failures allowed, a maximum number of node outages and/or failures allowed, a maximum number of computing device outages and/or failures allowed, a maximum number of missing segments allowed, a maximum number of missing replicas allowed, information or parameters regarding the redundancy coding function to be utilized in long-term storage, information regarding the number of replicas to be stored in ingress, and/or or other information indicating fault-tolerance information. This required fault-tolerance information can be: received by the temporary ingress storage system 2410; stored locally by at least one memory of the temporary ingress storage system 2410; accessible by the temporary ingress storage system 2410; and/or that are otherwise determined by the temporary ingress storage system 2410. In some cases, the required fault-tolerance information is be configured via user input to an interactive interface displayed via a display device of a client device communicating with the database system via system communication resources 14 and/or external network(s), for example, in conjunction with the configuration sub-system 16.

The required fault-tolerance value F, or the other received fault-tolerance information, can be utilized by the fault-tolerance management module 2530 to determine the replication factor M that will be utilized by the data replication module 2518 and to further determine the particular redundancy coding function parameters. In some cases, the replication factor M can be calculated as a function of the required fault-tolerance value F. For example, if the required fault-tolerance value F indicates an allowed number of F missing replicas and/or F outages that can be guaranteed to be tolerated, the replication factor M can be set to F+1. The replication factor M can otherwise be an increasing function of required fault-tolerance. Similarly, the particular redundancy coding function parameters can be calculated or otherwise determined as a function of F.

As a particular example, if the if the required fault-tolerance value F indicates an allowed maximum of 2 failures, a RAID 6 scheme can be selected for implementation by the data conversion module 2418 to handle two points of failure in the long-term storage system and/or to handle two unavailable segments, and a replication factor of 3 can be selected for utilization by the data replication module 2518 to handle two points of failure in the temporary ingress storage system and/or to handle two unavailable replicas. In some cases, the probability of failure, failure history, and/or current health of the memory drives 2425 vs. the memory resources 2430 can be taken into account, and if there is a large discrepancy, the replication factor and/or redundancy storage coding function parameters can be further modified accordingly to further align the fault-tolerance between the two systems, despite having differing probabilities of memory failures and/or outages themselves. In some cases, the fault-tolerance information can indicate different fault-tolerances be applied to different types of records, and the replication factor M and/or particular redundancy coding function parameters can be determined as different values to be applied to different types of incoming records accordingly.

Additionally, as illustrated in FIG. 25C, the temporary ingress storage system 2410 can include a plurality of resources 2430-1-2430-N, where N is greater than M, such as orders of magnitude greater than M. M replicas can be generated for each record, and these M replicas can be stored in a set of M different memory resources 2430. However, different sets of M records can be stored in different subsets of M memory resources 2430 of the total plurality of N memory resources, for example, where subsets of M memory resources 2430 are selected for incoming records to evenly distribute record replica storage across all N possible memory resources.

FIG. 25D illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 25D. Some or all of the method of FIG. 25D can otherwise be performed by the temporary ingress storage system 2410, for example, by utilizing at least one processor and memory of the temporary ingress storage system 2410 to implement the data replication module 2518, the data conversion module 2418, and/or the fault-tolerance management module 2530 of FIGS. 25A-25C. Some or all of the steps of FIG. 25D can optionally be performed by any other processing module of the database system 10. Some or all of the steps of FIG. 25D can be performed to implement some or all of the functionality of the database system 10 described in conjunction with FIGS. 25A-25C. Some or all steps of FIG. 25D can be performed by database system 10 in accordance with other embodiments of the temporary ingress storage system 2410 discussed herein.

Step 2582 includes determining a required fault-tolerance level for the system, for example, based on user input, based on determined system requirements, based on a predicted outage rate of hardware of the system, and/or based on other information. Step 2584 includes receiving a record for storage in the database system, for example, in an input data stream and/or in a bulk-loaded set of records. Step 2586 includes applying a replication factor dictated by the required fault-tolerance level to generate a set of replicas of the record, for example, by utilizing the data replication module 2518. Step 2588 includes temporarily storing the set of replicas in a temporary ingress storage system of the database system during a first temporal period, such as in a corresponding set of distinct memory resources 2430 on different devices and/or in different physical locations. Storage of the set of replicas in the temporary ingress storage system can achieve storage of the record in accordance with the required fault-tolerance level based on the set of records being generated via the replication factor dictated by the required fault-tolerance level. Step 2590 includes generating a set of segments that includes the record by utilizing a redundancy storage coding scheme dictated by the required fault-tolerance level, for example, by utilizing the data conversion module 2418 to generate the set of segments of a segment group from a record group that includes a plurality of pending records stored by memory resources 2430. This can include setting and/or applying RAID scheme parameters and/or erasure coding scheme parameters based on the required fault-tolerance level.

Step 2592 includes migrating the record from the temporary ingress storage system to a long-term storage system for storage, for example, by utilizing the system communication resources 14. This can include storing the set of segments in the long-term storage system 2420, for example, in a corresponding set of distinct memory drives 2425 on different memory devices and/or in different physical locations. This can further include removing the set of replicas from the temporary ingress storage system 2410, for example, via deletion of each replica from the corresponding one of the set of memory resources 2430. Storage of the set of segments in the long-term storage system can achieve storage of the record in accordance with the required fault-tolerance level, for example, based on the set of segments being generated via application of applying RAID scheme parameters and/or erasure coding scheme parameters dictated by the required fault-tolerance level.

Figure 26A:
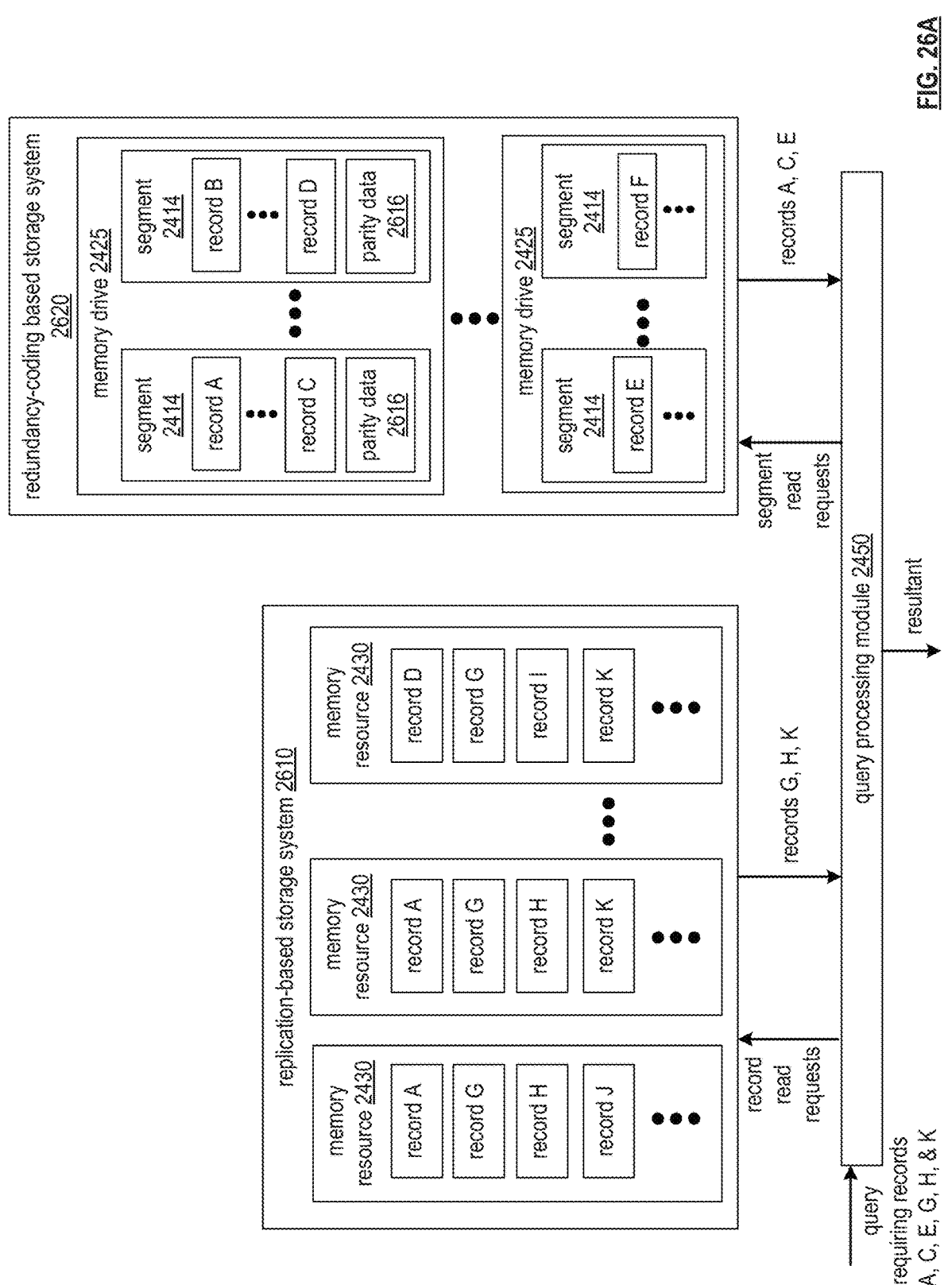
FIG. 26A is a schematic block diagram of a database system that includes a replicated-based storage system and a redundancy-coding based storage system in accordance with various embodiments of the present invention.

FIG. 26A illustrates an embodiment of database system 10 that includes a replication-based storage system 2610, a redundancy-coding based storage system 2620, and a query processing module 2450. The database system 10 is operable to service a given query by utilizing two sets of records: a first set of records that are replicated in the replication-based storage system 2610, and a second set of records that are redundancy storage encoded in redundancy-coding based storage system 2620. This improves database systems by enabling queries to be serviced via records that may be stored in different formats for different reasons: replication-based storage formats may be desired for some records with faster and/or frequent retrieval needs, while redundancy-coding based storage may be desired for records that don't require fast and/or frequent retrieval as it can enable more efficient use of storage space while providing the comparable levels fault-tolerance. Rather than necessitating that all of these records that may be required for a same query or a set of queries be stored in the same format and/or via the same scheme, the queries can be serviced by accessing all required records despite being stored via different storage schemes and/or being stored in these different storage systems. Some or all of the features of database system 10 of FIG. 26A can be utilized to implement the database system 10 of FIG. 24F and/or any other embodiment of the database system 10 discussed herein.

The replication-based storage system 2610 stores a first plurality of records via a plurality of memory resources 2430, where some or all of the first plurality of records are replicated in the replication-based storage system 2610 to provide fault-tolerance and/or to enable distribution of access load for records across multiple memory resources 2430. Each replica can be stored by the replication-based storage system 2610 in a row-based format, where the record itself corresponds to an individual row and is thus accessible in its original form. As the first plurality of records are replicated, the first plurality of replicas can be stored without any additional form of redundancy storage coding scheme being applied in replication-based storage system 2610.

In this example, a plurality of records that includes records A, D, H, H I, J and K are stored by the replication-based storage system 2610. In some cases, at least one record, such as record I, has exactly one copy stored by the replication-based storage system 2610. In some cases, all records A, D, H, H I, J and K all have the same number of copies stored by the replication-based storage system 2610 via different sets of memory resources. In some cases, different records A, D, H, H I, J can have different numbers of copies stored by the replication-based storage system 2610, for example, based on their respective access loads, expected demand, and/or other factors.

The redundancy-coding based storage system 2620 stores a second plurality of records in a redundancy-coded format as redundancy-coded segments 2414. Each redundancy-coded segments 2414 can store a plurality of records, for example, as column-formatted data that includes the plurality of records. Each redundancy-coded segments 2414 can further include parity data 2616 associated with the redundancy storage coding scheme, for example, generated by the data conversion module 2418 in accordance with generating the segments 2414 of a segment group and/or enabling recovery of other segments in the same segment group. For example, the second plurality of records can be stored in accordance with a RAID scheme and/or an erasure coding scheme to provide fault-tolerance.

Records can be extracted from their segment 2414 that is accessed directly from memory and/or that is recovered from other segments in the same segment group. The set of records in each segment can be stored in accordance with a column-based format replica can be stored by the replication-based storage system 2610 in a row-format, where each record itself corresponds to an individual row and thus must be extracted from the column-formatted data and/or converted from column-format into a row-format when accessed and/or when utilized to service a query. As the second plurality of records are redundancy-coded to enable segment recovery in cases of fault, the second plurality of replicas can be stored without any replication in redundancy-coding based storage system 2620. For example, each record can be stored as data of exactly one segment 2414 stored by the in redundancy-coding based storage system 2620 and/or of exactly one segment group. In this example, a plurality of records that includes records A, B, C, D, E, and F are all included in segments 2414 stored by redundancy-coding based storage system 2620. Each segment 2414 can include the same or different number or records. The redundancy-coding based storage system 2620 can include exactly one instance of each record in exactly one corresponding segment 2414.

In some cases, some records can be stored by both the replication-based storage system 2610 and the redundancy-coding based storage system 2620. For example, record A is stored as a plurality of replicas in the replication-based storage system 2610, and is further stored in a segment 2414 by the replication-based storage system 2610. In particular, in embodiments where the replication-based storage system 2610 is implemented as the temporary ingress storage system 2410 and where the redundancy-coding based storage system 2620 is implemented as the long-term storage system 2420, record A is stored on both the temporary ingress storage system 2410 and the redundancy-coding based storage system 2620 based on being reinstated for storage on temporary ingress storage system 2410 as a reinstated record as discussed in further detail in conjunction with FIGS. 29A-29C.

In such cases, record A can be retrieved from either the replication-based storage system 2610 or the redundancy-coding based storage system 2620 for servicing queries. In some embodiments, record A is retrieved the replication-based storage system 2610 to service a first set of queries and is retrieved from the redundancy-coding based storage system 2620 to service a second set of queries. The query processing module 2450 can select whether to retrieve record A from the replication-based storage system 2610 or the redundancy-coding based storage system 2620 for a given query, for example, based on comparing the access load and/or current performance of the replication-based storage system 2610 to the redundancy-coding based storage system 2620. The query processing module 2450 can guarantee that record A will not be inadvertently retrieved from both the replication-based storage system 2610 to the redundancy-coding based storage system 2620 in servicing a given query, as this can lead to incorrect query results. The query processing module 2450 can also guarantee that multiple replicas of record A will not be inadvertently retrieved from the replication-based storage system 2610, as this can also lead to incorrect query results. In other embodiments, each record is either stored by the replication-based storage system 2610 or the redundancy-coding based storage system 2620, and will never be accessible from both the replication-based storage system 2610 and the redundancy-coding based storage system 2620.

The query processing module can receive a plurality of queries over time that require access to records that may be stored as replicas in the replication-based storage system 2610 and/or as redundancy-coded segments in the redundancy-coding based storage system 2620. For example, consider a given query that requires access to set of records that includes at least records A, C, E, G, H and K. The query processing module 2450 can determine that records G, H, and K are stored in the replication-based storage system 2610, and can access the replication-based storage system 2610 accordingly to read a exactly one replica of each record G, H, and K, where this single replicas of record G, record H, and record K are then processed in accordance with the query operations of the query. The query processing module 2450 can determine that records A, C, and E are stored in the redundancy-coding based storage system 2620, and can read each record A, C, and E from the redundancy-coding based storage system 2620 accordingly. This can include reading the respective segments directly from memory and/or rebuilding the respective segments via the other segments in the same segment group. This can further include extracting each record A, C, and E from the respective read or rebuilt segment for processing in accordance with the query operations of the query. For example, records A and C are extracted from the same segment 2414 read a first memory drive 2425, and record E is extracted from a different segment 2414 read from a different memory drive 2425. Note that the query processing module 2450 can determine record A is stored in both replication-based storage system 2610 and redundancy-coding based storage system 2620, and the query processing module 2450 can perform the additional step of selecting to read record A from redundancy-coding based storage system 2620 for the given query in this case rather than replication-based storage system 2610.

In some embodiments, the replication-based storage system 2610 is implemented by utilizing features of one or more embodiments of the temporary ingress storage system 2410 discussed previously herein, such as the temporary ingress storage system 2410 of FIGS. 25A-25C that implements a data replication module 2518. In such cases, the replication-based storage system 2610 is further operable to generate redundancy-coded segments from its stored records for migration to redundancy-coding based storage system 2620. For example, the redundancy-coding based storage system 2620 can be implemented by utilizing features of one or more embodiments of the long-term storage system 2420 discussed previously herein, such as the long-term storage system of FIG. 24F. Some or all features of the redundancy-coding based storage system 2620 of FIG. 26A can be utilized to implement any embodiment of the long-term storage system 2420 discussed herein. Alternatively or in addition, some or all features of the replication-based storage system 2610 of FIG. 26A can be utilized to implement any embodiment of the temporary ingress storage system 2410 discussed herein.

In other embodiments, the replication-based storage system 2610 does not serve as a temporary ingress storage system 2410 that converts and/or migrates its records for long-term storage. Instead, the replication-based storage system 2610 can be any storage system, for example designated for long-term storage of records. In particular, the replication-based storage system 2610 can be operable to store records deemed by the database system 10 to be stored as replicas rather than redundancy storage coded segments. For example, these records may correspond to more heavily accessed records than records stored in the redundancy-coding based storage system 2620 and/or have been determined to require faster access than records stored in the redundancy-coding based storage system 2620. The replication-based storage system 2610 and redundancy-coding based storage system 2620 can thus serve as any distinct storage systems that store records via replication and redundancy storage encoding, respectively. In some cases, no migration occurs between replication-based storage system 2610 and redundancy-coding based storage system 2620. In some cases, migration can occur between replication-based storage system 2610 and redundancy-coding based storage system 2620 in either direction, for example, based on changes in data demand.

In either case, replication-based storage system 2610 and the redundancy-coding based storage system 2620 can each be operable to durably store records. Records of the replication-based storage system 2610 are durably stored based on having at least a threshold number of replicas as required by a threshold fault-tolerance level, such as a common fault-tolerance level as discussed in conjunction with FIGS. 25A-25C. Records of the redundancy-coding based storage system 2620 are durably stored based on being stored as segments encoded via a redundancy storage coding scheme that is configured to achieve the same or different threshold fault-tolerance level, such as the same common fault-tolerance level as utilized by the replication-based storage system 2610. In this fashion, queries can be seamlessly executed via access of durably stored records, regardless of whether this durable storage is achieved via the replication scheme of the replication-based storage system 2610 or via the redundancy storage coding scheme of the redundancy-coding based storage system 2620. In some cases, all records stored by the replication-based storage system 2610 and/or the redundancy-coding based storage system 2620 are durably stored. In some cases, some records of the replication-based storage system 2610 and/or the redundancy-coding based storage system 2620 are not durably stored, for example based on not yet being converted to durable storage via the replication scheme or via the redundancy storage coding scheme, respectively, where only durably stored records of the replication-based storage system 2610 and the redundancy-coding based storage system 2620 are utilized to service query requests.

FIG. 26B illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 26B. Some or all of the method of FIG. 26B can otherwise be performed by the query processing module 2450, for example, by utilizing at least one processor and memory of the query processing module 2450 of FIG. 26A to implement the query processing sub-module 2452, the query processing sub-module 2454, and/or the query processing sub-module 2456 of FIG. 24H. Some or all of the steps of FIG. 26B can optionally be performed by any other processing module of the database system 10. Some or all of the steps of FIG. 26B can be performed to implement some or all of the functionality of the database system 10 described in conjunction with FIG. 26A. Some or all steps of FIG. 26B can be performed by database system 10 in accordance with other embodiments of the database system 10 discussed herein.

Step 2682 includes determining a query for execution, for example via receiving the query from a client device, where execution of the query requires and/or requests access to a set of records stored by the database system. Step 2684 includes identifying a first proper subset of the set of records that are stored by a replication-based storage system of the database system, such as the replication-based storage system 2610 of FIG. 26A and/or any embodiment of the temporary storage system 2410 described herein. Step 2686 includes identifying a second proper subset of the set of records that are stored by a redundancy-coding based storage system of the database system, such as the redundancy-coding based storage system 2620 of FIG. 26A and/or any embodiment of the long-term storage system 2420 described herein. For example, the first proper subset and the second proper subset can be mutually exclusive and/or collectively exhaustive with regards to the set of records required by the query.

Step 2688 includes accessing the first proper subset of the set of records, for example, by utilizing query processing sub-module 2452. This can include reading one of a set of replicas of each record of the first proper subset from memory resources, such as a set of memory resources 2430, of the replication-based storage system. Step 2690 includes accessing the second proper subset of the set of records, for example, by utilizing query processing sub-module 2454. This can include reading one or more redundancy-coded segments that includes the second proper subset of the set of records in column-based formatted data and by further extracting the second proper subset of the set of records from the column-based formatted data of the one or more redundancy-coded segments. In some cases, reading the one or more redundancy-coded segments can include accessing at least one redundancy-coded segments directly from at least one corresponding memory drive 2425. In some cases, reading the one or more redundancy-coded segments can include recovering a redundancy-coded segment via accessing a set of other redundancy-coded segments that were generated in the same segment group from a set of memory drives 2425, and can further include utilizing parity information extracted from this set of other redundancy-coded segments to recover this redundancy-coded segment.

Step 2692 includes generating a final resultant for the query by performing at least one query operation on the first proper subset of the set of records and the second proper subset of the set of records, for example, by utilizing the query processing sub-module 2456. The at least one query operation can be performed upon a union of the first proper subset of the set of records and the second proper subset of the set of records, where this union constitutes exactly the required set of records, and where the intersection of the first proper subset of the set of records and the second proper subset of the set of records is null. In some cases, the first proper subset of the set of records and the second proper subset of the set of record can be sent to a set of nodes 37 of an inner level of a query execution plan 2465 for processing, where resultants are propagated up the tree of the query execution plan 2465 until a root level node 37 ultimately generates the final resultant.

Figure 27A:
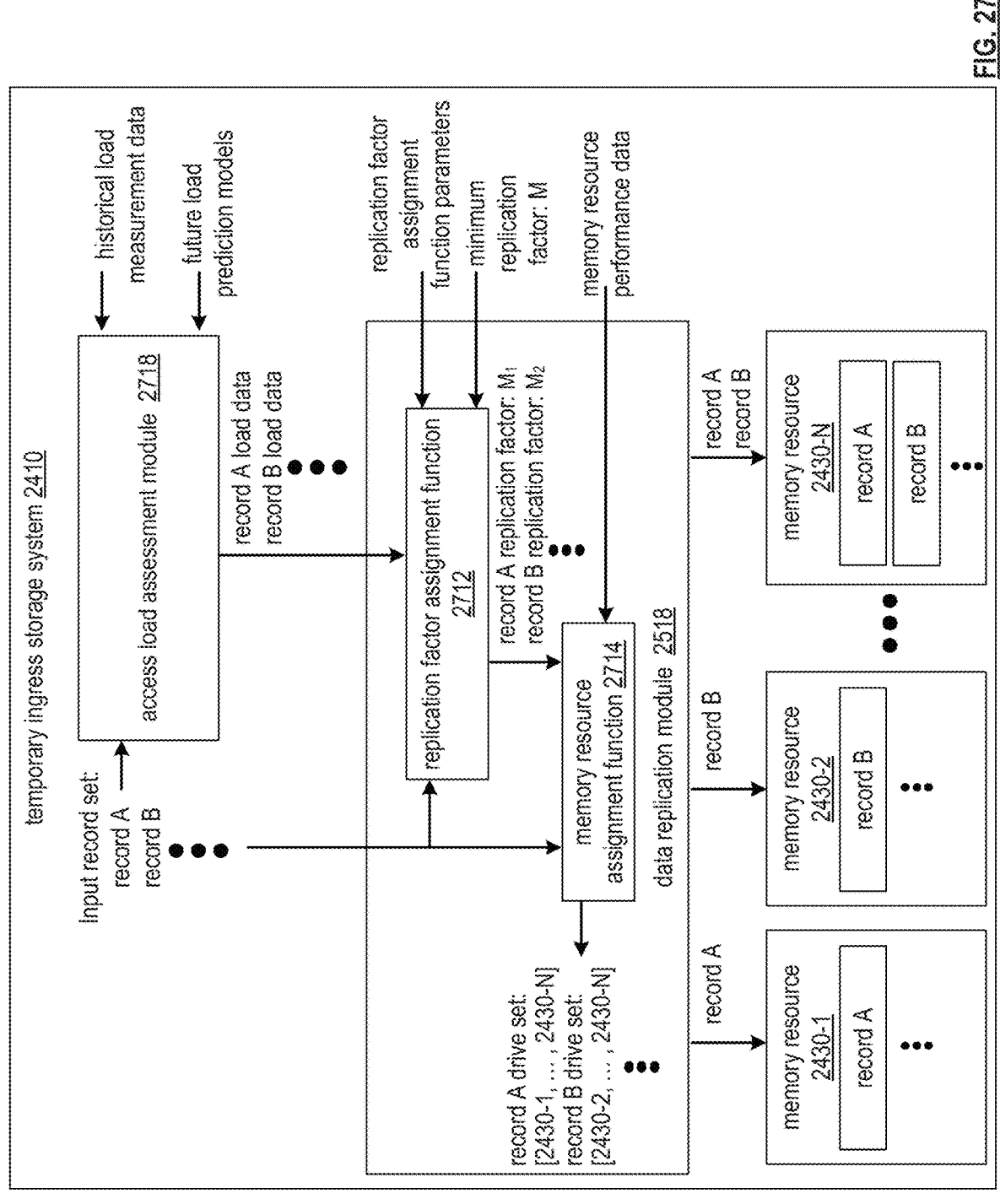
FIG. 27A is a schematic block diagram of a temporary ingress storage system that implements a data replication assignment module to replicate records for temporary storage in accordance with various embodiments of the present invention.

FIG. 27A illustrates an embodiment of a temporary ingress storage system 2410 that implements a replication factor assignment function 2712 to replicate different incoming records different numbers of times for storage. This improves database systems by enabling different data being processed for migration to long-term storage to have different levels of replication, for example, to help enable different respective levels of access load to these different records while in ingress. Some or all features of the temporary ingress storage system 2410 can be utilized to implement the temporary ingress storage system 2410 of FIGS. 25A, 25B, and/or 25C, and/or can be utilized to implement any embodiment of the temporary ingress storage system 2410 discussed herein.

The data replication module 2518 can implement the replication factor assignment function 2712 to determine a replication factor for each incoming record by applying replication factor assignment function parameters defining the replication factor assignment function 2712. In this example a set of incoming records includes record A and record B, and each record in the set of incoming records is assigned its own replication factor by the replication factor assignment function 2712. In this example, record A is assigned a replication factor $M_1$ and record B is assigned a replication factor $M_2$ which can be the same as or different from $M_1$.

One parameter of the replication factor assignment function 2712 can include a minimum replication factor M, and can select only replication factors for incoming records that are greater than or equal to M. For example, minimum replication factor M of FIG. 27A can correspond to and/or can be determined based on the replication factor M of FIG. 25C, for example, determined by the fault-tolerance management module 2530 and/or providing a same level of fault tolerance as the redundancy coding scheme utilized to generate and store segments 2414 in long-term storage system 2620 as discussed previously. However, rather than dictating that all records automatically be assigned this same replication factor M, instead, this fault-tolerance based replication factor can serve as a baseline replication factor. Other considerations such as access load, data demand, and/or memory resource 2430 utilization levels can dictate that this minimum replication factor is not sufficient for all records, such as records with higher known and/or expected access loads.

The minimum replication factor M and/or other parameters defining the replication factor assignment function 2712 can be: received by the temporary ingress storage system 2410; stored locally by at least one memory of the temporary ingress storage system 2410; accessible by the temporary ingress storage system 2410; and/or can be otherwise determined by the temporary ingress storage system 2410. In some cases, these parameters can be configured via user input to an interactive interface displayed via a display device of a client device communicating with the database system via system communication resources 14 and/or external network(s), for example, in conjunction with the configuration sub-system 16.

The replication factor assignment function 2712 can receive and/or determine load data for incoming records. This load data can correspond to known and/or expected access load to the corresponding record, such as frequency of access requests for corresponding queries. The load data can correspond to access load during an ingress period, such as a duration in which records are expected and/or known to be stored by the temporary ingress storage system 2410. For example, this load data can correspond to access load for the record within a short-term period in the near future. Long-term access load data is less pertinent in this case, as the data will no longer be stored via replicas in the temporary ingress storage system 2410 once it is migrated to long-term storage system 2420.

This load data can be generated by access load assessment module 2718, for example, by utilizing historical load measurement data, future load prediction models, and/or other information indicating known and/or expected access load, access demand, access frequency, and/or other access related information for different incoming records. The historical load measurement data can be measured by and/or collected by the database system over time for other records stored in temporary ingress storage system 2410 and/or long-term storage system 2420 that are accessed to execute queries. This information can be utilized by access load assessment module 2718 to determine access load for incoming records based on trends in access history of similar types of records, records collected at similar periods of time historically, records collected by similar sensor devices and/or data gathering devices, records containing similar types and/or values of data, and/or records otherwise determined to have similar features. The future load prediction models can be generated by the database system 10, for example, based on performing analytics upon the historical load measurement data. The future load prediction models can be utilized to generate predicted access load information for incoming records based on their type, values, timestamps, originating collection device, or other information regarding these incoming records. The access load assessment module 2718 can generate load data for incoming records based on applying the historical load measurement data, the future load prediction models, and/or by applying a deterministic function to each incoming record and/or to the timestamp of each incoming record.

Prior to being assigned replication factors, the incoming set of records can be processed by the access load assessment module 2718 that generates load data for each of the incoming set of records. In this case, record A can have load data that indicates the same or different level of expected and/or known access load during ingress from record B. The replication factor assignment function can generate the replication factors for each record as a function of its determined load data. In particular, replication factor assignment function can assign replication factor as an increasing function of access load. For example, access load assessment module 2718 can generate load data for record A indicating a higher access load during ingress than record B. As a result, the replication factor $M_1$ assigned to record A is strictly greater than the replication factor $M_2$ assigned to record B, dictating that a greater number of replicas will be generated and stored for record A than for record B.

The data replication module 2518 can further include a memory resource assignment function 2714 that dictates as set of memory drives in which a records set of replicas is to be stored. For example, the memory resource assignment function 2714 can evenly distribute records across the total set of memory resources 2430-1-2430-N to ensure that each memory resource stores roughly the same number of records at a given time and/or to ensure that each memory resource 2430's access performance and/or storage capacity isn't exceeded. In some cases, memory resource performance data indicating each memory resource's type and/or corresponding processing and/or memory capabilities; each memory resource's levels current and/or expected health, capacity, access latency, and/or performance; and/or other information regarding performance of some or all memory resources can be utilized. For example, memory resources that are underperforming and/or experiencing high access latency can be included in fewer sets for record replicas and/or can be assigned to store smaller numbers of replicas of records than memory resources that are performing to more favorable standards and/or experiencing lower levels of access latency.

The set of memory drives determined for each record can include exactly the number of memory drives as number of replicas created for the record as dictated by its assigned replication factor. In this example, a set of $M_1$ memory drives is determined for record A that includes memory resource 2430-1 and memory resource 2430-N, but not memory resource 2430-2. In this example, a set of $M_2$ memory drives is determined for record B that includes memory resource 2430-2 and memory resource 2430-N, but not memory resource 2430-1. The data replication module 2518 can facilitate storage of each records set of replicas in its designated set of memory resources.

Figure 27B:
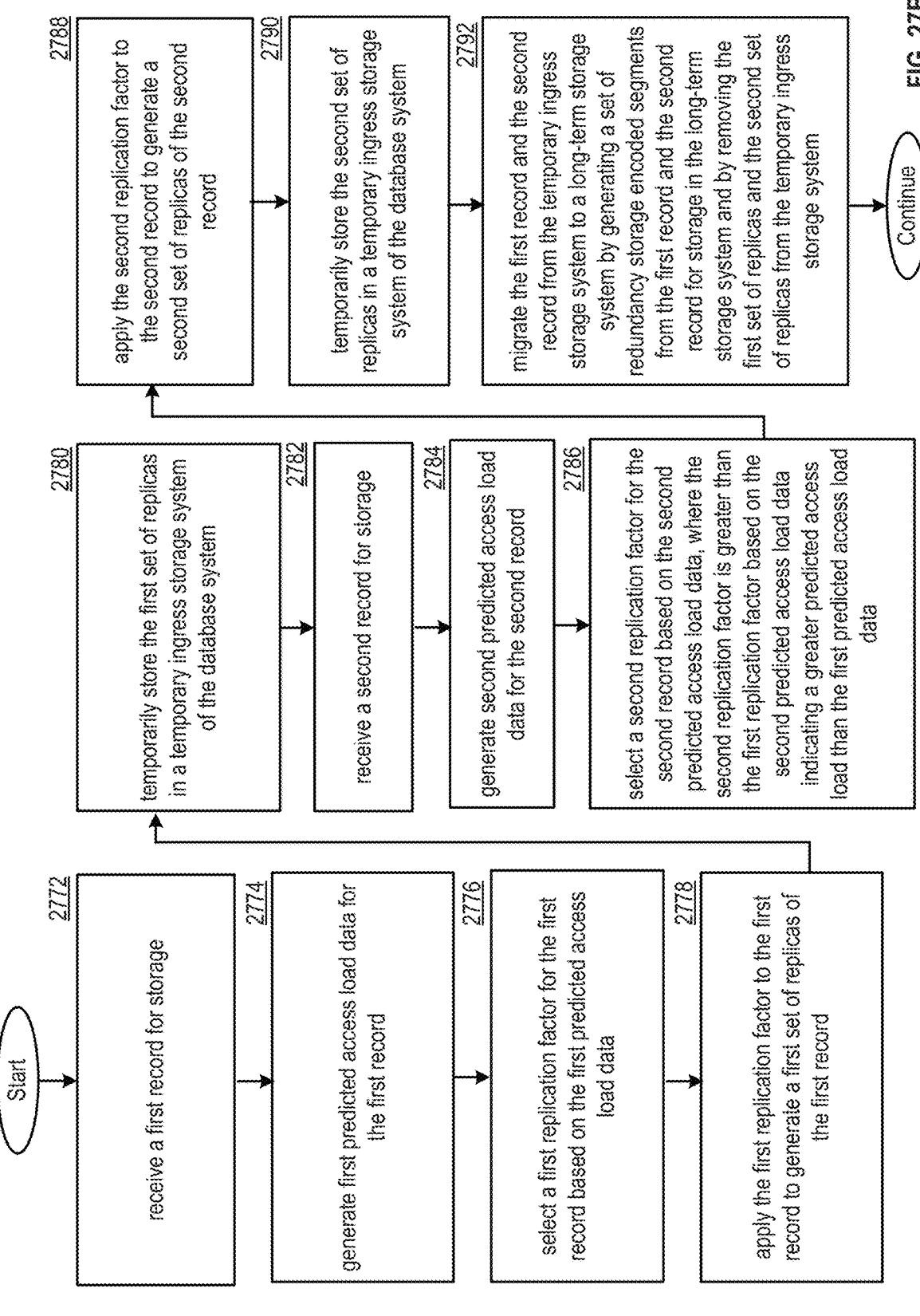
FIG. 27B is a logic diagram illustrating a method of replicating records for temporary storage in accordance with a selected a replication factor in accordance with various embodiments of the present invention.

FIG. 27B illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 27B. Some or all of the method of FIG. 27B can otherwise be performed by the temporary ingress storage system 2410 of FIG. 27A, for example, by utilizing at least one processor and memory of the temporary ingress storage system 2410 to implement the access load assessment module 2718, the replication factor assignment function 2712, and/or the memory resource assignment function 2714. Some or all of the steps of FIG. 27B can optionally be performed by any other processing module of the database system 10. Some or all of the steps of FIG. 27B can be performed to implement some or all of the functionality of the temporary ingress storage system 2410 described in conjunction with FIG. 27A. Some or all steps of FIG. 27B can be performed by database system 10 in accordance with other embodiments of the database system 10 discussed herein.

Step 2772 includes receive a first record for storage, for example, in the input data stream and/or in a bulk-loaded set of records. Step 2774 includes generating first predicted access load data for the first record, for example, by utilizing the access load assessment module 2718. The first predicted access load data can correspond to predicted access load within a temporal period that the first record is expected to be stored by the temporary ingress storage system, prior to conversion and migration to a long-term storage system.

Step 2776 includes selecting a first replication factor for the first record based on the first predicted access load data, for example, by utilizing the replication factor assignment function 2712. Step 2778 includes applying the first replication factor to the first record to generate a first set of replicas of the first record. Step 2780 includes temporarily storing the first set of replicas in a temporary ingress storage system of the database system, for example, in a corresponding set of memory resources 2430 selected by utilizing the memory resource assignment function 2714.

Step 2782 includes receiving a second record for storage, for example, in the in the input data stream and/or in the same or different bulk-loaded set of records. Step 2784 includes generating second predicted access load data for the second record, for example, by utilizing the access load assessment module 2718. The second predicted access load data can correspond to predicted access load during a temporal period that the second record is expected to be stored by the temporary ingress storage system, prior to conversion and migration to the long-term storage system. Step 2786 includes selecting a second replication factor for the second record based on the second predicted access load data, for example, by utilizing the replication factor assignment function 2712. The second replication factor can be greater than the first replication factor based on the second predicted access load data indicating a greater predicted access load than the first predicted access load data. Step 2788 includes applying the second replication factor to the second record to generate a second set of replicas of the second record. Step 2790 includes temporarily storing the second set of replicas in a temporary ingress storage system of the database system. Step 2792 includes migrating the first record and the second record from the temporary ingress storage system to the long-term storage system by generating a set of redundancy storage encoded segments from the first record and the second record for storage in the long-term storage system and by removing the first set of replicas and the second set of replicas from the temporary ingress storage system. For example, the set of redundancy storage encoded segments can be generated by utilizing the data conversion module 2418 to generate a set of segments of a segment group from a record group that includes the first record. In some cases, prior to this migration, replicas of the first record and/or the second record can be accessed to facilitate execution of one or more queries.

FIGS. 28A-28B illustrate an embodiment of a temporary ingress storage system 2410 that implements a replication factor reassignment function 2814 to dynamically adjust the number of replicas are stored for some or all records for the period of time that records are stored in the temporary ingress storage system 2410 prior to their migration to long-term storage system 2420. For example, the number of replicas of a given record stored by the temporary ingress storage system 2410 can be increased or decreased one or more times while the record is in ingress based on known and/or predicted changes to the record's access load and/or access demand. This further improves database systems by handling unanticipated levels of access load to while in ingress records via corresponding changes in their replication factors to further ensure queries can be serviced efficiently using these records while in ingress. Some or all features of temporary ingress storage system 2410 of FIGS. 28A and 28B can be utilized to implement the temporary ingress storage system 2410 of FIGS. 25A-25C, of FIG. 27A, and/or any other embodiment of the temporary ingress storage system 2410 discussed herein.

FIG. 28A illustrates temporary ingress storage system 2410 at time $t_0$, where record A is included in the set of input records. Record A can be processed as discussed in conjunction with FIG. 27A, where the replication factor $M_1$ is assigned to record A by applying the replication factor assignment function as discussed previously. Alternatively, all records including record A can be assigned a same, minimum replication factor M when initially stored by the system, where $M_1$ is equal to the minimum replication factor M. Record A is then stored in a set of $M_1$ memory resources 2430 that includes memory resource 2430-1 and 2430-N, but not 2430-2. For example, this can follow the same example of replicating record A for ingress as discussed in conjunction with FIG. 27A.

FIG. 28B illustrates temporary ingress storage system 2410 at time $t_1$ that is after time $t_0$. A replication factor reassignment function 2814 can be performed to determine whether to change the replication factor for some or all currently-stored records and/or to assign a new replication factor to some or all currently-stored records. In this case, the replication factor reassignment function 2814 determines to change the replication factor for record A from $M_1$ to $M_3$. In this case, $M_3$ can be greater than $M_1$, necessitating that additional replicas be generated and stored for record A. In this case, a replica of record A is also stored in memory resource 2430-2 at time $t_1$ based on the increase in the replication factor for record A from $M_1$ to $M_3$.

The replication factor reassignment function 2814 can utilize actual access history data and/or predicted load access data to determine whether to change the replication factor for a currently-stored record and/or to assign a new replication factor to a currently-stored record. In this case, actual access history data and/or predicted load access data for record A are measured, received, calculated, and/or determined by the temporary ingress storage system 2410. In particular, the short-term predicted future access load for a given record can be determined by the temporary ingress storage system 2410 based on the actual access history data for this record while in ingress thus far.

In some cases, the access load assessment module 2718 of FIG. 27A can be implemented by the replication factor reassignment function 2814, where historical load measurement data for other records and/or future load prediction modules are utilized, for example, in conjunction with measured access history for a given record to predict the upcoming access load for the record. Alternatively, the measured access data for a given record can be utilized directly to indicate access data for the record and can be considered indicative of future access data. In some cases, the access data for a record itself is not considered, and instead historical trends and/or predictive models dictate short-term predicted future load of the record.

Similar to the considerations discussed in conjunction with FIG. 27A, any predicted future access load being considered for a given record can be in conjunction with a short-term future period, which can include only future load for the remaining period of ingress expected for the record. In some cases, this remaining period can be calculated and/or determined as a function of the size of the record's current record group, where the expected remaining period is calculated to be larger when the record group is smaller.

Parameters defining the replication factor reassignment function 2814 can be: received by the temporary ingress storage system 2410; stored locally by at least one memory of the temporary ingress storage system 2410; accessible by the temporary ingress storage system 2410; and/or can be otherwise determined by the temporary ingress storage system 2410. In some cases, these parameters can be configured via user input to an interactive interface displayed via a display device of a client device communicating with the database system via system communication resources 14 and/or external network(s), for example, in conjunction with the configuration sub-system 16.

The replication factor reassignment function 2814 can be performed in predefined intervals, in accordance with a predefined schedule; based on detecting at least a predefined threshold change in access load across the temporary ingress storage system 2410 as a whole; based on detecting a predefined threshold change in access load for one or more particular records: based on detecting capacity of one or more particular memory resources has reached a capacity threshold: based on detecting capacity of memory resources across the temporary ingress storage system 2410 as a whole has reached a capacity threshold: based on determining that record replicas across the temporary ingress storage system 2410 needs to be increased: based on detecting that the temporary ingress storage system 2410 can handle an increase in replicas: based on a detecting a predefined threshold change in rate of input ingress to the temporary ingress storage system 2410; based on a detecting rate of input ingress to the temporary ingress storage system 2410 is above a first threshold amount or below a second threshold amount; and/or based on other factors. Some or all of these factors can further be utilized to determine whether the replication factor of one or more given records should be increased or decreased, and can be can further be utilized to determine an amount by which the replication factor should be increased or decreased.

In this example, the replication factor for record A is increased from $M_1$ to $M_3$ based on record A being determined to have a predicted increased in access load in the short-term future and/or based on record A being determined to have an access load in the short-term future that exceeds a predefined access load threshold. For example, this predicted access load in the short-term future can be determined for record A based on an actual increase in access load measured for the record A and/or similar types of records recently, where this increase is expected to continue for record A and/or similar types of records in the near future. The replication factor generated by the replication factor reassignment function 2814 can be an increasing function of actual access load measured since storage of the given record; recent access load measured for similar types of records; and/or predicted access load for the short term future.

In other cases, one or more records may have their replication factor decreased. In such cases, rather than adding new replicas for storage, one or more existing replicas can be deleted accordingly. In some cases, the number of replicas that must be removed can be selected, where a corresponding subset of the set of memory devices storing the existing set of replicas are selected for deletion, for example, based on their current performance, access load, latency, health, and/or current memory utilization. For example, one of the set of memory devices is selected to have its replica of the record deleted based on being lowest performing and/or having highest memory utilization. The decrease in replication factor can be dictated by resource reallocation and/or monitoring of performance of resources as discussed in conjunction with FIGS. 32A-32C.

Figure 28C:
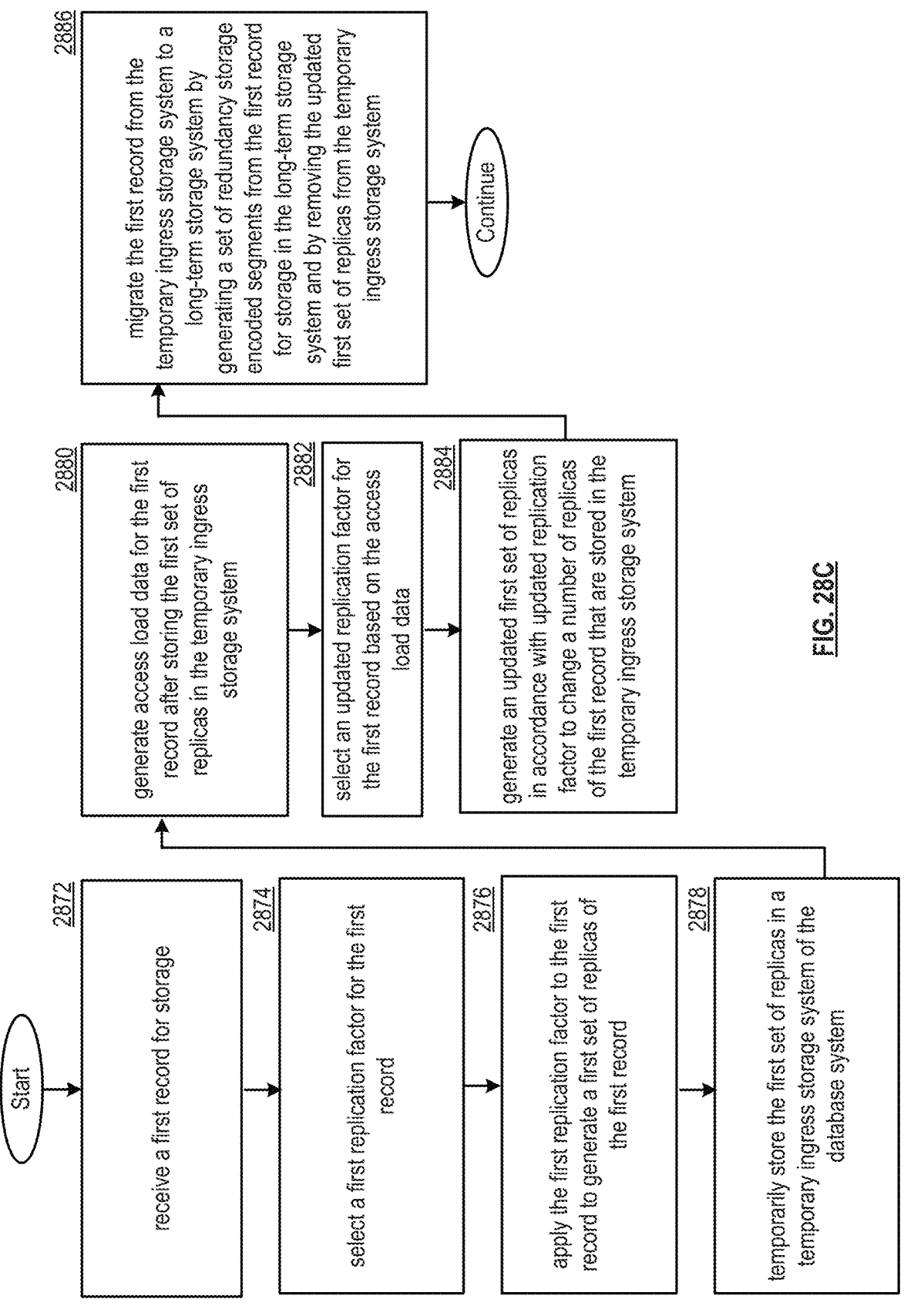
FIG. 28C is a logic diagram illustrating a method of selecting an updated replication factor for replicating records in temporary storage in accordance with various embodiments of the present invention.

FIG. 28C illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28C. Some or all of the method of FIG. 28C can otherwise be performed by the temporary ingress storage system 2410 of FIGS. 28A-28B, for example, by utilizing at least one processor and memory of the temporary ingress storage system 2410 to implement the replication factor assignment function 2712 and/or the replication factor reassignment function 2814. Some or all of the steps of FIG. 28C can optionally be performed by any other processing module of the database system 10. Some or all of the steps of FIG. 28C can be performed to implement some or all of the functionality of the temporary ingress storage system 2410 described in conjunction with FIGS. 28A-28B. Some or all steps of FIG. 28C can be performed by database system 10 in accordance with other embodiments of the database system 10 discussed herein.

Step 2872 includes receiving a first record for storage, for example, in the input data stream and/or in a bulk-loaded set of records. Step 2874 includes selecting a first replication factor for the first record, for example, by utilizing the replication factor assignment function 2712 and/or by applying a minimum replication factor dictated by the fault-tolerance management module 2530. Step 2876 includes apply the first replication factor to the first record to generate a first set of replicas of the first record. Step 2878 includes temporarily storing the first set of replicas in a temporary ingress storage system of the database system, for example, in a corresponding set of memory resources 2430. Step 2880 includes generate access load data for the first record after storing the first set of replicas in the temporary ingress storage system, for example, based on measured access load data for the first record during the temporal period since the first record was stored as the first set of replicas and/or based on predicted access load data for the first record for the remaining temporal period the first record is expected to remain stored in the temporary ingress storage system prior to migration to a long-term storage system. For example, the access load data can be generated for the first record by utilizing the access load assessment module.

Step 2882 includes selecting select an updated replication factor for the first record based on the access load data, for example, by utilizing the replication factor reassignment function 2814, The updated replication factor can be different from the original replication factor. Step 2884 includes generating an updated first set of replicas in accordance with updated replication factor to change a number of replicas of the first record that are stored in the temporary ingress storage system. For example, an additional set of replicas can be created for storage in addition to the original set of replicas based on the updated replication factor being greater than the original replication factor to generate the updated first set of replicas. As another example, at least one existing replica can be deleted from a memory resource 2430 based on the updated replication factor being less than the original replication factor to generate the updated first set of replicas.

Step 2886 includes migrating the first record from the temporary ingress storage system to a long-term storage system by generating a set of redundancy storage encoded segments from the first record for storage in the long-term storage system and by removing the updated first set of replicas from the temporary ingress storage system. For example, the set of redundancy storage encoded segments can be generated by utilizing the data conversion module

2418 to generate a set of segments of a segment group from a record group that includes the first record. In some cases, replicas of the first segment can be accessed in memory resources 2430 prior to the migration of the first record to facilitate execution of one or more queries. In some cases, the replication factor can be further updated to generate further updated sets of replicas, one or more additional times prior to the migration of the first record, with increasing and/or decreasing numbers of replicas from prior updated sets of replicas.

Figure 29C:
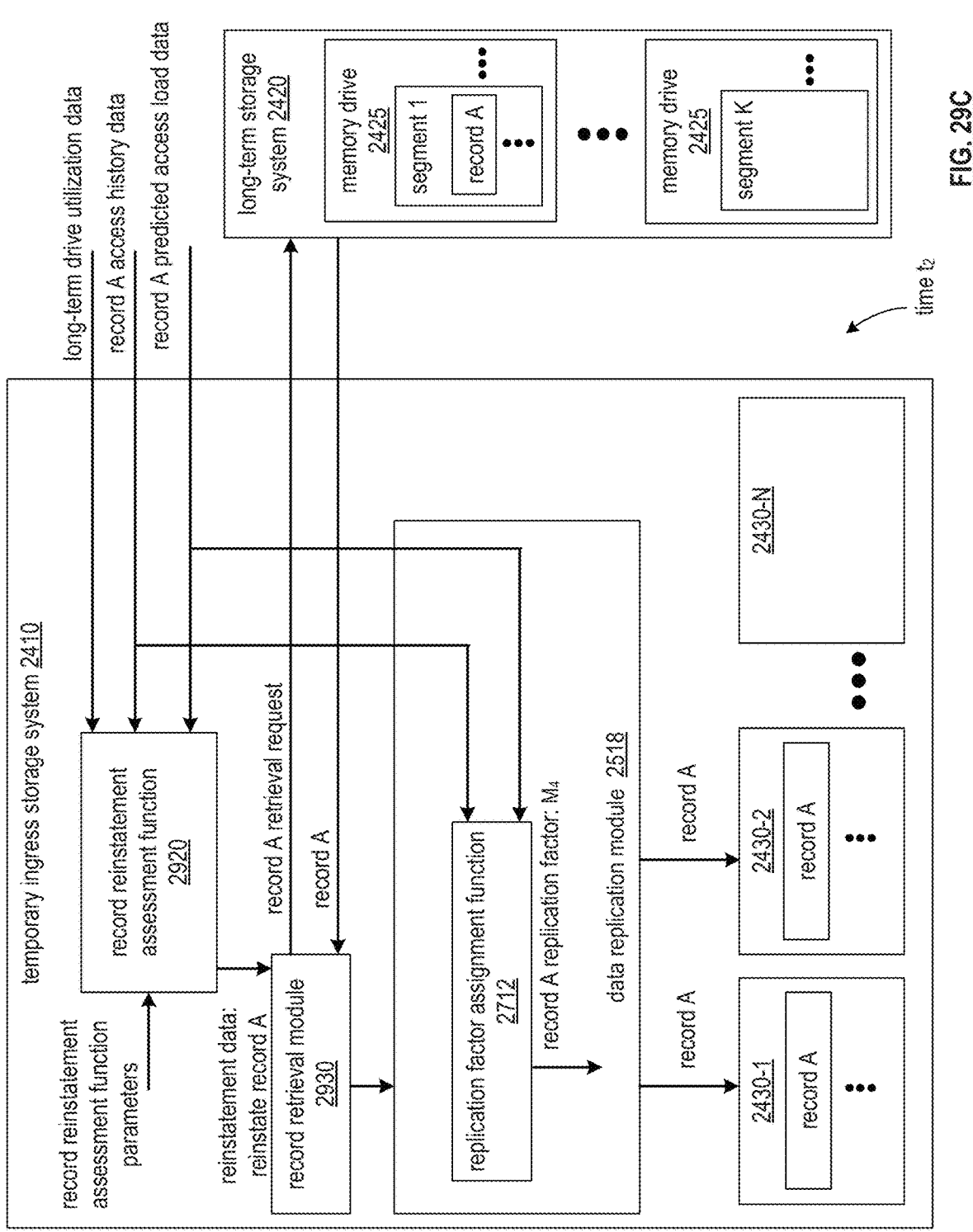

FIGS. 29A-29C illustrate an embodiment of a temporary ingress storage system 2410 that implements a record reinstatement assessment function 2920 to determine whether one or more records that have already been migrated from the temporary ingress storage system 2410 to the long-term storage system 2420 as redundancy-coded segments should be reinstated as replicated records stored in the temporary ingress storage system 2410 and/or to facilitate reinstatement of selected records already stored in long-term storage system 2420 as replicated records stored in the temporary ingress storage system 2410. This improves database systems by further enabling the database system 10 to respond to changes in access load to temporary ingress storage system 2410 and/or the long-term storage system 2420 by enabling records to be accessed via the long-term storage system 2420 or the temporary ingress storage system 2410 to balance access load. Some or all features of the temporary ingress storage system 2410 of FIGS. 29A-29C can be utilized to implement the temporary ingress storage system 2410 of FIGS. 25A-25C, of FIG. 27A, of FIGS. 28A-28B, and/or of any other embodiment of temporary ingress storage system 2410 discussed herein.

FIG. 29A illustrates temporary ingress storage system 2410 at time $t_0$. As discussed previously, the temporary ingress storage system 2410 receives a set of records in the input stream, replicates the records via the same or different replication factor via data replication module 2518, and stores the set of replicas for each record in a corresponding set of memory resources 2430. In this example, record A is replicated and stored in a set of memory devices that includes memory resource 2430-1 and memory resource 2430-N, but not memory resource 2430-2. For example, this can follow the same example of replicating record A for ingress as discussed in conjunction with FIG. 27A.

FIG. 29B illustrates the temporary ingress storage system 2410 at time $t_1$ that is after time $t_0$. Here, record A is included in a record group converted to a set of redundancy-coded segments 1-K of a segment group via the data conversion module 2418, where record A is accessed from memory resource 2430-1 to generate the set of segments 1-K, for example, as discussed in conjunction with FIGS. 25A-25C. The set of redundancy-coded segments 1-K are transmitted to the long-term storage system 2420 for storage in a corresponding set of K memory drives 2425-1-2425-K, where each segment in the segment set is stored in a different one of this set of K memory drives. For example, the memory drives 2425-1-2425-K can be stored on a set of K nodes, and can constitute a small subset of the entire set of memory drives of long-term storage system 2420. In this case, segment 1 is stored on memory drive 2425-1 and includes record A. All replicas of record A are deleted from corresponding memory drives 2430 in response to the segment set of segments that includes record A being successfully migrated to long-term storage system 2420. Note that the number of replicas of record A may have increased or decreased to a new number of replicas via implementation of the replication factor reassignment function 2814 of FIG.

28B prior to migration of record A and after initial storage of record A illustrated in FIG. 29A. In any case, the currently stored set of replicas of record A can be deleted from corresponding memory drives 2430.

While examples of FIGS. 29A and 29B illustrate features of the temporary ingress storage system 2410 discussed previously, FIG. 29C introduces the implementation of a record reinstatement assessment function 2920 by temporary ingress storage system 2410 at time $t_2$, which is after time $t_1$. After records have been stored in long-term storage, they can be reinstated by the temporary ingress storage system for storage based on applying the record reinstatement assessment function 2920. The record reinstatement function can generate reinstatement data indicating a particular record and/or subset of records stored in long-term storage system 2420 to be reinstated. For example, records can be assessed for reinstatement based on the access load and/or utilization of some or all memory drives 2425; access history data of the records; and/or predicted access load data of the records. In some cases, this access history data of records or other information regarding evaluated records is processed via access load assessment module 2718 of FIG. 27A as discussed previously. In this example, record A is selected to be reinstated for storage by temporary ingress storage system 2410.

The record reinstatement assessment function 2920 can determine to reinstate a subset records that have higher historical higher recent access load and/predicted future access load, while other records with lower historical higher recent access load and/predicted future access load are not reinstated. The record reinstatement assessment function 2920 can determine to reinstate a record if its historical higher recent access load and/predicted future access load compares favorably to an access load threshold. In some cases, the record reinstatement assessment function 2920 evaluates records for reinstatement in the same and/or similar fashion as discussed with regards to the replication factor reassignment function 2814, with the exception that the time period whose access load is evaluated goes beyond the short-time span the record is expected to remain in ingress as it is already stored in long-term storage. In some cases, more records are selected to be reinstated based on the utilization of some or all memory drives 2425 being high and less records are selected to be reinstated based on the utilization of some or all memory drives 2425 being low. In some cases, more records are selected to be reinstated based on the utilization and/or remaining capacity of some or all memory resources 2430 being low and less records are selected to be reinstated based on the utilization and/or remaining capacity of some or all memory drives 2430 being high.

The record reinstatement assessment function 2920 can be performed in predefined intervals, in accordance with a predefined schedule; based on detecting at least a predefined threshold change in access load across the temporary ingress storage system 2410 and/or in long-term storage system 2420 as a whole; based on detecting a predefined threshold change in access load for one or more particular records in long-term storage system 2420; based on detecting that the temporary ingress storage system 2410 can handle an increase in replicas; based on a detecting a predefined threshold change in rate of input ingress to the temporary ingress storage system 2410; based on a detecting rate of input ingress to the temporary ingress storage system 2410 is below a second threshold amount; and/or based on other factors. Some or all of these factors can further be utilized to determine whether the replication factor of one or more given records should be increased or decreased, and can be can further be utilized to determine an amount by which the replication factor should be increased or decreased.

Record reinstatement assessment function parameters defining the replication factor reassignment function 2814 can be: received by the temporary ingress storage system 2410; stored locally by at least one memory of the temporary ingress storage system 2410; accessible by the temporary ingress storage system 2410; and/or can be otherwise determined by the temporary ingress storage system 2410. In some cases, these parameters can be configured via user input to an interactive interface displayed via a display device of a client device communicating with the database system via system communication resources 14 and/or external network(s), for example, in conjunction with the configuration sub-system 16.

Once records are selected for reinstatement in reinstatement data a record retrieval module 2930 can be implemented to request records for retrieval and retrieve the receive copies of the requested records in response. In this example, record A is read from the long-term storage system 2420 in response to being selected for reinstatement. This can include retrieving segment 1 and extracting record A from segment 1. Alternatively, in cases where segment 1 is unavailable, this can include retrieving some or all of segments 2—, such as some or all of the parity data, and recovering at least the portion of segment 1 that includes record A via applying a decoding function of the redundancy storage coding scheme, and extracting record A from the recovered portion of segment 1. Note that the records can remain stored by the long-term storage system 2420, and are only read by the temporary ingress storage system to enable one or more copies of these permanently stored records to be available for access via the temporary ingress storage system 2410. In some cases, records are sent to the temporary ingress storage system 2410 from the long-term storage system 2420 and/or the query processing module 2450 for reinstatement, for example, based on the long-term storage system 2420 and/or the query processing module 2450 selecting these records for reinstatement.

Once retrieved, records can be reinstated by being stored in one or more memory resources 2430. In some cases, reinstated records are stored as exactly one copy in exactly one memory resource 2430. In other cases, the reinstated records are replicated via data replication module 2518. In some cases, reinstated records are replicated via a fixed reinstatement replication factor, and this fixed number of replicas are stored. Alternatively, as illustrated in FIG. 29C, a replication factor is selected for each reinstated record via the replication factor assignment function 2712 of FIG. 27A. For example, the access history data and predicted access load data determined for records can be utilized to calculate the appropriate replication factor as discussed previously. While not illustrated, the memory resource assignment function 2714 of FIG. 27A can also be applied to select the set of memory drives in which the replicas are to be stored. In this example, replication factor $M_4$ is selected for reinstatement of record A, and $M_4$ copies of record A are stored in response. For example, $M_4$ can be calculated as an increasing function of record A's recent access history data in long-term storage 2420. The $M_4$ replicas of record A are stored on a selected set of $M_4$ memory drives that includes memory resource 2430-1 and memory resource 2430-2, but not memory resource 2430-N.

In some cases, the reinstatement replication factor for some or all records is smaller than their previous replication factor while in ingress due to the fact that these records are also available for access via long-term storage system 2420 where the same level of fault tolerance need not be achieved by the temporary ingress storage system 2410 alone. For example, $M_4$ can be smaller than the original replication factor $M_1$ of FIG. 29A utilized to initially store record A prior to long term storage. Alternatively, the reinstatement replication factor that the initial replication factor for some or all records based on these records having higher levels of access demand when reinstated than while they were initially stored and pending migration. In some cases, reinstated records can have their replication factor changed, and/or can have all replicas removed, via replication factor reassignment function 2814 of FIG. 28A, where replication factor reassignment function 2814 can be applied to both records pending migration as well as reinstated records.

In some embodiments, the record reinstatement assessment function and/or a different function can further be utilized to evaluate reinstated records that are currently stored in both temporary ingress storage system 2410 and in long-term storage system 2420 for removal. For example, at a later time, the additional copies of one or more records stored in temporary ingress storage system 2410 may no longer be necessary, for example, due to access load of the record decreasing, and the record can be removed from temporary ingress storage system 2410, where the record is only stored in long-term storage system 2420. As another example, if an unavailable memory drive again becomes available, copies of the records stored on the newly available memory drive that were reinstated as a result of the memory drive being unavailable can be removed. In some cases, the replication factor reassignment function 2814 can be applied to reinstated records to change the number of copies of these reinstated records stored by the temporary ingress storage system 2410, for example, based on the factors discussed previously in conjunction with FIG. 28B.

In some embodiments, the record reinstatement assessment function 2920 is alternatively or additionally implemented by processing resources of the long-term storage system 2420 based on health, outage, and/or utilization conditions of memory drives 2425 and/or based on access load to particular records measured by long-term storage system 2420. Records selected for reinstatement via the record reinstatement assessment function 2920 are sent from the long-term storage system 2420 to the temporary ingress storage system 2410 for storage as reinstated records.

In some embodiments, the record reinstatement assessment function 2920 determines that a set of records be reinstated in temporary ingress storage system in response to determining an outage of a corresponding memory drive that stores this set of records. In the case where the outage is scheduled or predicted to occur soon due to detected degradation in health, these records can be retrieved from this memory drive 2425 and can be sent to the temporary ingress storage system 2410 for storage. For example, in response to detecting a future outage for memory drive 2425-1, some or all of the set of records in segments stored by the memory drive 2425-1, including record A, are determined to be reinstated for storage in temporary ingress storage system 2410. While the outage of the corresponding memory drive 2425 persists, rather than necessitating recovery of its records via the redundancy storage coding scheme for query execution and/or during the process in which the segments are being permanently rebuilt via the redundancy storage coding scheme, the records can be accessed in temporary ingress storage system 2410 for query executions that require these records. For example, queries requiring record A during the outage can be performed by accessing record A in temporary ingress storage system 2410 rather than necessitating recovery of record A via retrieving segments 2-K from memory drives 2425-2-2525-K and applying a decoding function of the redundancy storage coding scheme.

In the case where the outage occurs unexpectedly, in some embodiments, some or all records can be recovered via retrieving other segments in the segment group and applying a decoding function of the redundancy storage coding scheme, and these recovered records can be stored in temporary ingress storage system 2410. While it may be unrealistic to perform a full rebuild of all segments for storage in temporary ingress storage system 2410, records that are recovered individually by the query processing module 2450 via access to long-term storage system 2420 for the purpose of servicing a particular query during the outage can then be sent to the temporary ingress storage system 2410 for reinstatement, for example, if continued access to these segments is expected during the outage that is greater than a predefined threshold amount and/or frequency. In particular, as a subset of records have already been recovered for a query execution via access to other segments in long term memory, rather than necessitating this recovery be performed multiple times for multiple queries, these records, upon their recovery, can be stored in temporary ingress storage system 2410 for the remainder of the outage and/or until the segments are fully rebuilt on another memory drive 2425. These records, once recovered by query processing module 2450, can be sent to temporary ingress storage system 2410 as reinstated records for storage in addition to being processed by the query processing module 2450 via one or more query operations in facilitating query execution.

Once stored in one or more memory drives 2430 as one or more replicas, reinstated records can be accessed by the query processing module 2450 for query executions in either the long-term storage system 2420 or the temporary ingress storage system 2410. For example, the any of the $M_4$ instances of reinstated record A stored on memory drives 2430 can be accessed for some query executions, while record A stored in segment 1 or recovered from segments 2-K can be accessed in long-term storage system 2420 for other query executions. An embodiment for such selection for retrieval of records from either of these storage system options is presented in conjunction with FIG. 30A.

Figure 29D:
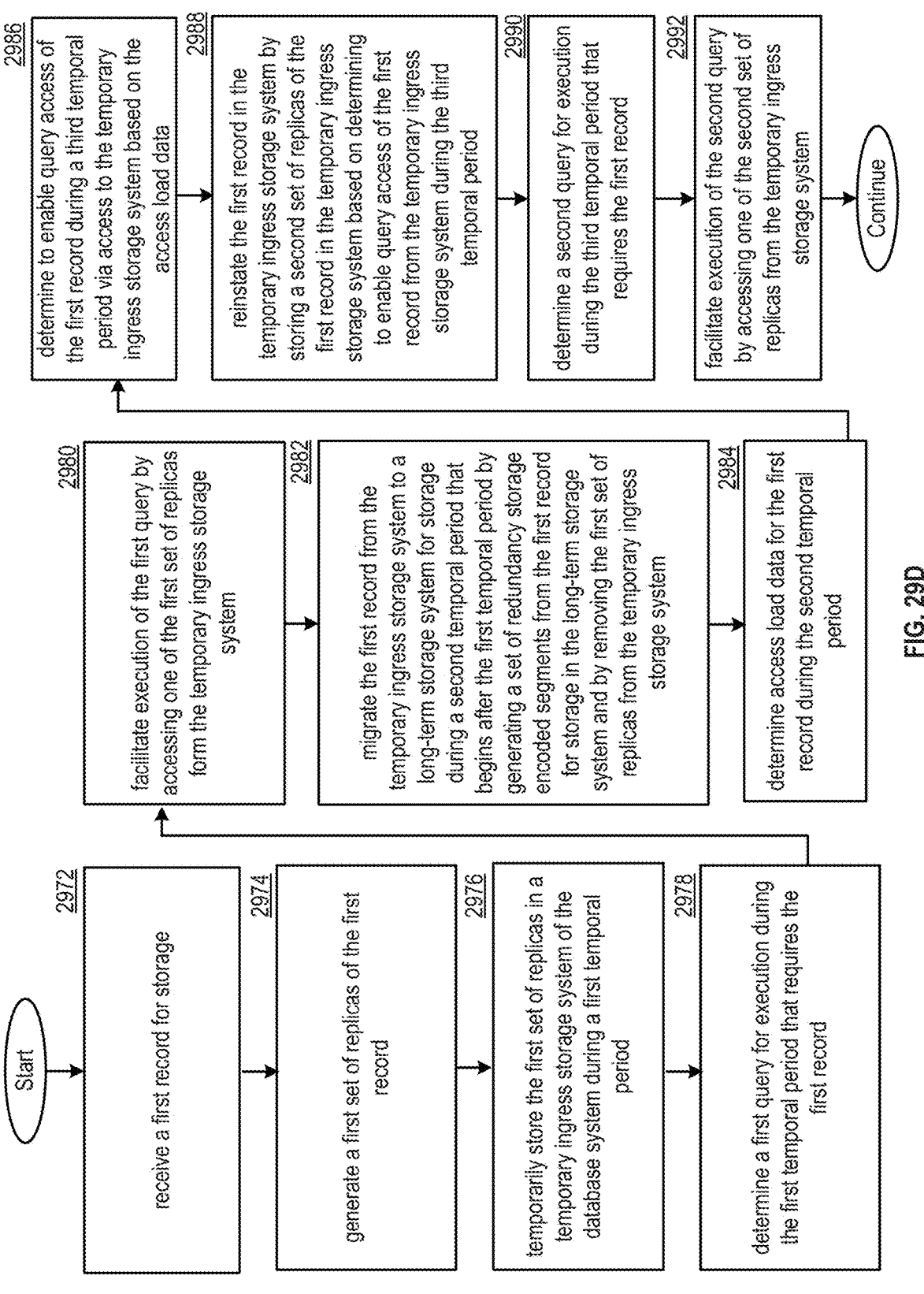
FIG. 29D is a logic diagram illustrating a method of reinstating records stored in long-term storage for storage as replicated records in accordance with various embodiments of the present invention.

FIG. 29D illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 29D. Some or all of the method of FIG. 29D can otherwise be performed by the temporary ingress storage system 2410 of FIGS. 29A-29C, for example, by utilizing at least one processor and memory of the temporary ingress storage system 2410 to implement the data replication module 2518, the data conversion module 2418, the record reinstatement assessment function 2920, and/or the record retrieval module 2930. Some or all of the method of FIG. 29D can be performed by the query processing module 2450, such as query processing sub-module 2452 of the query processing module 2450. Some or all of the steps of FIG. 29D can optionally be performed by any other processing module of the database system 10. Some or all of the steps of FIG. 29D can be performed to implement some or all of the functionality of the temporary ingress storage system 2410 described in conjunction with FIGS. 29A-29C. Some or all steps of FIG. 29D can be performed by database system 10 in accordance with other embodiments of the database system 10 discussed herein.

Step 2972 includes receiving a first record for storage, for example, in the input data stream and/or via a bulk-loaded set of records. Step 2974 includes generating a first set of replicas of the first record, for example, by applying a replication factor such as the minimum required replication factor dictated by the fault-tolerance management module 2530 and/or by applying a replication factor selected by performing the replication factor assignment function 2712 based on access load prediction data determined for the first record. Step 2976 includes temporarily storing the first set of replicas in a temporary ingress storage system of the database system during a first temporal period, for example, by storing the first set of replicas in a set of memory resources 2430.

Step 2978 includes determining a first query for execution during the first temporal period that requires the first record, and step 2980 includes facilitating execution of the first query by accessing one of the first set of replicas form the temporary ingress storage system. For example, the query processing sub-module 2452 can read one replica of the first set of replicas in accordance with execution of the first query based on the query processing module 2450 determining that the first record is required to execute the first query.

Step 2982 includes migrating the first record from the temporary ingress storage system to a long-term storage system for storage during a second temporal period that begins after the first temporal period. For example, the first temporal period ends with the migration of the first record from the temporary ingress storage system, and the second temporal period begins with the migration of the first record from the temporary ingress storage system. Migrating the first record can include generating a set of redundancy storage encoded segments that includes the first record for storage in the long-term storage system and can further include removing the first set of replicas from the temporary ingress storage system. For example, the set of redundancy storage encoded segments can be generated by utilizing the data conversion module 2418 to generate a set of segments of a segment group from a record group that includes the first record. In some cases, queries can be performed in the second temporal period that require the first record, and the first record can be read from the temporary ingress storage system via access to one or more segments of the segment group.

Step 2984 includes determining access load data for the first record during the second temporal period. For example, the access load data can be measured based on access requested for the first record in long-term storage system 2420 in accordance with query executions during the second temporal period requiring the second record. The access load data can correspond to a predicted level of access of the first record during a future time frame that falls within the second temporal period. The access load data can be generated by applying the access load assessment module 2718. Step 2986 includes determining to enable query access of the first record during a third temporal period via access to the temporary ingress storage system based on the access load data. For example, the record reinstatement assessment function 2920 can be performed and the reinstatement data can indicate a decision to reinstate the first record.

Step 2988 includes reinstating the first record in the temporary ingress storage system by storing a second set of replicas of the first record in the temporary ingress storage system. This reinstatement can be based on determining to enable query access of the first record from the temporary ingress storage system during a third temporal period. For example, the record retrieval module 2930 can be utilized to read the first record from a corresponding one of the redundancy-coded segments that were migrated to and stored in the long-term storage system. The first record can otherwise be sent to the temporary ingress storage system 2410 from the long-term storage system 2420. The third temporal period can begin with the first record being reinstated and once again being available for access via the temporary ingress storage system 2410. Note that the first record can also remain available for access via the long-term storage system during the third temporal period. The third temporal period can thus begin after the beginning of the second temporal period, and can also overlap with the second temporal period due to the second temporal period persisting during the third temporal period with the available access to the first record in the long-term storage system.

Step 2990 includes determining a second query for execution during the third temporal period that requires the first record, and step 2992 includes facilitating execution of the second query by accessing one of the second set of replicas from the temporary ingress storage system. For example, the query processing sub-module 2452 can read one replica of the second set of replicas in accordance with execution of the second query based on the query processing module 2450 determining that the first record is required to execute the first query.

Figure 30A:
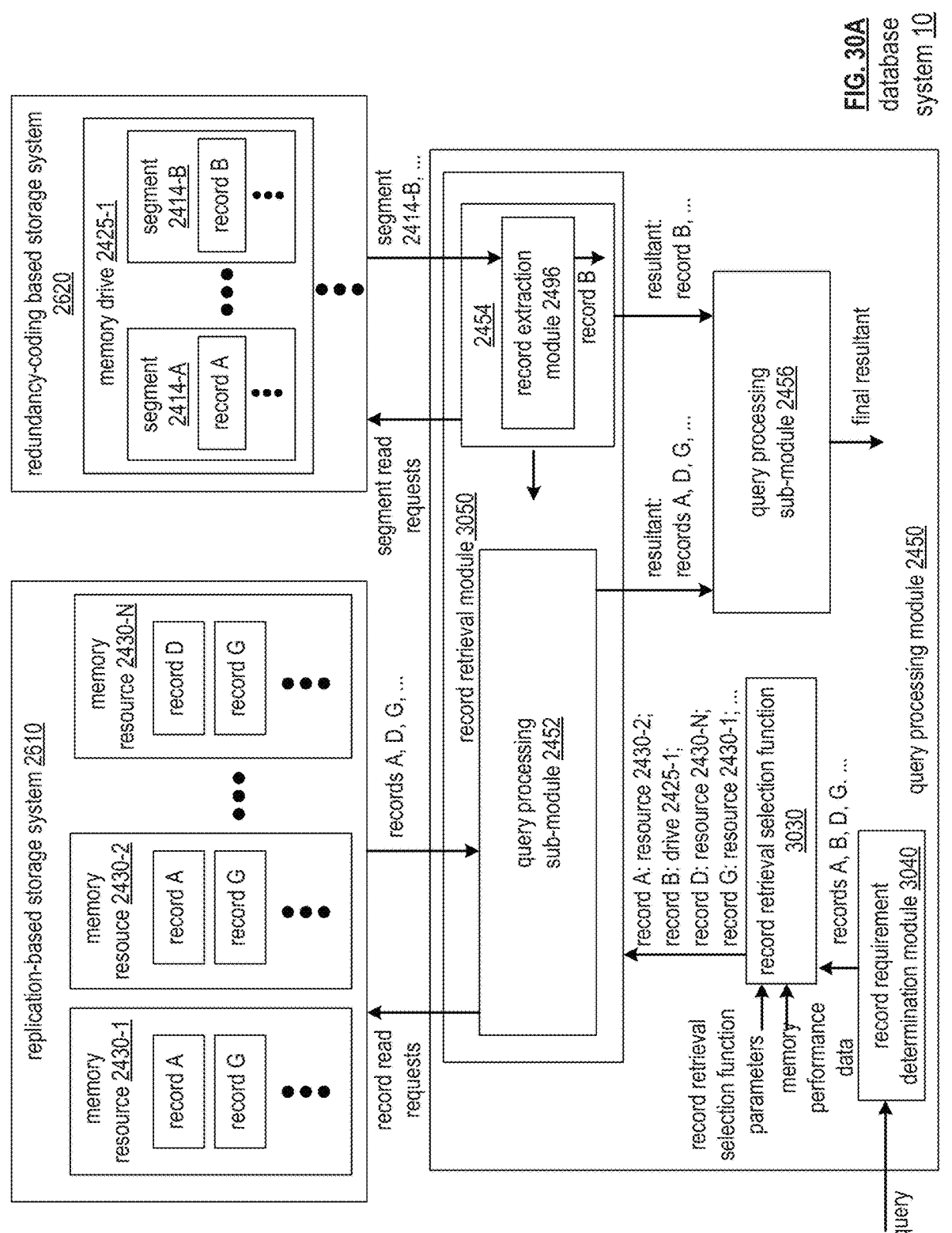
FIG. 30A is a schematic block diagram of a database system that utilizes a query processing module that implements a record retrieval selection function in accordance with various embodiments of the present invention.

FIG. 30A illustrates an embodiment of a query processing module 2450 that intelligently selects whether a record will be accessed via replication-based storage system 2610 or redundancy-coding based storage system 2620 by applying a record retrieval selection function 3030, for example, to handle cases where record reinstatement of FIGS. 29A-29C is employed and where some records are thus stored by both a replication-based storage system 2610 implemented as temporary ingress storage system 2410 or a redundancy-coding based storage system 2620 implemented as long-term storage system 2420. Furthermore, when the replication-based storage system 2610 is selected for access of a record, the record retrieval selection function 3030 selects which storage device of a set of M storage devices upon which a set of M replicas are stored will be accessed to read the record. This functionality improves database systems by enabling balance of access load across replication-based storage system 2610 or redundancy-coding based storage system 2620 and/or by optimizing access to replication-based storage system 2610 or redundancy-coding based storage system 2620 based on performance, utilization, and/or health of redundancy-coding based storage system 2620 and/or replication-based storage system 2610.

Some or all features of query processing module 2450 of FIG. 30A can be utilized to implement the query processing module 2450 of 26A, and/or any other embodiments of the query processing module 2450 discussed herein. In cases where the replication-based storage system 2610 is implemented as temporary ingress storage system 2410 and where redundancy-coding based storage system 2620 is implemented as long-term storage system 2420, some or all features of query processing module 2450 of FIG. 30A can be utilized to implement the query processing module 2450 communicating with the temporary ingress storage system 2410 and long-term storage system 2420 as discussed herein, such as the query processing module 2450 of Figures FIG. 24F, FIG. 24H, and/or FIG. 24N.

The query processing module 2450 can implement a record requirement determination module 3040 to determine a set of records of the database system required to execute the query. In the example illustrated in FIG. 30A, records A, B, D, and G are determined to be required for a given query by the record requirement determination module 3040. The record retrieval selection function 3030 can then generate record retrieval selection data for each record in this set of records to determine how each record will be accessed. This can include first generating a set of access options for each record that corresponds to some or all possible ways that the record can be accessed and/or some or all possible locations upon which the record is stored and can be accessed.

Generating the set of access options for a given record can include determining whether the record is stored by the replication-based storage system 2610, by the redundancy-coding based storage system 2620, or both. If the record is stored by the replication-based storage system 2610, this can additionally include determining which set of memory devices 2430 a set of replicas of the record are stored upon. If the record is stored by the redundancy-coding based storage system 2620, this can include identifying the corresponding segment and can further include determining which memory drive 2425 stores the corresponding segment. If the record is stored by the redundancy-coding based storage system 2620, this can further include, for example, if the corresponding segment is determined to be unavailable for access, identifying the other segments in the segment group required to recover the unavailable segment, and determining the set of memory drives 2425 upon which the other segments in the segment group are stored.

In this example, record A has access options that include access via memory resource 2430-1: access via memory resource 2430-1: access via segment 2414-A on memory drive 2425-1; and access via recovery by utilizing other segments in the same segment group on a set of other memory drives 2425. For example, the replication-based storage system 2610 is implemented as the temporary ingress storage system 2410, and record A of FIG. 30A is record A of FIG. 29C, where record A was reinstated for access in replication-based storage system 2610 after previously being received processed for long term storage by the replication-based storage system 2610. Record B is only accessible via redundancy-coding based storage system 2620. For example, the replication-based storage system 2610 is implemented as the temporary ingress storage system 2410, and segment 2414-B that includes record B was previously generated and migrated by the temporary ingress storage system 2410 to the redundancy-coding based storage system 2620. Record D has access options that include access to memory resource 2430-N, but not memory resources 2430-1 or 2430-2. Record G has access options that include access to memory resource memory resource 2430-1, 2430-2, or 2430-N. Records D and G are not accessible via redundancy-coding based storage system 2620. For example, the replication-based storage system 2610 is implemented as the temporary ingress storage system 2410, and records D and G are replicated in accordance with the same or different replication factor on different sets of memory resources as they await conversion and migration to long-term storage.

Applying the record retrieval selection function 3030 for a given record can include selecting one of this set of determined access options of the corresponding record in conjunction with execution of the given query to generate the record retrieval selection data. In particular, different ones of the set of access options for a given record can be selected for different queries being performed concurrently and/or for different queries received over time to balance access load to the memory resources 2430 and/or memory drive 2425 storing these records rather than always retrieving records from a same one of the set of access options. For example, the selection can be determined for the given record based on the function parameters to balances the access load across the set of access options can include a random and/or pseudo-random selection from the set of access options to balance the access load across the set of access options, and/or can include a turn-based selection from the set of access option for the records for incoming queries received over time that require the record to balance the access load across the set of access options.

Record retrieval selection function parameters defining the record retrieval selection function 3030 can be: received by the query processing module 2450; stored locally by at least one memory of the query processing module 2450; accessible by the query processing module 2450; and/or can be otherwise determined by the query processing module 2450. In some cases, these parameters can be configured via user input to an interactive interface displayed via a display device of a client device communicating with the database system via system communication resources 14 and/or external network(s), for example, in conjunction with the configuration sub-system 16.

In some cases, it is advantageous to access a record from the replication-based storage system 2610 instead of the redundancy-coding based storage system 2620, when possible, due to the memory resources 2430 being faster than and/or having more efficient access than memory drives 2425 as discussed previously. In some embodiments, if the record is stored in both the replication-based storage system 2610 and the redundancy-coding based storage system 2620, the record is automatically selected from a memory resource of the replication-based storage system 2610 and/or is selected to be accessed from memory resource of the replication-based storage system 2610 with higher probability than replication-based storage system 2610 in making the random selection. In some cases, this probability of selection from replication-based storage system 2610 applied in the random selection can increase as a function of the number of replicas stored in the replication-based storage system 2610.

In other cases, it may be more advantageous to access a record from the redundancy-coding based storage system 2620 instead of as a replica stored in replication-based storage system 2610. For example, other expensive activities being performed by nodes 2437 and/or nodes 2438 such as rebuilding of unavailable segments, generation of segments for long-term storage via data conversion module 2418, and/or other activities that consume processing resources may preclude these nodes from being able to efficiently access their memory resources 2430 and/or memory drives 2425. In such cases, nodes 2437 and/or nodes 2438 that are less consumed by other processing activities may be advantageous for selection for record access at such times. For example, if all three replicas of data required for a query currently are stored in memory resources with a high load and/or are stored by nodes 2437 performing other activities, it can be determined that the best option is to access the record via a memory drive 2425. In some cases, it may be determined that the best option is to utilize redundancy-coding based storage system 2620 even when the segment is unavailable, where the selected option is to rebuild this data for servicing of the given query via applying a decoding function of the redundancy storage coding scheme one other segments that must be retrieved from their respective memory drives 2425, rather than further overloading access to memory drives 2430 that store existing replicas of this record.

In some cases, the record retrieval selection function 3030 can generate the record retrieval selection data based on other determined information, such as memory performance data that is measured, calculated, received, or otherwise determined by the query processing module 2450. For example, the memory performance data can indicate whether any memory resources and/or memory drives are currently experiencing or expected to be experiencing outages and/or failures rendering their records unavailable for access, record retrieval selection function 3030 can determine not to retrieve the record via an access option that includes accessing any of these unavailable memory resources 2430 and/or memory drives 2425.

The memory performance data can alternatively or additionally indicate other health data: latency data indicating current and/or expected latency for access to memory resources 2430 and/or memory drives 2425; access load data indicating the level of current and/or pending reads for the same or different record from the memory resources 2430 and/or memory drives 2425; processing resource consumption by nodes 2437 and/or nodes 2438 that include memory resources 2430 and/or memory drives 2425, respectively; and/or other information regarding measured and/or expected current performance of the memory resources 2430 and/or memory drives 2425. For example, an access option for the record corresponding to a lowest latency memory resource 2430 and/or memory drive 2425 of the set of access options can be selected for access of the record. As another example, an access option for the record corresponding to a memory resource 2430 and/or memory drive 2425 of the set of access options with lowest current access load can be selected for access of the record. As another example, an access option for the record corresponding to a memory resource 2430 and/or memory drive 2425 currently being utilizing and/or pending access for the same record for execution of a different concurrently executing query can be selected.

This record retrieval selection data generated by record retrieval selection function 3030 can be utilized by a record retrieval module 3050 to retrieve the required set of records by the access means selected in the record retrieval selection data. In this example, record A is selected to be accessed from memory resource 2430-2. For example, record A is selected to be access from replication-based storage system 2610 rather than redundancy-coding based storage system 2620 because access to record A via a memory resource 2430 is faster than access to record A via memory drive 2425-1. Record B is selected to be accessed from memory drive 2425-1, for example, because it is not available for access via a memory resource 2430. Record D is selected to be accessed from memory resource 2430-N, and record G is selected to be accessed from memory resource 2430-1. For example, record A record D and record G are selected to be accessed on different memory resources 2430 to balance the access load across memory resources 2430-1, 2430-2, and 2430-N.

The record retrieval module can facilitate these retrievals accordingly to read the set of records. For example, reads selected to be performed via access to replication-based storage system 2610 can be performed by query processing sub-module 2452. This can include further assigning access to individual records via the set of nodes 2437 that include and/or are designated to access the selected memory resource 2430 as discussed in conjunction with FIG. 24N.

For example, a first node that includes memory resource 2430-1 is assigned the task of reading record G based on the record retrieval selection data indicating record G be read from memory resource 2430-1, where this first node performs query operations on record G and/or forwards record G to a next node 37 in the query execution plan 2465: a second node that includes memory resource 2430-2 is assigned the task of reading record A based on the record retrieval selection data indicating record A be read from memory resource 2430-2, where this second node performs query operations on record A and/or forwards record A to a next node 37 in the query execution plan 2465; and/or a third node that includes memory resource 2430-N is assigned the task of reading record D based on the record retrieval selection data indicating record D be read from memory resource 2430-N, where this third node performs query operations on record D and/or forwards record D to a next node 37 in the query execution plan 2465. Query processing sub-module 2452 can otherwise generate a partial resultant from records A, D, G or simply forward records A, D, and G once read from memory to query processing sub-module 2456 as discussed previously.

Similarly, reads selected to be performed via access to redundancy-coding based storage system 2620 can be performed by query processing sub-module 2454, where segments are retrieved in accordance with the record retrieval selection data, where one or more segments are optionally recovered from a set of retrieved segments in the same segment group, and where the required records are then extracted from these retrieved and/or recovered segments via record extraction module 2496. This can include further assigning access to individual records via the set of nodes 2438 that include and/or are designated to access the corresponding memory drive 2425 as discussed in conjunction with FIG. 24N. For example, a particular node 2428 that includes memory drive 2425-1 is assigned the task of reading record B by accessing segment 2414-B from memory drive 2425-1 based on the record retrieval selection data indicating record B be read from memory drive 2425-1, where this node 2428 performs query operations on record B and/or forwards record B to a next node 37 in the query execution plan 2465. Query processing sub-module 2454 can otherwise generate a partial resultant from record B or simply forward record B once read from memory to query processing sub-module 2456 as discussed previously. Query processing sub-module 2456 can generate a final resultant for the query from the raw records and/or resultants received from query processing sub-module 2452 and query processing sub-module 2454 as discussed previously.

Figure 30B:
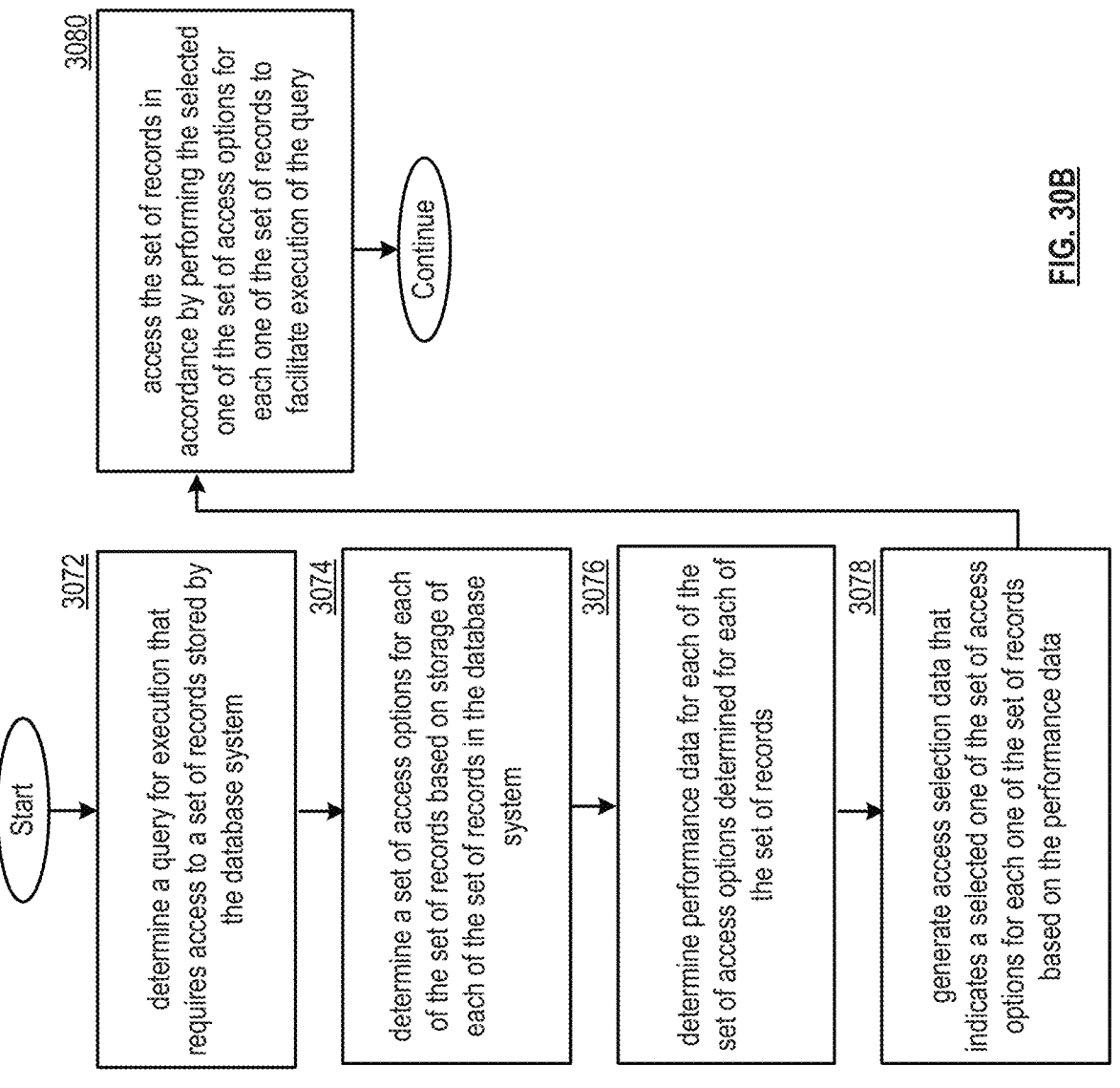
FIG. 30B is a logic diagram illustrating a method of selecting means of accessing records from a plurality of access options in accordance with various embodiments of the present invention.

FIG. 30B illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 30B. Some or all of the method of FIG. 30B can otherwise be performed by the query processing module 2450 of FIG. 30A, for example, by utilizing at least one processor and memory of the query processing module 2450 to implement the record requirement determination module 3040, the record retrieval selection function 3030, the record retrieval module 3050, the query processing sub-module 2452, the query processing sub-module 2454, and/or the query processing sub-module 2456 of FIG. 30A. Some or all of the steps of FIG. 30B can optionally be performed by any other processing module of the database system 10. Some or all of the steps of FIG. 30B can be performed to implement some or all of the functionality of the database system 10 described in conjunction with FIG. 30A. Some or all steps of FIG. 30B can be performed by database system 10 in accordance with other embodiments of the database system 10 discussed herein.

Step 3072 includes determining a query for execution that requires access to a set of records stored by the database system. For example, the set of record can be determined by utilizing the record requirement determination module 3040 and/or by otherwise determining a query domain and/or one or more tables indicated by the query. Step 3074 includes determining a set of access options for each of the set of records based on storage of each of the set of records in the database system. In particular, each record in the set of records can have at least one of the following set of access options, and at least one record in the set of records can have all of the following set of access options: a direct segment read option that includes accessing a single redundancy-coded segment from a memory drive of a redundancy-coding based storage system of the database system and extracting the record from the single redundancy-coded segment; a segment recovery option that includes accessing a plurality of redundancy-coded segments stored in different memory drives of the redundancy-coding based storage system, recovering the single redundancy-coded segment, and extracting the record from the single redundancy-coded segment; and a plurality of record replica read options that each include accessing a corresponding one of a set of replicas of the record stored in a replication-based storage system of the database system.

Step 3072 includes determining performance data for each of the set of access options determined for each of the set of records. This can include performance data regarding particular memory resources 2430 of the replication-based storage system 2610 and/or particular memory drives 2425 of the redundancy-coding based storage system 2620 that are indicated in the access options for a particular record. This can include health data such as whether or not the corresponding memory drive 2425 and/or memory resource 2430 is available, failing, and/or degrading. This can include current and/or expected access load data for the corresponding memory drive 2425 and/or memory resource 2430, for example, based on other records of the given query that are accessible via the corresponding memory drive 2425 and/or memory resource 2430, and/or based on one or more other concurrently executing queries requiring access to the corresponding memory drive 2425 and/or memory resource 2430. This can include other utilization data, for example, corresponding to other processing activities being performed and/or expected to be performed by a corresponding node 37 that includes and/or is responsible for accessing the corresponding memory drive 2425 and/or memory resource 2430. This can include latency data indicating current and/or expected latency to the corresponding memory drive 2425 and/or memory resource 2430.

Step 3078 includes generating access selection data that indicates a selected one of the set of access options for each one of the set of records based on the performance data. For example, the record retrieval selection function 3030 can be utilized to generate the access selection data for each record in the set of records. In cases where a record is selected to be accessed via the replication-based storage system, this can include further selecting a particular one of the set of replicas of the record to be accessed via a particular one of a set of corresponding memory resources 2430. Generating the access selection data can include balancing access load required to retrieve records available via access to overlapping sets of memory drives 2425 and/or memory resources 2430 by ensuring access load and/or utilization of any particular memory drive 2425 and/or memory resource 2430 does not exceed a predefined threshold load, and/or by evenly distributing load across the set of memory resources 2430 and/or memory drives 2425 at any given time during the query's execution. Step 3080 includes accessing the set of records in accordance by performing the selected one of the set of access options for each one of the set of records to facilitate execution of the query, for example, by utilizing the record retrieval module 3050.

FIG. 31A illustrates an embodiment of a temporary ingress storage system 2410 that implements data conversion module 2418 to generate multiple sets of redundancy-coded segments from the same input records based on multiple heuristic sorted groupings of record groups assigned by input data sorting module 2440 in accordance with a set of multiple heuristics. In particular, some or all features of temporary ingress storage system 2410 that utilize input data sorting module 2440 to generate record groups as discussed in conjunction of FIGS. 24C-24E can be utilized to implement the temporary ingress storage system 2410 of FIG. 31A. Some or all features of the temporary ingress storage system 2410 of FIG. 31A can be utilized to implement any embodiments of the temporary ingress storage system 2410 discussed herein.

As discussed previously in conjunction with FIG. 24G, data is stored in slower memory as it ages, which matches the trend of data hotness being dictated by and decreasing with the age of the data. While age is clearly correlated with data hotness, other heuristics can be determined to be correlated with data hotness and/or can be utilized to group data that is likely to be in high demand at similar times and/or for similar reasons. In particular, access demand for different types of records can be predicted to reemerge over time for other reasons, and additional corresponding heuristics other than record age can be determined to link records with similar features that are correlated with access demand.

In some cases, it can be beneficial to store some or all records in multiple bundles, where some or all data is converted for migration to long-term storage system 2420 as segments based on multiple different heuristics that are determined to be correlated with the data's access demand. If particular data, such as a records grouped into a particular set of one or more segments in long-term storage system 2420, is determined and/or predicted to become "hot" or otherwise have an increase in access demand that compares favorably to a predefined data hotness threshold based on a particular heuristic correlated to data hotness, it is advantageous if the data is already bundled in storage based on this heuristic. In particular, the data can be more easily retrieved for faster, replicated storage in as reinstated records in temporary ingress storage system 2410, where the record reinstatement assessment function 2920 can be implemented to reinstate entire record groups with bundled records that match a category of data determined or predicted to become "hot" by retrieving the corresponding set of segments. In some cases, only a fraction of data that is determined to be more likely to have data hotness dictated by another heuristic is stored in bundles with data with this common other heuristic, where some records are stored in multiple segments in long-term storage while other records are only stored in a single segment in long-term storage as discussed previously. The bundling of particular data into multiple bundles for long-term storage can be achieved during ingress, and in some cases, can be dynamically determined based on levels and/or corresponding reasons of data hotness for this data when received/while in ingress. This mechanism of bundling data into record groupings designated by multiple different heuristics for data hotness improves database systems by enabling more efficient retrieval of sets of records for access and/or for replicated reinstatement in faster memory resources that are likely to have similar trends in access demand over time for different reasons.

As illustrated in FIG. 31A, incoming data can be processed by input data sorting module 2440 as discussed previously in conjunction with FIGS. 24A-24C to generate record groups. Each record group, once sufficiently large or otherwise determined to be ready for conversion, are converted into one or more sets of segments of one or more segment groupings as discussed previously. However, rather than assigning each record to exactly one record group, some or all records can be assigned to multiple record groups, where a given record can are thus be included in multiple sets of redundancy-coded segments generated from these different record groups that include the record. The migration of these multiple sets of redundancy-coded segments to long-term storage system 2420 as discussed previously results in multiple copies of each record being accessible via segments of different ones of these multiple sets in long-term storage. The record retrieval selection function 3030 can be operable to select which segment storing a particular record in long-term storage is utilized to access the record for query execution.

The input data sorting module 2440's grouping of records into multiple record groups can be based on categorization data and/or other parameters defining and/or otherwise associated with H different heuristics 3110-1-3110-H. This categorization data for heuristics 3110-1-3110-H can be: received by the temporary ingress storage system 2410; stored locally by at least one memory of the temporary ingress storage system 2410; accessible by the temporary ingress storage system 2410; and/or can be otherwise determined by the temporary ingress storage system 2410. In some cases, this categorization data can be configured via user input to an interactive interface displayed via a display device of a client device communicating with the database system via system communication resources 14 and/or external network(s), for example, in conjunction with the configuration sub-system 16.

The categorization data for each heuristic can indicate the parameters, similarity function, threshold values, and/or rules by which incoming records are sorted into a set of record groups 1-G for the given heuristic. For example, some or all of the means described in conjunction with FIG. 24C that can be utilized by the input data sorting module 2440 to assign records to a selected one of a set of record groups 1-G can be dictated by categorization data of a corresponding heuristic, where some or all different heuristic have categorization data dictated by some or all of the means described in conjunction with FIG. 24C for sorting the data based on different criteria.

The set of record groups 1-G for a given heuristic can be fixed and correspond to a set of G defined categories for the heuristic. Alternatively, the set of record groups 1-G for a given heuristic can be dynamic where G can change at different points in time and/or is otherwise not fixed. Different sets of record groups for different heuristics can have different numbers G of record groups.

In the example illustrated in FIG. 31A, the incoming set of records includes records A, B, C, and D. A first heuristic

3110-1 of the set of H heuristics can dictate grouping of incoming records into sorted groupings $1$-$G_1$ for this first heuristic 3110-1. In this example, records A and B are included in record group 1 of the sorted groupings for the first heuristic 3110-1, and records C and D are included in record group $G_1$ of the sorted groupings for the first heuristic 3110-1. For example, records A and B compared more favorably to categorization criteria defining group 1 than to categorization criteria defining each of the other groups for the first heuristic 3110-1, while records C and D compared more favorably to categorization criteria defining group $G_1$ than to categorization criteria defining each of the other groups sorted groupings for the first heuristic 3110-1. The data conversion module performs the redundancy storage coding function upon record groups of heuristic 3110-1 as they are deemed large enough or otherwise ready for long-term storage as a first set of redundancy storage coded segments $1$-$S_1$ that are migrated to long-term storage system 2420.

Meanwhile, a second heuristic 3110-H of the set of H heuristics can dictate grouping of incoming records into sorted groupings $1$-$G_H$ for this heuristic 3110-H. In this example, records A and C are included in record group 1 of the sorted groupings for the heuristic 3110-H, and record B is included in record group $G_H$ of the sorted groupings for the heuristic 3110-H. Note that record D may be included in a different one of the record groups for heuristic 3110-H. However, in some embodiments, the categorization data or other parameters for heuristic 3110-H may dictate that record D does not compare favorably to any of the categories, and thus will not be stored.

The data conversion module performs the redundancy storage coding function upon record groups for heuristic 3110_H as they are deemed large enough or otherwise ready for long-term storage as a second set of redundancy storage coded segments $1$-$S_H$ that are migrated to long-term storage system 2420. These redundancy storage coded segments $1$-$S_H$ can be generated utilizing the same or different redundancy storage coded function and/or utilizing the same or different redundancy storage coded function parameters as segments $1$-$S_1$. These redundancy storage coded segments $1$-$S_H$ can be stored in the same or different long-term storage system 2420 than segments $1$-$S_1$. For example, only segments $1$-$S_1$ are accessed for query execution, and other segments $1$-$S_H$ are instead only accessed in detected and/or scheduled circumstances corresponding to the heuristic that are known and/or predicted to indicate high data demand, for example, for reinstatement to temporary ingress storage system 2410 at such times.

In some embodiments, the set of heuristics 3110-1-3110-H includes a data age heuristic 3110, where data is grouped into record groups of this heuristic 3110 based on when it is received by the system. In such cases record groups may be generated one at a time, filling with the most recent data as discussed previously until a record group is ready for migration. In other cases, the record groups may be required based on other criteria such as record type, table the record belongs to, set of fields included in the record, or other criteria. However, records are still predominantly placed into groupings as they are received, and thus records within the same record group were received within a similar time frame. For example, the other criteria dictating record groupings can be loose enough to ensure conversion into segments is occurring at a sufficiently high rate such that records within the same record groups were collected at sufficiently similar times. This can dictate that the number of groups G that are pending conversion at a given time is lower than a threshold and/or sufficiently small to ensure that all groups are filling at a reasonable rate as necessary for conversion. All records in a given group are thus expected to similarly decrease in data hotness over time as the age of all records in a group are substantially the same. This heuristic of grouping records can be most conducive for implementation by the temporary ingress storage system 2410 as discussed previously because data is naturally inputted into the system in an ordering dictated by and/or otherwise based on its age.

Other heuristics may have stricter rules dictating how they are sorted into record groups, where incoming records as a stream sorted inherently by recency may cause record groups being formed under these stricter guidelines to fill much more slowly, as it may take a while to collect enough records required for the record group to be converted and migrated due to the stricter rules. In some cases, as the rules dictating each group is stricter, there can be a significantly higher number of pending record groups at a given time that is, for example, orders of magnitude greater than the number of pending of groups that are formed for the data age heuristic.

In some cases, it may not be ideal to store all of the necessary segments as they await long-term storage in the temporary ingress storage system, as it may require that a large number of segments utilize memory resources for long periods of time as their record groups slowly fill. In some cases, for these other heuristics that aren't based on data age, the input data can be separate from the input stream utilized to populate record groups of the age-based heuristic. For example, these other record groups for other heuristics can be formed from bulk data that is loaded into the system that may have been collected across a range of various times that is, for example, already sorted and/or selected for ingress based on one or more other heuristics. In some cases, the input data is bulk loaded and/or otherwise retrieved from the long-term storage system 2420 itself to be reprocessed into a new segments sorted based on different criteria.

In some cases, it is advantageous to retrieve and group data that is later determined to be in high demand into a new set of segments. For example, records that are retrieved for storage as reinstated records as discussed in conjunction with FIGS. 29A-29C may have been collected from various different segments, and may be reinstated in response to being accessed for one or more recent queries. In this case, these records that were reinstated at a similar time, for example, due to their demand increasing at a particular time for a known or unknown same or similar reason, can be grouped into a same record group or same set of multiple record groups automatically. In particular, as this data was all heavily accessed at a particular time to necessitate the reinstatement, this can be indicative that this data may all be in high demand at similar times later due to having a same known or unknown trait that dictates all of these records have similar trends in access demand.

In some embodiments, the set of heuristics 3110-1-3110-H includes a data source heuristic, where the records are sorted based on an entity and/or particular data collection device that generated, measured, and/or collected the record. For example, each record group can correspond to a different data collection device. In some embodiments, the set of heuristics 3110-1-3110-H includes a data value heuristic, where the records are sorted based on one or more values of one or more fields included in the record being identical and/or falling within the same range. For example, each record group can correspond to a different value or range of values required for one or more fields of the record. In some embodiments, the set of heuristics 3110-1-3110-H includes a repeating time-period heuristic, where records are sorted based on the time of day, week, month, and/or year they were collected. For example, each record group of this heuristic 3110 can correspond to a different day of the week, where records are sorted into a group based on the day of the week they were collected. As another example, each record group of this heuristic 3110 can correspond to a different time of data, where records are sorted into a group based on the hour in which were collected.

FIG. 31B illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 31B. Some or all of the method of FIG. 31B can otherwise be performed by the temporary ingress storage system 2410 of FIG. 30A and/or FIG. 29C, for example, by utilizing at least one processor and memory of the temporary ingress storage system 2410 to implement the input data sorting module 2440 and/or the data conversion module 2418 of FIG. 31A, and/or to implement the record reinstatement assessment function 2920, record retrieval module 2930, and/or data replication module 2518 of FIG. 29C. Some or all of the steps of FIG. 31B can optionally be performed by any other processing module of the database system 10. Some or all of the steps of FIG. 31B can be performed to implement some or all of the functionality of the database system 10 described in conjunction with FIG. 31A and/or FIG. 29C. Some or all steps of FIG. 31B can be performed by database system 10 in accordance with other embodiments of the database system 10 discussed herein.

Step 3172 includes receiving a plurality of records for storage, for example, in an input data stream and/or a bulk-loaded set of records. Step 3174 includes identifying a first plurality of mutually exclusive sets of records in the plurality of records based on a corresponding first plurality of categories of a first access demand heuristic, for example, by utilizing the input data sorting module 2440 by applying the categorization data for a first heuristic 3110. The first plurality of mutually exclusive sets of records can be collectively exhaustive with respect to the plurality of records. The first plurality of mutually exclusive sets of records can include a first set of records that corresponds to one category of the first plurality of categories, where the first set of records includes a first record. A first plurality of mutually exclusive sets of records can include another set of records that corresponds to another category of the first plurality of categories, where this other set of records of records includes a second record.

Step 3176 includes identifying a second plurality of mutually exclusive sets of records in the plurality of records based on a corresponding second plurality of categories of a second access demand heuristic, for example, by utilizing the input data sorting module 2440 by applying the categorization data for a second heuristic 3110. The second plurality of categories can correspond to different record grouping criteria than the first plurality of categories. The second plurality of mutually exclusive sets of records can also be collectively exhaustive with respect to the plurality of records. The second plurality of mutually exclusive sets of records can includes a second set of records that corresponds to one category of the second plurality of categories, where the second set of records includes both the first record and the second record.

Step 3178 includes generating a plurality of sets of segments by applying a redundancy storage coding scheme to each set of records in the first plurality of mutually exclusive sets of records, and includes applying the same or different redundancy storage coding scheme to the second plurality of mutually exclusive sets of records. Each set of segments of the plurality of sets of segments can be generated based on a corresponding set of records in either the first plurality of mutually exclusive sets of records or the second plurality of mutually exclusive sets of records. For example, each set of segments can be generated by utilizing the data conversion module 2418 to perform the redundancy storage coding scheme upon a set of segments corresponding to a single record group that is determined to be sufficiently large and/or otherwise ready for migration. A first set of segments of the plurality of sets of segments is generated from the first set of records, and a second set of segments of the plurality of sets of segments is generated from the second set of records.

Step 3180 includes migrating the plurality of records to a long-term storage system by storing the plurality of sets of segments in the long-term storage system, such as long-term storage system 2420 and/or redundancy-coding based storage system 2620. Queries can be executed via access to segments in the plurality of sets of segments while stored in the long-term storage system.

Step 3182 includes detecting that an access demand condition corresponding to one category of the first set of categories has been met. This can include a particular condition that is known to or predicated to indicate that records falling under the corresponding category are and/or will be in high demand. For example, this detection can include determining a recent, current, and/or predicted increase in access to types of segments in the corresponding category. As another example this detection can include This can include determining a current or upcoming time frame and/or other current or upcoming condition correlated to or otherwise associated with higher access demand of types of segments in the corresponding category. Step 3184 includes determining to enable query access to the first set of records in a replication-based storage system, such as the replication-based storage system 2610 and/or temporary ingress storage system 2410, based on detecting that the access demand condition corresponding to the one category associated with the first set of categories has been met. The replication-based storage system can enable faster and/or more efficient access to its stored records than the long-term storage system.

For example, the record reinstatement assessment function 2920 is implemented by the replication-based storage system and is utilized to generate reinstatement data for sets of segments corresponding to record groups grouped in accordance with a particular category of various heuristics including the first access demand heuristic and/or second access demand heuristic. The record reinstatement assessment function 2920 can detect the access demand condition of the one category and/or can otherwise determine the known and/or predicted access load data of the one category, for example, where the records in the one category are reinstated based on the current and/or upcoming known and/or predicted access load data of the one category comparing favorably to a high demand threshold.

Step 3186 includes storing at least one replica of each of the first set of records in the temporary ingress storage system during a first temporal period, based on determining to enable query access to the set of records in the replication-based storage system, by accessing the first set of segments in the long-term storage system. The number of replicas can be determined by utilizing the replication factor assignment function 2712 based on the detected access condition and/or based on the current and/or predicted access load of records in the one category. The first temporal period can be temporary, and the time and duration of the first temporal period can be selected based on the detected access condition and/or based on the current and/or predicted access load of records in the one category, such as a known and/or predicted duration of the high level of access demand for types of records in the one category. Once the first temporal period elapses, the first set of records can be removed from the replication-based storage system.

Figure 32A:
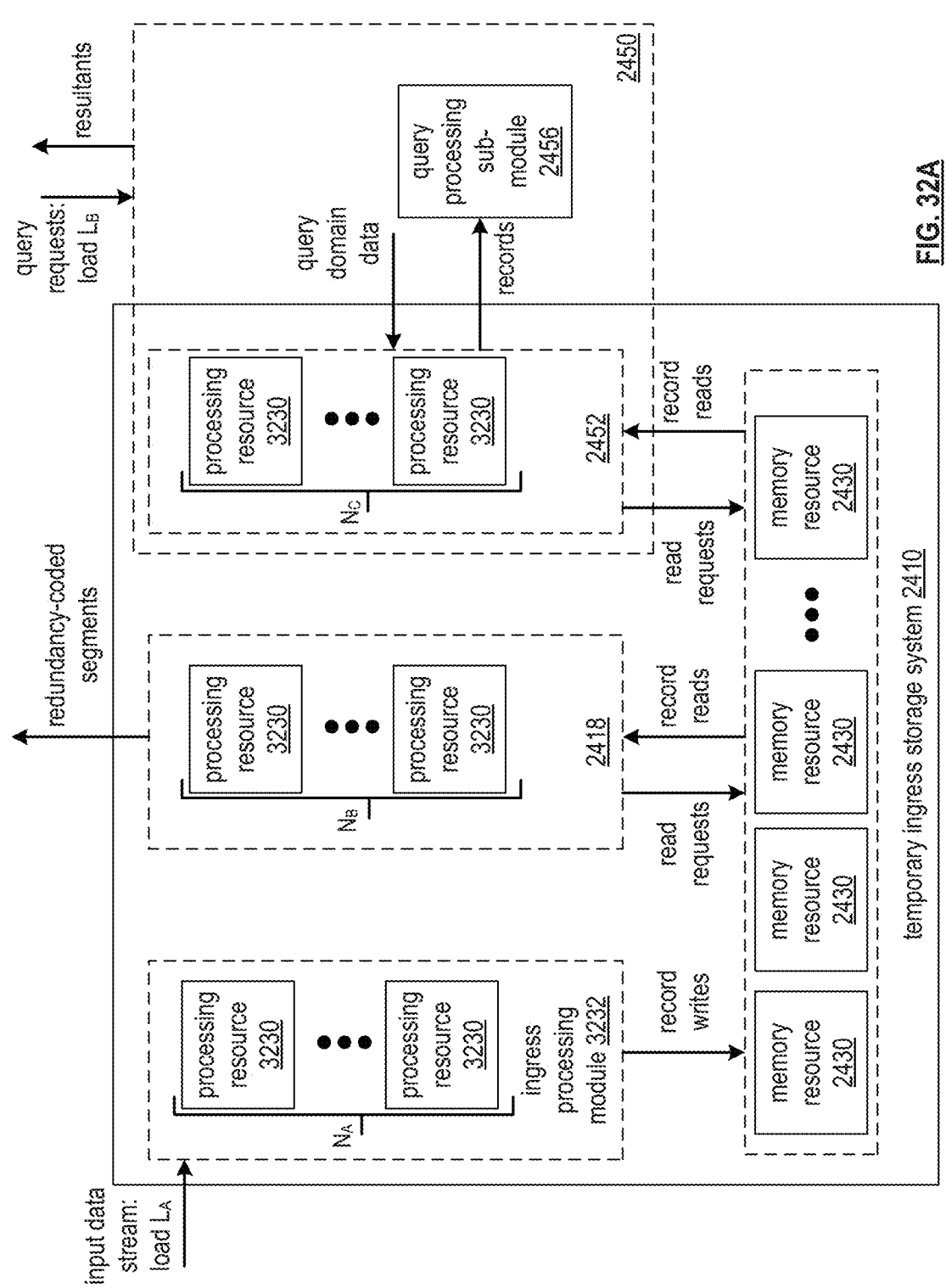
FIG. 32A is a schematic block diagram illustrating allocated processing resources of a temporary ingress storage system in accordance with various embodiments of the present invention.
Figure 32B:
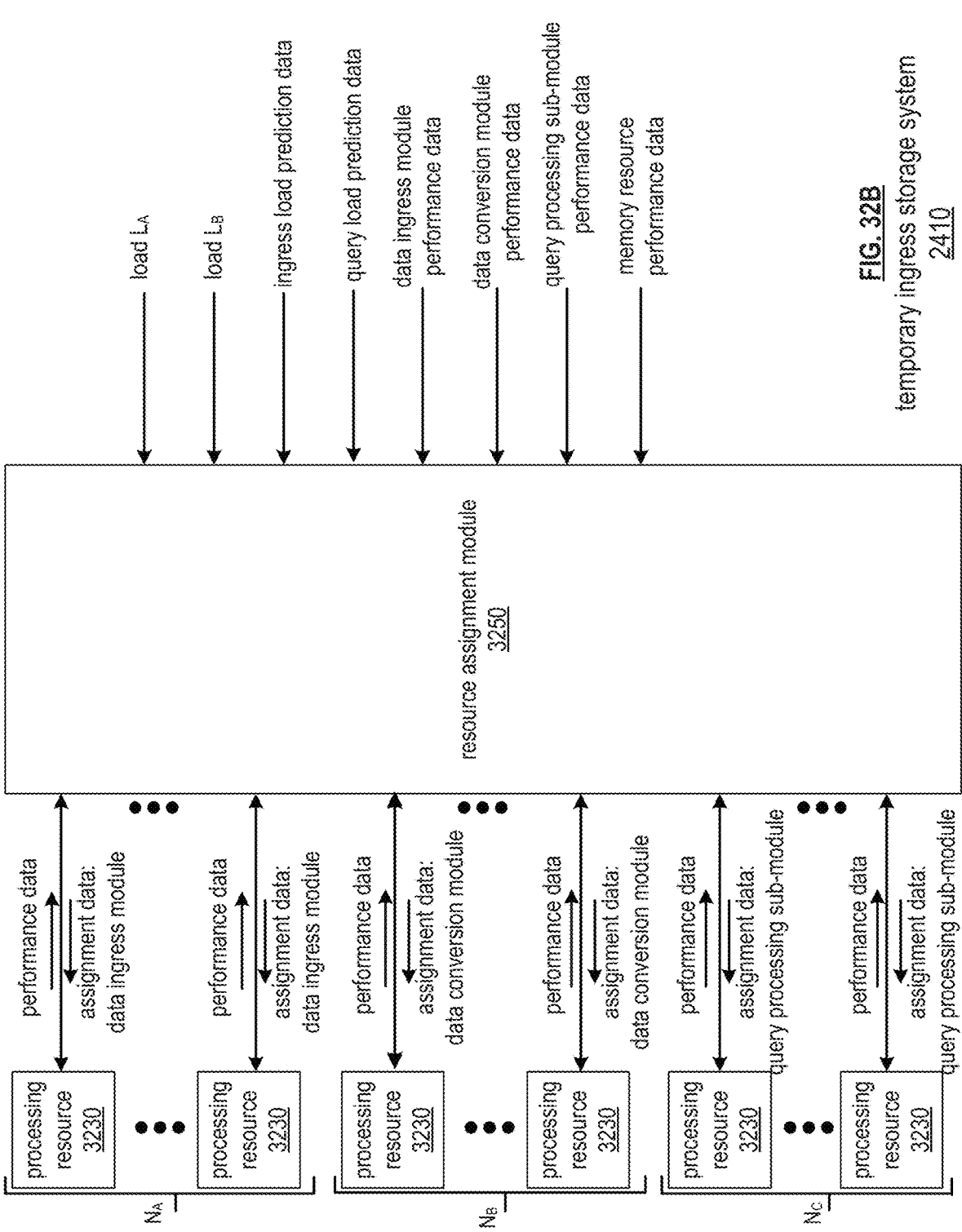
FIG. 32B is a schematic block diagram of a temporary ingress storage system that implements a resource assignment module to allocate its processing resources in accordance with various embodiments of the present invention.

FIGS. 32A-32B illustrate an embodiment of temporary ingress storage system 2410 that utilizes a resource assignment module 3250 to dynamically allocate its processing resources 3230 over time for different tasks in response to changing conditions and/or predicted future conditions detected by the temporary ingress storage system 2410. This improves database systems by dynamically balancing load and/or utilization to particular processing resources 3230 and/or by reducing latency induced on or more particular functionalities of the temporary ingress storage system 2410 via reallocation of additional resources to particular functionalities that are strained. Some or all of the features of the temporary ingress storage system 2410 of FIG. 32A-32B can be utilized to implement the temporary ingress storage system 2410 of FIG. 24A and/or any other embodiment of the temporary ingress storage system 2410 described herein.

Some or all functionality of the temporary ingress storage system 2410 described herein can be implemented by utilizing one or more particular processing resources 3230. These processing resources can each be implemented by utilizing: one or more nodes 2437: one or more other nodes 37 of one or more computing devices 18: one or more memory resources 2430; and/or any other processors, processing device, and/or processing module utilized to implement the temporary ingress storage system 2410. For example, each processing resource 3230 can correspond to a fixed processing resource whose role in enabling functionality of the temporary ingress storage system 2410 can be assigned and reassigned over time. Different processing resources 3230 can be implemented via the same or different type of one or more processing devices. Different processing resources 3230 can be implemented to perform some or all functionality of the temporary ingress storage system 2410 independently in parallel and/or by intercommunicating data to jointly achieve functionality in conjunction with other processing resources 3230.

As illustrated in FIG. 32A, at any given time, these processing resources can each be utilized to implement one of a set of possible functionalities of the temporary ingress storage system 2410. In particular, a first set of NA processing resources 3230 can be utilized to implement an ingress processing module to process the incoming records of the input stream from one or more data collection devices to perform record writes to store the records pending migration as one or more replicas in the set of memory resources 2430 of the temporary ingress storage system 2410 as described previously. This can include implementing the data replication module 2518 and/or the input data sorting module 2440. A second set of NB processing resources 3230 can be utilized to implement data conversion module 2418 to generate redundancy-coded segments send for storage via long-term storage system 2420 by reading records from memory resources 2430 and performing a redundancy storage coding function as described previously. A third set of $N_C$ processing resources 3230 can be utilized to implement query processing sub-module 2452 to process incoming queries by performing record reads: by performing one or more query operators upon these read records; and/or by generating a resultant that includes and/or is based on the read records for further processing via query processing sub-module 2456, for example, in conjunction with other records read from long-term storage system 2420 as described previously. Each of these sets of processing resources can be distinct, for example, as illustrated in FIG. 32A. Alternatively, one or more processing resources 3230 can be implemented to perform functionality of multiple ones of these systems of the temporary ingress storage system 2410 at a given time. In some cases, additional processing resources, while not depicted in FIG. 32A, are allocated and utilized to implement other functionality of the temporary ingress storage system 2410 described herein.

At scale, efficient allocation of resources, particularly ingress resources, can increase efficiency of the database system. In particular, conditions can change based on flux of inbound data flow, flux in query load, system outage scenarios, applying new user-defined schemas, and/or other changing conditions that affect load to and/or performance of the temporary ingress storage system 2410 and/or the database system 10 as a whole. The temporary ingress storage system 2410 and/or another processing module of database system 10 can detect how resources should be allocated and/or whether additional resources of the database system be utilized for ingress based on these conditions.

This functionality can be implemented by utilizing a resource assignment module 3250 of the temporary ingress storage system 2410, which can be implemented via its own designated one or more processing resources 3230 such as one or more computing devices 18. As illustrated in FIG. 32B, the resource assignment module 3250 can send assignment data to some or all processing resources 3230 of the temporary ingress storage system 2410 over time indicating particular functionality of the temporary ingress storage system 2410 to which the corresponding processing resource 3230 is assigned. In particular, the set of NA modules of FIG. 32A implement the ingress processing module 3232 based on having received assignment data indicating they are assigned to implement the ingress processing module 3232. The set of NB modules of FIG. 32A implement the data conversion module 2418 based on having received assignment data indicating they are assigned to implement the data conversion module 2418. The set of Ne modules of FIG. 32A implement the query processing sub-module 2452 based on having received assignment data indicating they are assigned to implement the query processing sub-module 2452. Over time, new assignment data can be sent to various subsets of this plurality of processing resources 3230 based on changing needs of the system. For example, the resource assignment module 3250 can determine that the numbers of processing resources NA, NB, and/or $N_C$ utilized to implement the ingress processing module 3232, data conversion module 2418, and/or query processing sub-module 2452 be raised or lowered and/or to otherwise shuffle the roles assigned to various processing resources 3230 over time.

The resource assignment module 3250 can determine whether to reassign the role of one or more processing resources 3230 in predetermined intervals, based on a predefined schedule, and/or based on detecting a particular one or a set of predetermined conditions that trigger the resource assignment module 3250's evaluation of whether to reassign any processing resources 3230 such as: determining performance data such as health, utilization, load, and/or other information for a particular processing resource 3230 compares unfavorably to a predefined performance threshold: determining performance data such as health, utilization, functionality, record read load, record write load, and/or other information for the data ingress module 3232 as a whole, the data conversion module 2518 as a whole, and/or query processing sub-module 2452 as a whole compares unfavorably to a predefined performance threshold; determining the current incoming load $L_A$ of the input data stream compares unfavorably to a input data stream load threshold: determining a predicted incoming load $L_B$ of the input data stream compares unfavorably to the input data stream load threshold: determining the current incoming load $L_B$ of query requests compares unfavorably to a query request load threshold: determining a predicted incoming load $L_B$ of query requests compares unfavorably to the query request load threshold; and/or otherwise determining to evaluate whether any processing resources 3230 should be reassigned.

The load $L_A$ of the input data stream, as illustrated in FIG. 32A, can be measured by the resource assignment module 3250, and/or can be predicted based on trends and/or recurring patterns detected in historical loads $L_A$ measured and tracked previously. In some cases, a high amount of processing resources 3230 may be required purely for processing streams of incoming data if the incoming data rate is detected to be and/or predicted to be particularly high, such as higher than the input data stream load threshold. The number NA of processing resources 3230 can be increased based on this ingress data rate being determined to or predicted to increase, where NB and or $N_C$ is decreased in response. At a later time when the incoming data rate is lower, these processing resources 3230 can be later allocated for replicating data, converting data into redundancy coded segments or other long term storage formats, processing incoming queries requiring data in temporary ingress storage system 2410 be read, and/or can be allocated for other functionality of the temporary ingress storage system 2410. For example, the number NA of processing resources 3230 can be decreased based on the current and/or predicted input data load lowering below the input data stream load threshold.

Similarly, the load $L_B$ of the incoming query requests, as illustrated in FIG. 32A, can be measured by the resource assignment module 3250, and/or can be predicted based on trends and/or recurring patterns in historical loads $L_B$ measured and tracked previously. Some of these patterns can be based on one or more different heuristics 3110 as discussed in conjunction with FIG. 31A, and/or one or more measures and/or trends od data demand for one or more types of records. In some cases, a high amount of processing resources 3230 may be required purely for reading records to service query requests if the incoming rate of query requests requiring access to ingress records is detected to be and/or predicted to be particularly high, such as higher than the query request load threshold. The number Ne of processing resources 3230 can be increased based on this query request rate being determined to or predicted to increase, where NA and or NB is decreased in response. At a later time when the query request rate is lower, these processing resources 3230 can be later allocated for processing ingress data, replicating data, converting data into redundancy coded segments or other long term storage formats, and/or can be allocated for other functionality of the temporary ingress storage system 2410. For example, the number $N_C$ of processing resources 3230 can be decreased based on the current and/or predicted input data load lowering below the query request load threshold.

In some embodiments, any processing resources 3230 can be reassigned to different roles over time. In other embodiments, a particular "swing load" subset of the plurality of processing resources 3230 can be designated for reallocation over time, where only this subset of processing resources 3230 can be reallocated for handling different tasks in response to the detection of changing conditions. In such cases, the other ones of the plurality of processing resources 3230 can be considered "fixed" processing resources that are always designated to handle the same tasks and are not reallocated.

In some embodiments, processing resources 3230 can be allocated and reallocated across the whole database system 10, where a first set of processing resources is utilized by the temporary ingress storage system 2410, a second set of processing resources is utilized by the query processing module 2450, and a third set of processing resources is utilized by the long-term storage system 2420. At different points in time, different sets and/or amounts of processing resources can be included in the first set, the second set, and the third set based on changes in conditions across the database system 10 as a whole. This can include reallocation of nodes, for example, of inner levels of query execution plans 2465, as nodes utilized to implement other functionalities as discussed herein, such as re-designation as nodes 2437 and/or nodes 2438.

In some embodiments, a set of processing resources 3230, such as DRAM storage capabilities of a set of processing resources 3230, are utilized to implement the plurality of memory resources 2430. Reallocation of processing resources 3230 includes re-designating use of memory resources 2430 that are currently designated to store record replicas as processing resources 3230 of the ingress processing module 3232, data conversion module 2418, and/or query processing sub-module 2452. For example, this can include determining less replicas be stored by the temporary ingress storage system 2410 at a given time and/or decreasing one or more replication factors via the replication factor reassignment function 2814 in response, to free corresponding memory resources 2430 for their reallocation to other functionalities as processing resources 3230. Similarly, this can includes determining more resources can be utilized for the purpose of storing replicas at a given time, where one or more replication factors are increased via the replication factor reassignment function 2814 in response and/or reinstatement of additional records is initiated as discussed in conjunction with FIGS. 29A-29C due to the increase in processing resources 3230 reallocated as memory resources 2430 rather than processing resources 3230 of the ingress processing module 3232, data conversion module 2418, and/or query processing sub-module 2452.

FIG. 32C illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 32C. Some or all of the method of FIG. 32C can otherwise be performed by the temporary ingress storage system 2410 of FIGS. 32A-

32B, for example, by utilizing at least one processor and memory of the temporary ingress storage system 2410 to implement the ingress processing module 3232 of FIG. 32A, the data conversion module 2418 of FIG. 32A, the query processing sub-module 2452 of FIG. 32A, and/or the resource assignment module 3250 of FIG. 32B. Some or all of the steps of FIG. 32C can optionally be performed by any other processing module of the database system 10. Some or all of the steps of FIG. 32B can be performed to implement some or all of the functionality of the temporary ingress storage system 2410 described in conjunction with FIGS. 32A-32B. Some or all steps of FIG. 31B can be performed by database system 10 in accordance with other embodiments of the database system 10 discussed herein.

Step 3272 includes generating first resource allocation data by segregating a plurality of processing resources of a temporary ingress storage system into a first plurality of subsets to implement a corresponding plurality of processing functionalities of the temporary ingress storage system. The plurality of processing functionalities can include, but are not limited to, an ingress processing module, such as ingress processing module 3232, a data conversion module such as data conversion module 2418, and/or a query processing module such a query processing sub-module 2452.

Step 3274 includes processing a first plurality of records received in an input data stream via a first subset of processing resources allocated to implement the ingress processing module based on the first resource allocation data. Step 3276 includes temporarily storing the first plurality of records prior to their conversion and migration to long-term storage by the temporary ingress storage system. For example, the conversion is performed via a set of processing resources allocated to implement the data conversion module in the first resource allocation data, and/or the temporary storage is performed by a set of memory resources indicated in the first resource allocation data. Step 3278 includes performing a first plurality of record reads based on a plurality of incoming query requests by accessing the plurality of records during their temporary storage via a second subset of processing resources allocated to implement the query processing module based on the first resource allocation data.

Step 3280 includes determining to update the first resource allocation data based on at least one of: detecting an input data stream load of the input data stream compares unfavorably to an input data stream load threshold, or detecting a query request load of the plurality of incoming query requests compares unfavorably to a query request load threshold. The determining to update the first resource allocation data can alternatively or additionally be based on detecting degradation and/or failure of one or more processing resources and/or can be based on performance data of one or more processing resources and/or one or more processing functionalities as a whole.

Step 3282 includes generating second resource allocation data, for example, based on determining to update the first resource allocation data. Generating the second resource allocation data can include segregating the plurality of processing resources of the temporary ingress storage system into a second plurality of subsets to implement the corresponding plurality of processing functionalities of the temporary ingress storage system. The second plurality of subsets can be different from the first plurality of subsets.

Step 3284 includes processing a second plurality of records received in the input data stream via an updated first subset of processing resources allocated to implement the ingress processing module based on the second resource allocation data. The updated first subset of processing resources can be different from the original first subset of processing resources. For example, the updated first subset of processing resources can include a greater number of resources based on the input data stream load of the input data stream exceeding and/or otherwise comparing unfavorably to the input data stream load threshold. As another example, the updated first subset of processing resources can include a smaller number of resources based on these resources being reallocated to increase resources of one or more other processing functionalities.

Step 3286 includes temporarily storing the second plurality of records prior to their conversion and migration to long-term storage, for example, where the conversion and migration is performed by utilizing an updated set of processing resources allocated for implementation by the data conversion module in the second resource allocation data and/or where the temporary storage is performed by an updated set of memory resources indicated in the second resource allocation data.

Step 3288 includes performing a second plurality of record reads based on a plurality of incoming query requests by accessing the plurality of records during their temporary storage via a updated second subset of processing resources allocated to implement the query processing module based on the second resource allocation data. The updated second subset of processing resources can be different from the original second subset of processing resources. For example, the updated second subset of processing resources can include a greater number of resources based on the query request load of the incoming query requests exceeding and/or otherwise comparing unfavorably to the query request load threshold. As another example, the updated second subset of processing resources can include a smaller number of resources based on these resources being reallocated to increase resources of one or more other processing functionalities.

Figure 33A:
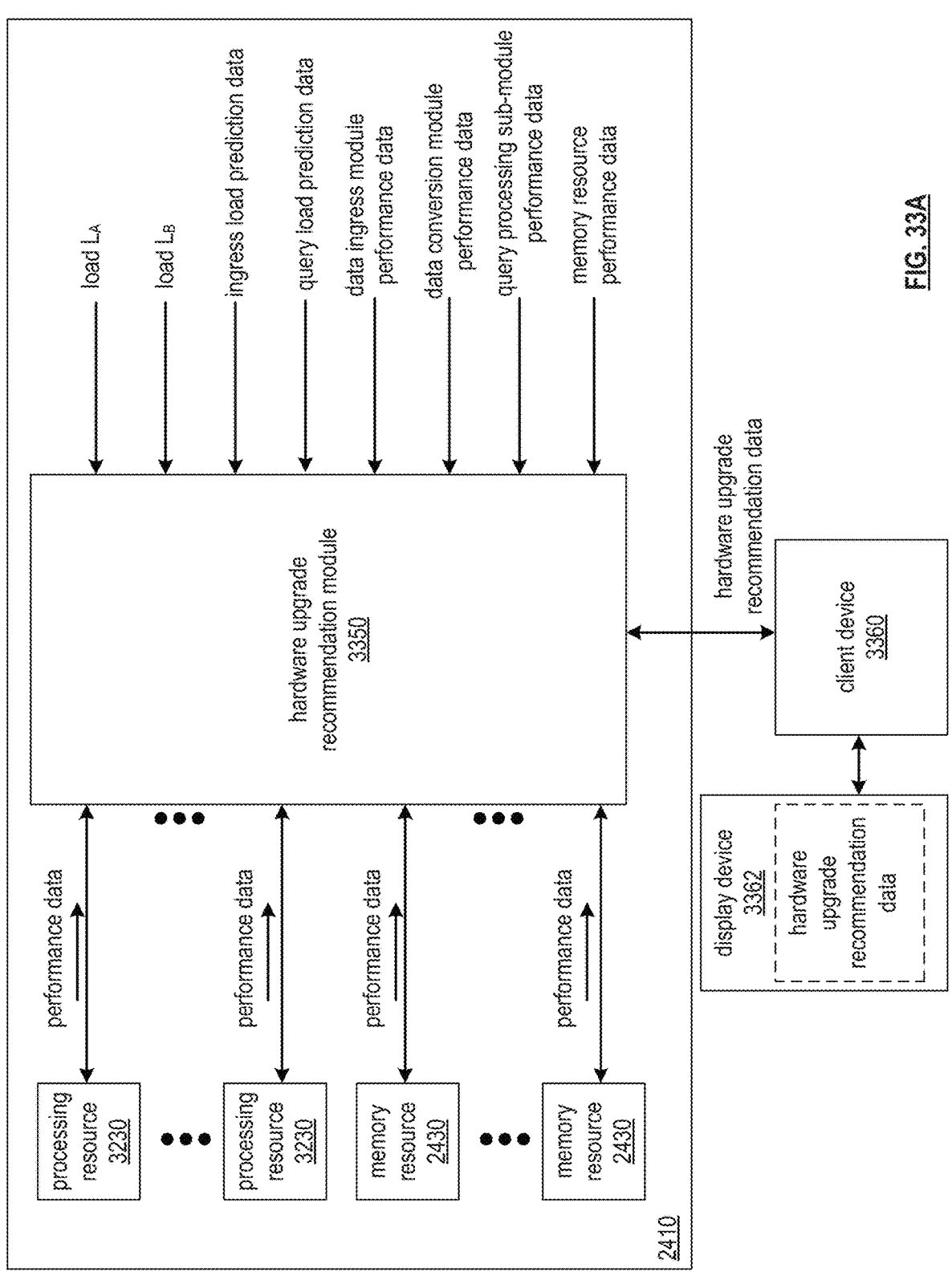
FIG. 33A is a schematic block diagram of a temporary ingress storage system that implements a hardware upgrade recommendation module in accordance with various embodiments of the present invention.

FIG. 33A presents an embodiment of a temporary ingress storage system 2410 that implements a hardware upgrade recommendation module 3350 that automatically generates hardware upgrade recommendation data based on detected conditions of the temporary ingress storage system 2410. The temporary ingress storage system 2410 can implement the hardware upgrade recommendation module 3350 in conjunction with the resource assignment module 3250, for example, by determining that additional hardware is necessary based on the resource assignment module 3250 determining that mere reallocation of the existing set of processing resources 3230 is not sufficient to accommodate the expected strain to the temporary ingress storage system 2410. This improves database systems by automating notifications for hardware upgrades based on current and/or predicted factors detected by the temporary ingress storage system 2410, which reduces the need for manual testing and/or evaluation of system needs; increasing the accuracy at which the system performance is evaluated in determining when, how much, and/or what type of additional hardware is required; and increasing cost effectiveness of further hardware installations by optimizing cost and automatically determining a cost-benefit tradeoff between additional hardware purchase and installation costs and corresponding improvement in efficiency and/or effectiveness of the database system 10 that would result from this new hardware. Some or all features of temporary ingress storage system 2410 can be utilized to implement the temporary ingress storage system 2410 of FIG. 24A and/or any other embodiment of the temporary ingress storage system 2410 discussed herein.

The hardware upgrade recommendation module 3350 can determine whether additional hardware is necessary; can determine what type of additional hardware is necessary; can determine whether the additional hardware should supplement all existing hardware and/or should replace existing hardware; can determine how much additional hardware is necessary based on determining how many additional processing resources 3230 and/or memory resources 2430 are necessary: can determine a cost associated with the recommended hardware and can generate recommendations to minimize total cost while attaining the desired processing and/or memory performance; and/or can determine how the new processing resources 3230 and/or memory resources 2430 that would be implemented via the installation of the additional hardware be allocated, for example, by implementing the resource assignment module 3250 to generate assignment data for the recommended hardware. Some or all of this information can be included in the hardware upgrade recommendation data.

In particular, the hardware upgrade recommendation data can indicate a selected number of additional nodes 37 recommended to be integrated, a selected number of additional computing devices 18 recommended to be integrated, and/or the corresponding hardware required to implement the selected number of additional nodes 37 and/or the selected number of additional computing devices 18.

The hardware upgrade recommendation module 3350 can determine whether to generate hardware upgrade recommendation data recommending new hardware in predetermined intervals, based on a predefined schedule, and/or based on detecting a particular one or a set of predetermined conditions that trigger the resource assignment module 3250's evaluation of whether to reassign any processing resources 3230 such as: determining performance data such as health, utilization, load, and/or other information for a particular processing resource 3230 and/or memory resource 2430 compares unfavorably to a predefined performance threshold: determining performance data such as health, utilization, functionality, record read load, record write load, and/or other information for the data ingress module 3232 as a whole, the data conversion module 2518 as a whole, and/or query processing sub-module 2452 as a whole compares unfavorably to a predefined performance threshold; determining the current incoming load $L_A$ of the input data stream compares unfavorably to a input data stream load threshold; determining a predicted incoming load $L_B$ of the input data stream compares unfavorably to the input data stream load threshold; determining the current incoming load $L_B$ of query requests compares unfavorably to a query request load threshold; determining a predicted incoming load $L_B$ of query requests compares unfavorably to the query request load threshold; and/or otherwise determining to evaluate whether any processing resources 3230 should be reassigned.

Some or all of these factors can be further utilized to calculate or otherwise determine what type of additional hardware is necessary; whether the additional hardware should supplement all existing hardware and/or should replace existing hardware; how much additional hardware is necessary based on determining how many additional processing resources 3230 and/or memory resources 2430 are necessary; a cost associated with the recommended hardware and can generate recommendations to minimize total cost while attaining the desired processing and/or memory performance; and/or how the new processing resources 3230 and/or memory resources 2430 that would be implemented via the installation of the additional hardware be allocated, for example, by implementing the resource assignment module 3250 to generate assignment data for the recommended hardware.

For example, the hardware upgrade recommendation data can be generated to recommend additional hardware to implement additional processing resources 3230 based on current and/or projected load $L_A$ of the input data stream and/or current or projected load $L_B$ of the incoming query requests being too high to manage via the existing processing resources 3230. As another example, the hardware upgrade recommendation to recommend additional hardware to implement additional memory resources 2430 based on current and/or projected load $L_A$ of the input data stream exceeding a measured or projected conversion rate of the data conversion module 2418 by at least a threshold amount, indicating more memory is required to store records. As another example, the hardware upgrade recommendation to recommend additional hardware to implement additional memory resources 2430 based on determining an increase of records required to be stored by the temporary ingress storage system 2410, for example, based on increases in load $L_A$ of the input data stream: based on increases in replication factor M due to increased data demand and/or fault-tolerance requirements: based on increases in reinstated records due to corresponding increased measured and/or predicted data demand; and/or based on other factors. As another example, the hardware upgrade recommendation to recommend additional hardware to implement additional processing resources 3230 and/or memory resources 2430 based on detecting a threshold amount of hardware utilized to implement one or more processing resources 3230 and/or utilized to implement one or more memory resources 2430 is deteriorating in health and/or has failed entirely. The amount and/or type of hardware recommended can be determined based on the amount and/or type of processing resources 3230 and/or memory resources 2430 required to attain satisfactory levels of utilization and/or load balancing across all processing resources 3230 and/or memory resources 2430 in the system as a function of these measured and/or predicted factors.

The resulting hardware upgrade recommendation data can be sent, for example, via external network(s) 17 and/or system communication resources 14, to a client device 3360 for display via a display device 3362 associated with the client device 3360. Client device 3360 can be implemented via a computing device 18 of the administrative sub-system 15 and/or another client device associated with an administrator or other user of temporary ingress storage system 2410. This hardware upgrade recommendation data can alternatively or additionally be transmitted, for example, via external network(s) 17, and/or otherwise utilized to facilitate automatic ordering and/or automatic installation of new hardware.

In other embodiments, the hardware upgrade recommendation module 3350 is implemented to generate hardware upgrade recommendation data indicating additional hardware to be installed and/or implemented for other aspects of the database system 10, such as additional nodes 37, computing devices 18, memory drives 2425, and/or corresponding hardware necessary to implement additional processing and/or memory requirements of the query processing module 2450 and/or the long-term storage system 2420. This can include determining additional nodes required for query execution plans 2465 due to additional query requests and/or requirements that queries be performed on greater amounts of data, and/or determining additional memory drives to store redundancy-coded segments due to an increase of data being stored and/or accessed.

Figure 33B:
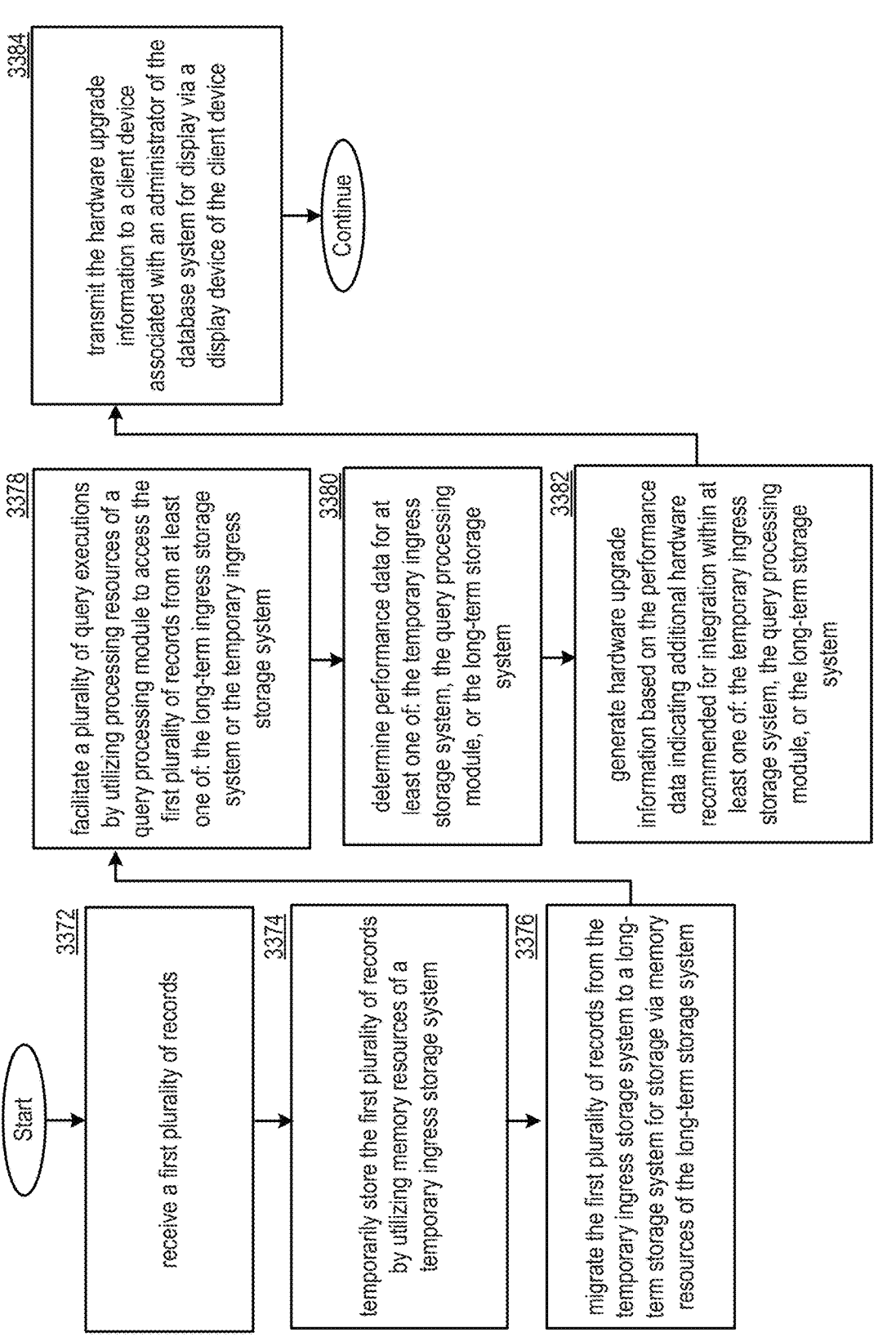
FIG. 33B is a logic diagram illustrating a method of generating hardware upgrade recommendation data in accordance with various embodiments of the present invention.

FIG. 33B illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 33B. Some or all of the method of FIG. 33B can otherwise be performed by the temporary ingress storage system 2410 of FIG. 33A, for example, by utilizing at least one processor and memory of the temporary ingress storage system 2410 to implement the hardware upgrade recommendation module of FIG. 33A. Some or all of the steps of FIG. 33B can optionally be performed by any other processing module of the database system 10, such as another hardware upgrade recommendation module that evaluates the processing and/or memory resources of database system 10 as a whole to generate hardware recommendations for database system 10 as a whole. Some or all of the steps of FIG. 33A can be performed to implement some or all of the functionality of the temporary ingress storage system 2410 described in conjunction with FIG. 33A. Some or all steps of FIG. 33B can be performed by database system 10 in accordance with other embodiments of the database system 10 discussed herein.

Step 3372 includes receiving a first plurality of records, for example, in an input data stream and/or bulk-loaded set of records. Step 3374 includes temporarily storing the first plurality of records by utilizing memory resources, such as memory resources 2430, of a temporary ingress storage system. Step 3376 includes migrating the first plurality of records from the temporary ingress storage system to a long-term storage system for storage via memory resources, such as memory drives 2425, of the long-term storage system. Step 3378 includes facilitating a plurality of query executions by utilizing processing resources, such as processing resources 3230, of a query processing module to access the first plurality of records from at least one of: the long-term ingress storage system or the temporary ingress storage system. This can include query processing sub-module 2452, query processing sub-module 2454, and/or query processing sub-module 2456.

Step 3380 includes determining performance data for the temporary ingress storage system, the query processing module, and/or the long-term storage system. This can include performance, utilization, load, availability, latency, degradation, and/or health that is measured and/or predicted for nodes 37, nodes 2437, nodes 2438, computing devices 18, processing resources 3230, memory resources 2430, memory drives 2425, and/or other processing and/or memory resources utilized to implement the temporary ingress storage system, the query processing module, or the long-term storage system. The determined performance data can further include and/or be based on a measured and/or predicted input data stream load and/or a measured and/or predicted query request load.

Step 3382 includes generating hardware upgrade information, such as the hardware upgrade recommendation data of FIG. 33A, based on the performance data indicating additional hardware recommended for integration within at least one of: the temporary ingress storage system, the query processing module, or the long-term storage system. This can include a type, number, cost, and/or assignment of additional nodes 37, nodes 2437, nodes 2438, computing devices 18, processing resources 3230, memory resources 2430, memory drives 2425, and/or other processing and/or memory resources that are recommended to be utilized to implement the temporary ingress storage system, the query processing module, or the long-term storage system based on the performance data. Step 3384 includes transmitting the hardware upgrade information to a client device, for example, that is associated with an administrator of the database system, for display via a display device of the client device. The hardware upgrade information can otherwise be communicated and/or utilized to facilitate manual and/or automated ordering of the additional hardware indicated in the hardware upgrade information and/or to facilitate manual and/or automated installation and/or integration of the additional hardware indicated in the hardware upgrade information.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c.

As an example, it means: "a" only, "b" only, "c" only, "a" and "b", "a" and "c", "b" and "c", and/or "a", "b", and "c".

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, a set of memory locations within a memory device or a memory section. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A database system comprises:
a data ingest sub-system that includes a plurality of data in computing devices;
a data store and process (S&P) sub-system that includes a plurality of data S&P computing devices;
a query and result (Q&R) sub-system that includes a plurality of Q&R computing devices; and
a system communication network operably coupled to the data ingest sub-system, to the data store and process sub-system, and the query and result sub-system; wherein:
a set of data in computing devices of the plurality of data in computing devices is operable to:
receive data of a data set; and
temporarily store the data of the data set in accordance with a fault tolerance level;
encode, via redundancy encoding scheme as indicated by the fault tolerance level, the data of data set to produce a plurality of encoded data segments, wherein the encoding of the data of the data set into encoded data segments of the plurality of data segments lags behind the temporarily storing the data of data set;
a set of data S&P computing devices of the plurality of data S&P computing devices is operable to:
store the plurality of encoded data segments;
a set of Q&R computing devices of the plurality of Q&R computing devices is operable to:
receive a query request regarding the data set when the encoding of the data of the data set into encoded data segments is not complete due to the encoding lagging behind the temporarily storing of the data of data set;
the set of data S&P computing devices is further operable to:
receive a set of query operations regarding the query;
identify first data of the data of the data set that has been encoded into first encoded data segments;
identify second data of the data of the data set that has not yet been the encoded into encoded data segments;
retrieve the second data from the set of data in computing devices; and
execute the set of query operations on the first and second data to produce at least a portion of a final result.

2. The database system of claim 1 further comprises:
the set of data in computing devices is further operable to:
create, in accordance with the fault tolerance level, "n" number of copies of the data of the data set, wherein "n" is an integer greater than or equal to 1; and
store the "n" number of copies of the data of the data set.

3. The database system of claim 1 further comprises:
when the first data of the data of the data set has been encoded into the first encoded data segments and the first encoded data segments are stored by the set of S&P computing devices, the set of data in computing devices deletes the first data from memory of the set of data in computing devices used to temporarily store the data of the data set.

4. The database system of claim 1 further comprises:
the data of the data including a set of records of a plurality of sets of records.

5. The database system of claim 1 further comprises:

the set of Q&R computing devices of the plurality of Q&R computing devices is further operable to:

receive the query request regarding the data set when the encoding of the data of the data set into encoded data segments is complete;

the set of data S&P computing devices is further operable to:

receive the set of query operations regarding the query;

access the plurality of data segments to obtain the data of the data set; and execute the set of query operations on the data of the data set to produce the at least a portion of the final result.

6. The database system of claim 1 further comprises:

the set of data in computing devices includes a record group monitoring module that is operable to:

monitor the temporary storing of the data of the data set, wherein the data set includes a plurality of records;

when a first group of records of the plurality of records is temporarily stored, enable encoding of the first group of records into a first set of encoded data segments of the plurality of encoded data segments; and when a second group of records of the plurality of records is temporarily stored, enable encoding of the second group of records into a second set of encoded data segments of the plurality of encoded data segments.

7. The database system of claim 1 further comprises:

the set of data in computing devices includes a record group monitoring module that is operable to:

monitor the temporary storing of the data of the data set, wherein the data set includes a plurality of records;

when a time period of temporary storing of the data of the data set has elapsed, enable encoding of a group of records that were temporarily stored during the time period into a set of encoded data segments of the plurality of encoded data segments.

8. A computer readable memory system comprises:

a first memory that stores operational instructions that, when executed by a set of data in computing devices of the plurality of data in computing devices of a database system, causes the set of data in computing devices to:

receive data of a data set; and temporarily store the data of the data set in accordance with a fault tolerance level;

encode, via redundancy encoding scheme as indicated by the fault tolerance level, the data of data set to produce a plurality of encoded data segments, wherein the encoding of the data of the data set into encoded data segments of the plurality of data segments lags behind the temporarily storing the data of data set;

a second memory that stores operational instructions that, when executed by a set of data S&P computing devices of the plurality of data S&P computing devices of the database system, causes the set of data S&P computing devices to:

store the plurality of encoded data segments;

a third memory that stores operational instructions that, when executed by a set of Q&R computing devices of the plurality of Q&R computing devices of the database system, causes the set of data Q&R computing devices to:

receive a query request regarding the data set when the encoding of the data of the data set into encoded data segments is not complete due to the encoding lagging behind the temporarily storing of the data of data set; and the second memory further stores operational instructions that, when executed by the set of data S&P computing devices, causes the set of data S&P computing devices to:

receive a set of query operations regarding the query;

identify first data of the data of the data set that has been encoded into first encoded data segments;

identify second data of the data of the data set that has not yet been the encoded into encoded data segments;

retrieve the second data from the set of data in computing devices; and execute the set of query operations on the first and second data to produce at least a portion of a final result.

9. The computer readable memory system of claim 8, wherein the first memory further stores operational instructions that, when executed by the set of data in computing devices, causes the set of data in computing devices to:

create, in accordance with the fault tolerance level, "n" number of copies of the data of the data set, wherein "n" is an integer greater than or equal to 1; and store the "n" number of copies of the data of the data set.

10. The computer readable memory system of claim 8, wherein the first memory further stores operational instructions that, when executed by the set of data in computing devices, causes the set of data in computing devices to:

delete the first data from memory of the set of data in computing devices used to temporarily store the data of the data set when the first data of the data of the data set has been encoded into the first encoded data segments and the first encoded data segments are stored by the set of S&P computing devices.

11. The computer readable memory system of claim 8 further comprises:

the data of the data including a set of records of a plurality of sets of records.

12. The computer readable memory system of claim 8 further comprises:

the third memory further stores operational instructions that, when executed by the set of Q&R computing devices, causes the set of data Q&R computing devices to:

receive the query request regarding the data set when the encoding of the data of the data set into encoded data segments is complete;

the second memory further stores operational instructions that, when executed by the set of data S&P computing devices, causes the set of data S&P computing devices to:

receive the set of query operations regarding the query;

access the plurality of data segments to obtain the data of the data set; and execute the set of query operations on the data of the data set to produce the at least a portion of the final result.

13. The computer readable memory system of claim 8, wherein the first memory further stores operational instructions that, when executed by the set of data in computing devices, causes the set of data in computing devices to function as a record group monitoring module that is operable to:

monitor the temporary storing of the data of the data set, wherein the data set includes a plurality of records;

when a first group of records of the plurality of records is temporarily stored, enable encoding of the first group of records into a first set of encoded data segments of the plurality of encoded data segments; and when a second group of records of the plurality of records is temporarily stored, enable encoding of the second group of records into a second set of encoded data segments of the plurality of encoded data segments.

14. The computer readable memory system of claim 8, wherein the first memory further stores operational instructions that, when executed by the set of data in computing devices, causes the set of data in computing devices to function as a record group monitoring module that is operable to:

monitor the temporary storing of the data of the data set, wherein the data set includes a plurality of records; and when a time period of temporary storing of the data of the data set has elapsed, enable encoding of a group of records that were temporarily stored during the time period into a set of encoded data segments of the plurality of encoded data segments.

\* \* \* \* \*